United States Patent
Oklobdzija et al.

(10) Patent No.: US 11,442,696 B1
(45) Date of Patent: Sep. 13, 2022

(54) FLOATING POINT MULTIPLY-ADD, ACCUMULATE UNIT WITH EXCEPTION PROCESSING

(71) Applicant: SAMBANOVA SYSTEMS, INC., Palo Alto, CA (US)

(72) Inventors: Vojin G. Oklobdzija, Berkeley, CA (US); Matthew M. Kim, Frankston South (AU)

(73) Assignee: SAMBANOVA SYSTEMS, INC., Palo Alto, CA (US)

(*) Notice: Subject to any disclaimer, the term of this patent is extended or adjusted under 35 U.S.C. 154(b) by 0 days.

(21) Appl. No.: 17/534,376

(22) Filed: Nov. 23, 2021

Related U.S. Application Data

(63) Continuation-in-part of application No. 17/397,241, filed on Aug. 9, 2021.

(60) Provisional application No. 63/239,384, filed on Aug. 31, 2021, provisional application No. 63/190,749, filed on May 19, 2021, provisional application No. 63/174,460, filed on Apr. 13, 2021, provisional application No. 63/166,221, filed on Mar. 25, 2021, provisional application No. 63/165,073, filed on Mar. 23, 2021.

(51) Int. Cl.
*G06F 7/544* (2006.01)
*G06F 7/483* (2006.01)

(52) U.S. Cl.
CPC ............ *G06F 7/5443* (2013.01); *G06F 7/483* (2013.01)

(58) Field of Classification Search
CPC .............................. G06F 7/483; G06F 7/5443
See application file for complete search history.

(56) References Cited

U.S. PATENT DOCUMENTS

| | | |
|---|---|---|
| 6,904,446 B2 | 6/2005 | Dibrino |
| 6,947,962 B2 | 9/2005 | Hoskote |
| 6,988,119 B2 | 1/2006 | Hoskote et al. |
| 7,024,439 B2 | 4/2006 | Hoskote |
| 8,037,119 B1 | 10/2011 | Oberman et al. |
| 8,301,681 B1 | 10/2012 | Lee et al. |
| 2002/0002573 A1 | 1/2002 | Landers et al. |
| 2004/0128338 A1 | 7/2004 | Even et al. |
| 2014/0208078 A1* | 7/2014 | Bradbury ............ G06F 11/1004 712/222 |

(Continued)

FOREIGN PATENT DOCUMENTS

| | | |
|---|---|---|
| WO | 2010142987 A1 | 12/2010 |
| WO | 2021073918 A1 | 4/2021 |

OTHER PUBLICATIONS

Bewick, Gary W., "Fast Multiplication: Algorithms and Implementation," Doctoral Dissertation, Feb. 1994, 170 pages.

(Continued)

*Primary Examiner* — Michael D. Yaary
(74) *Attorney, Agent, or Firm* — Haynes Beffel & Wolfeld LLP; Sikander M. Khan; Bruce Young

(57) ABSTRACT

A Floating point Multiply-Add, Accumulate Unit, supporting BF16 format for Multiply-Accumulate operations, and FP32 Single-Precision Addition complying with the IEEE 754 Standard is described with exception handling. Operations including exception handling in a way that does not interfere with execution of data flow operations, overflow detection, zero detection and sign extension are adopted for 2's complement and Carry-Save format.

24 Claims, 32 Drawing Sheets

(56) References Cited

U.S. PATENT DOCUMENTS

2016/0126975 A1* 5/2016 Lutz .................. G06F 7/507
708/204

OTHER PUBLICATIONS

Chandrakala, et al., "Design and Implementation of 4-2 Compressor Design with New Xor-Xnor," Int'l Advanced Research J. in Sci., Engineering and Technology IARJSET, vol. 3, issue 7, Jul. 2016, 4 pages.
Dadda, "Some schemes for parallel multipliers," Alta Fre-quenza, vol. 34, Mar. 1965, pp. 349-356.
Oklobdzija, et al., "A Method for Speed Optimized Partial Product Reduction and Generation of Fast Parallel Multipliers Using an Algorithmic Approach," IEEE Transactions on Computers, vol. 45, No. 3, Mar. 1996, pp. 294-306.
Vangal et al. "A 6.2-GFlops Floating-Point Multiply-Accumulator With Conditional Normalization," in IEEE Journal of Solid-State Circuits, vol. 41, No. 10, Oct. 2006, pp. 2314-2323.
Vangal et al., "An 80-Tile Sub-100-W TeraFLOPS Processor in 65-nm CMOS," in IEEE Journal of Solid-State Circuits, vol. 43, No. 1, Jan. 2008, pp. 29-41.
Wikipedia, IEEE 754, retrieved on Feb. 11, 2022, 15 pages. Retrieved from the internet [URL: https://en.wikipedia.org/wiki/IEEE_754 ].
IEEE Computer Society, IEEE Standard for Floating-Point Arithmetic, IEEE Std 754-2008, dated Aug. 29, 2008, 70 pages.
Wikipedia, bfloat16 floating-point format, retrieved on Feb. 12, 2022, 5 pages. Retrieved from the internet [URL: https://en.wikipedia.org/wiki/Bfloat16_floating-point_format ].
Intel, BFLOAT16-Hardware Numerics Definition, Whitepaper, dated Nov. 2018, 7 pages.
Cloud TPU, The bfloat16 numerical format, Google Cloud, retrieved on Feb. 14, 2022, 3 pages. Retrieved from the Internet [URL: https://cloud.google.com/tpu/docs/bfloat16 ].
U.S. Appl. No. 17/397,241—Office Action dated Feb. 10, 2022, 22 pages.
Podobas et al, A Survey on Coarse-Grained Reconfigurable Architectures From a Performance Perspective, IEEEAccess, vol. 2020 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, Mar. 1-Apr. 2021, doi: 10.1109/MCSE.2021.3057203.
U.S. Appl. No. 17/465,558—Office Action dated Jan. 13, 2022, 13 pages.
U.S. Appl. No. 17/465,558—Response to Office Action dated Jan. 13, 2022, filed Jan. 31, 2022, 9 pages.
U.S. Appl. No. 17/465,558 Notice of Allowance, dated Feb. 25, 2022, 8 pages.
U.S. Appl. No. 17/397,241—Response to Office Action dated Feb. 10, 2022, filed Mar. 18, 2022, 11 pages.
U.S. Appl. No. 17/397,241 Notice of Allowance dated Apr. 14, 2022, 14 pages.

* cited by examiner

FLOATING POINT MULTIPLY-ADD, ACCUMULATE UNIT WITH EXCEPTION PROCESSING

REFERENCE TO PRIORITY APPLICATIONS

This application is a continuation-in-part of co-pending U.S. patent application Ser. No. 17/397,241 filed on 9 Aug. 2021, which application claims the benefit of U.S. Provisional Patent Application Nos. 63/190,749 filed 19 May 2021, No. 63/174,460 filed 13 Apr. 2021, No. 63/166,221 filed 25 Mar. 2021, and No. 63/165,073 filed 23 Mar. 2021, which applications are incorporated herein by reference; and benefit of U.S. Provisional Patent Application No. 62/239,384, filed 31 Aug. 2021 is also claimed, which application is incorporated herein by reference.

FIELD OF THE DISCLOSURE

The field of the disclosure is implementation of arithmetic logic circuits, including floating point, multiply-add-accumulate circuits, also sometimes referred to as multiply and accumulate circuits, for high speed processors, including processors configured for efficient execution of training and inference.

BACKGROUND OF THE DISCLOSURE

Arithmetic logic circuits, including floating point, multiply-and-accumulate units, as implemented in high performance processors, are relatively complicated logic circuits. Multiply-and-accumulate circuits are applied for matrix multiplication and other complex mathematical operations, applied in machine learning and inference engines.

Basically, a multiply-and-accumulate circuit generates a summation S(i) of a sequence of terms A(i)*B(i), expressed typically as follows:

$$S(i) = \sum_{i=0}^{N-1} A(i) * B(i)$$

Here, the summation S(i) at cycle (i) is equal to the addition of term A(i)*B(i) to the summation S(i−1) which is the accumulation of terms A(0)*B(0) to A(i−1)*B(i−1). The final summation S(N−1) is a summation output of the multiply-and accumulate operation over N cycles, 0 to N−1.

In a floating point implementation, each cycle multiplies two input floating point operands, A(i) and B(i), including exponent values and significand values to produce multiplier output terms A(i)*B(i), and then computes an accumulator output summation S(i) by adding the multiplier output term A(i)*B(i), of a current cycle with the accumulator output summation S(i−1) of the previous cycle.

In floating point encoding formats used in computing to encode floating point numbers, the numbers can be normalized so that the significand includes a one digit integer (which in binary is always "1") to the left of the binary point, and a fraction represented by a number of bits to the right of the binary point, and the number is encoded using only the fraction. The binary 1 integer is omitted in the encoding, because it can be implied by the normalized form. Operations on the floating point encoding format numbers, encoded in this manner, take into account the integer, referred to as an "implied 1", to the left of the binary point.

Multiplication of floating point numbers can be implemented by adding the exponents, multiplying the significands, and then normalizing the result, by shifting the resulting significand of the output and adjusting the exponent of the output to accommodate the shift.

Addition of floating point numbers can be implemented by first identifying the larger exponent, and the difference between the exponents of the operands, and shifting the significand of the operand with the smallest exponent to align with the larger exponent. Finally, the result is normalized, which can involve an additional shift in the significand and adjustment of the exponent.

Computations which result in numbers not supported by the formats, such as floating point encoding formats, result in signaling of exceptions. In data flow architectures, and other architectures executing complex algorithms such as machine learning algorithms, these exceptions can cause the algorithms to stall or fail. Exceptions in real time systems that cause algorithms to stall or fail can result in system failures or other problems in performance.

It is desirable to provide systems for handling exceptions that can be applied in complex data processing settings.

DETAILED DESCRIPTION

Figure 1:
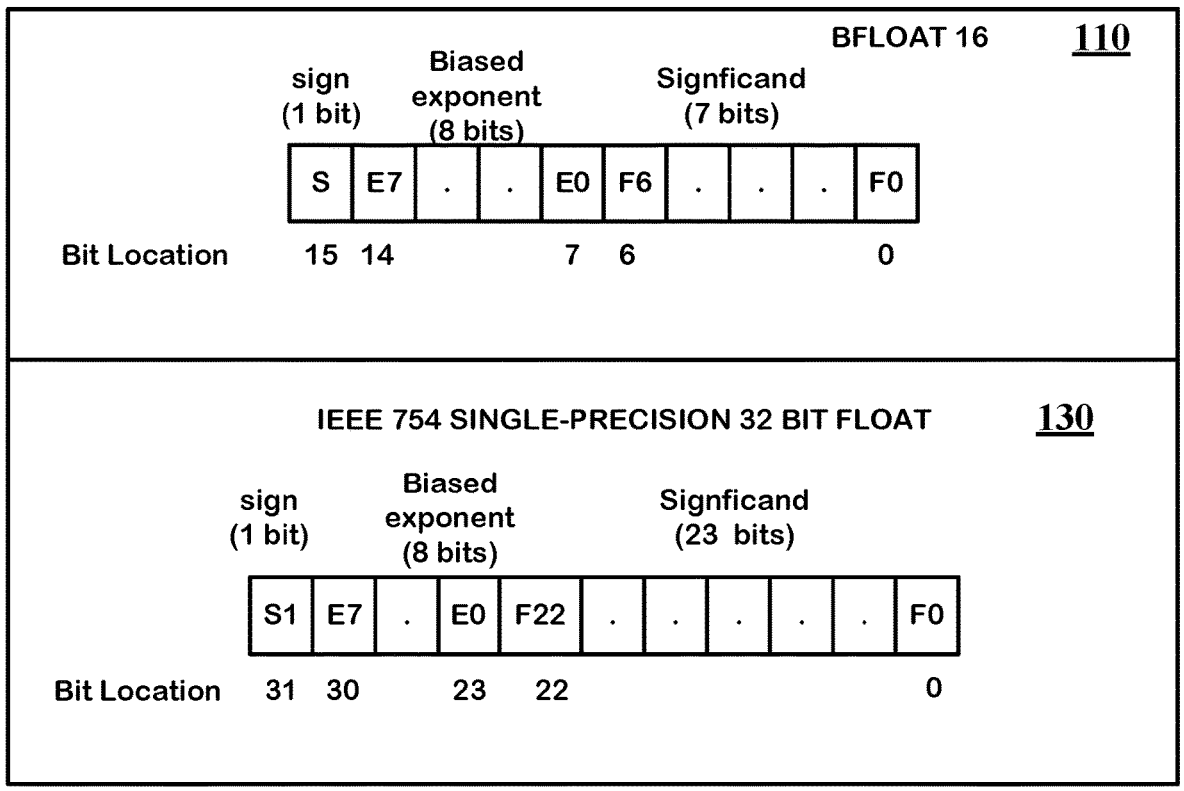
FIG. 1 illustrates encoding formats of a BFloat16 and the Floating-Point IEEE-754 standard.

A detailed description of a technology implementing an arithmetic unit for a configurable, and reconfigurable, data flow architecture with exception handling is provided. An example reconfigurable data flow architecture is described in U.S. Pat. No. 10,831,507, by Shah et al., issued Nov. 10, 2020, which is incorporated by reference as if fully set forth herein. The arithmetic unit can execute a plurality of floating point arithmetic operations using input operands and generating at least one output operand, where the source of the input operands, the destination of the output operand and the operation are configurable, and reconfigurable by configuration data that can be static during a data flow operation.

In the execution of at least one of the floating point arithmetic operations, exceptions related to illegal operations and to generation of results not normally represented in the floating point encoding format utilized are detected, and results of the operation are set to values usable for further processing during the operation, without requiring special interrupt handling by, for example, a runtime processor. As a result, the data flow operation is able to complete without interruption due to as least some exceptions.

In some embodiments, arithmetic operations and arithmetic units used on control flow architectures can implement exceptions processing technologies described herein.

Floating Point Carry-Save MAC (FP-CS-MAC)

A FP-CS-MAC is described which can be operated in three operation modes, such as:

Input-A(BF16)×Input-B(BF16)+Accumulation Loop

Input-A(BF16)×Input-B(BF16)+Input-C(FP32)

or a single 32-bit floating point addition such as:

Input-A(FP32)+Input-C(FP32)

Operand A can be in any format, while in this implementation it is in either of one of the two formats: BF16 or FP32, where BF16 is a format containing 8-bit exponent, 1-sign bit, 7-bit significand with 1 implied integer bit, for a total of 8 significand bits. FP32 is referred to as Single Precision 32-bit, IEEE Floating-Point 754 standard.

Other encoding formats can be used, and appropriate adjustments of the implementations described can be made.

A three-mode Floating point Carry-Save MAC (FP-CS-MAC) unit is described, comprising a circuit implemented as a pipeline, running in response to a pipeline clock. A pipeline clock in some implementations can be on the order of GHz or faster. As the pipeline clock runs, each period of the clock corresponds to a pipeline cycle. Accordingly, a pipeline cycle can be less than a nanosecond in some embodiments. In a pipeline, stages of the pipeline include input registers or data stores that hold stage input data at a first pipeline clock pulse (e.g., a leading edge of a clock pulse), and output registers or data stores that register stage output data of the stage at a next pipeline clock pulse (e.g., a leading edge of the next clock pulse, defining one pipeline clock period). At the time of the first pipeline clock pulse starting a pipeline cycle (i), the output registers of the stage hold the stage output data of the previous pipeline cycle (i−1), and the stage output data of one stage in the pipeline are at least part of the stage input data of the next. The circuitry in each stage must settle reliably within the pipeline cycle, and so fast pipeline clocks impose significant difficulties for timing critical stages.

One implementation of a three-mode Floating point Carry-Save MAC (FP-CS-MAC) unit comprises 6 pipeline stages. Further increases in speed are possible by increasing the number of pipeline stages. Further decrease in power is possible by reducing the number of pipeline stages. In general, the optimal number of pipeline stages depends on a particular technology and design requirements. A first main unit is the BF16 Multiplier which is implemented in two pipeline stages in this example and includes a conversion unit to convert the multiplier result into a 16-bit 2's complement significand and an exponent. The third pipeline stage is a Carry-Save Accumulate stage. The next two stages convert the result in carry-sum format back into regular normalized sign-magnitude format, such as BF16 or FP32 desired for the output encoding format.

The last pipeline stage performs normalization and rounding to produce results. In this case, the final format is in BF16 or FP32 format. The input operand significands are between 1≤|a|<2 as they contain an implied 1 to the left of the decimal point, and include only the fraction part of the significand. The unit does not support denormalized numbers and truncates them to zero. Therefore, using BF16 or FP32, the range of the input operands is ±2-126 to (2-2-7)×2127. Numbers outside this range truncate to zero if smaller than +2-126 or convert to ±infinity if larger than ±(2-2-7)×2127.

Floating Point Encoding Formats

FIG. 1 illustrates bit patterns for two encoding formats, A first exemplary diagram of the first bit format illustrates a Bfloat16 110. The Bfloat16 floating point encoding format (sometimes "BF16") is a 16-bit numerical format. BF16 retains an approximate dynamic range of an IEEE single precision number. The illustrated BF16 format includes a 7-bit fraction, an "implied bit" or "hidden bit" to complete the significand, an 8-bit exponent, and one sign bit.

A second diagram illustrates the IEEE 754 single-precision 32-bit floating point (FP32) 130 encoding format. The illustrated IEEE 754 single-precision 32-bit floating point 130 includes a 23-bit fraction, "implied" bit or "hidden bit" to complete the significand, an 8-bit exponent, and one sign bit. A characteristic of these two encoding formats is that the number in FP32 format can be converted to a BF16 format by dropping the 16 less significant bits of the 23-bit fraction, with rounding in some embodiments to select the lower order bit.

System Block Diagram

Figure 2:
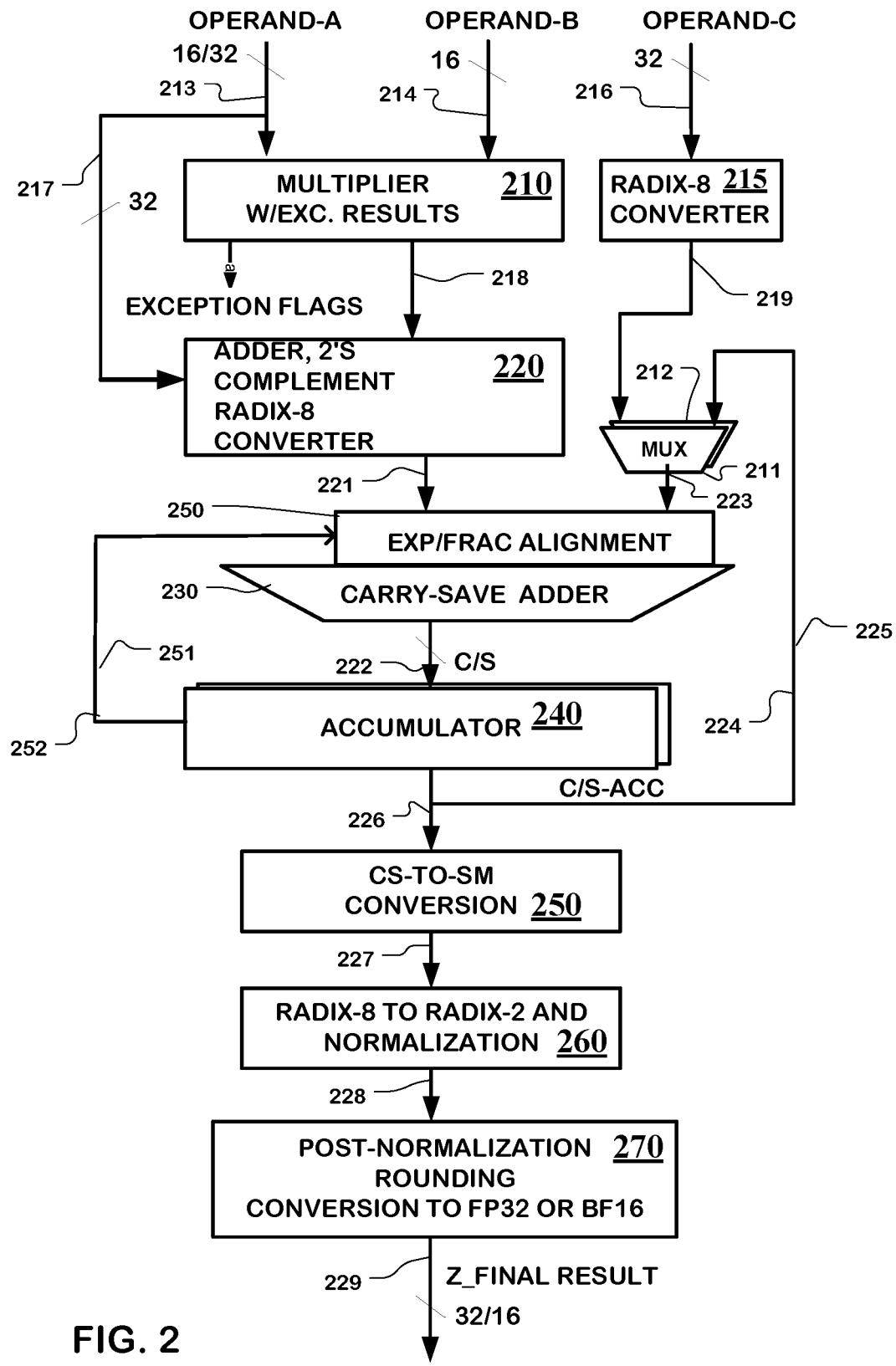
FIG. 2 illustrates a high-level block diagram of the floating point multiply-add, accumulate unit with carry-save accumulator in BF16 and FP32 format.

FIG. 2 is a high-level block diagram of a floating point multiply-add, accumulate unit with carry-save accumulator in BF16 and FP32 format. Operand-A 213 is illustrated as either a BF16 format or an FP32 format 217. Operand-B 214 is a BF16 format and is a first input to the Multiplier circuit 202. The second input is a BF16 Operand-A 213. Operand-A and Operand-B can occupy a single 32-bit register, using 16-bits each, when both Operand-A and Operand-B are in BF16 format, representing multiplier and multiplicand inputs to the multiplier. The product (A*B) output of the Multiplier circuit 210 is produced in the Carry-Sum form on line 218, which is the input to a Final Adder in block 220. Block 220 also converts the result into 2's complement form, and a includes Radix-8 Converter circuit to support radix-8 operations.

When the pipeline is operated in a single 32-bit addition, one operand, Operand-A can bypass the Multiplier circuit 202, while the second operand C for the addition, comes from line 216.

Operand-C 216, in this example, is a 32-bit operand, and it is input to a Radix-8 Converter 215 which outputs a result on line 219 to the first input of one of the Multiplexers 210 and 211. The second inputs to the Multiplexers 210 & 211 are the two buses for the carry and sum values C/S-ACC on lines 224 and 226 (and exponents not shown) fed back from the output of Accumulator 240. The Multiplexers 211 and 212 output the exponent and significand as two values to the bus 223.

A Carry-Save Adder 230 receives the output of block 220 on line 221, and the output of the multiplexers 211, 212 on bus 223. The Carry-Save Adder 230 outputs the exponent and C/S values of the sum on twin bus 222 which enters the Accumulator 240. The Accumulator 240 provides C/S-ACC exponents and significands in carry-save form on output buses 224 and 225 which feedback to the Multiplexer 211, Multiplexer 212, and provides the C/S-ACC exponents and significands in carry save form on and bus 226 to the Carry-Save to Sign-Magnitude Conversion block 250, which performs a final add of the carry and sum values of the significand on bus 226, and converts the resulting significand to sign-magnitude format on bus 227. Buses 252 and 251 carry data from the Accumulator 240 to the Carry-Save to Sign-Magnitude Conversion block 250.

A Radix-8 to Radix-2 Conversion and Normalization block 260 has an input on bus 227 and outputs normalized results on bus 228 to the Post-Normalization, Rounding, and Conversion to FP32 or BF16 block 270 which converts the output into FP32 or BF16 format on bus 229. The operations output the result "Z" on bus 229 in either 32-bit FP32 format or 16-bit BF16 format.

Thus, FIG. 2 illustrates an example of a circuit which can be implemented as a multistage pipeline configured to execute in three modes, including a multiply-and-accumulate operation for a sequence of input floating point operands. The circuit can be configured as a pipeline in this example including a first stage including a floating point multiplier with sum-and-carry outputs, a second stage including a multiplier output adder for the sum-and-carry outputs of the multiplier and circuits to convert the multiplier adder output to radix-8 format with a 2's complement significand, a third stage including a significand circuit and an exponent circuit of an accumulator adder, a fourth stage to convert the accumulator sign bit, an accumulator exponent and accumulator significand sum-and-carry values to a sign-magnitude significand format, a fifth stage to convert the sign-magnitude significand format from radix-8 alignment to radix-2 alignment, and produce a normalized exponent and significand, and a sixth stage to perform rounding and conversion to a standard floating point representation.

The technology described herein provides a multiply-and-accumulate method to calculate a summation S(i) of terms A(i)*B(i), where (i) goes from 0 to N−1, and N is the number of terms in the summation. The method can comprise receiving a sequence of operands A(i) and operands B(i) in floating point encoding format, for (i) going from 0 to N−1; multiplying operand A(i) and operand B(i) to generate term A(i)*B(i) in a format including a multiplier output exponent and a multiplier output significand, and converting the multiplier output significand to a 2's complement format; using a carry-save adder to add the 2's complement format significand of term A(i)*B(i) to a significand of summation S(i−1), and generate sum-and-carry values for summation S(i); selecting an exponent of summation S(i) from the multiplier output exponent of A(i)*B(i) and the exponent of summation S(i−1), to generate exponent of summation S(i); and converting the sum-and-carry values and the exponent of summation S(i) to a normalized floating point encoding format.

Also, the method can include providing the multiplier output exponent and multiplier output significand of term A(i)*B(i) in a radix-8 format, and generating the sum-and-carry values and the exponent of summation S(i) in radix-8 format before converting to the normalized floating point encoding format, which can be radix-2.

The alignment required in the accumulate addition stage depends on a number of conditions, including summation S(i−1) significand overflow, summation S(i−1) sign extensions and difference between the exponents of the addends: term A(i)*B(i) and summation S(i−1). These conditions can be determined and combined for use for alignment in a same pipeline cycle (e.g., the third stage in the six stage example), enabling fast execution and faster pipeline clocks. In an embodiment provided herein, the unit executes a method to calculate a summation S(i) of terms A(i)*B(i), where (i) goes from 0 to N−1, and N is the number of terms in the summation, the method comprising:

receiving a sequence of operands A(i) and operands B(i) in floating point encoding format, for (i) going from 0 to N−1;

multiplying operand A(i) and operand B(i) to generate term A(i)*B(i) during a first pipeline cycle in a format including a multiplier output exponent of term A(i)*B(i) and a multiplier output significand of term A(i)*B(i), and comparing during the first pipeline cycle the multiplier output exponent of term A(i)*B(i) to an accumulator output exponent of summation S(i−1) to generate comparison signals for summation S(i);

adding the term A(i)*B(i) to the summation S(i−1) to generate a summation S(i) during a next pipeline cycle in a format including an accumulator output exponent of summation S(i) and an accumulator output significand of summation S(i), wherein said adding includes determining the accumulator output exponent for summation S(i) and shifting one or both of the accumulator output significand of summation S(i−1) and the multiplier output significand of term A(i)*B(i) as a consequence of said comparison signals for summation S(i).

Executing the step of comparing during the first pipeline cycle the multiplier output exponent of term A(i)*B(i) to an accumulator output exponent of summation S(i−1) to generate comparison signals for summation S(i), while executing the adjustments to the operands in a next pipeline cycle (early exponent compare) enables use of a pipeline having an accumulator stage with a shorter critical timing path and operable at higher clock speeds.

Floating Point Multiplier

The Floating point Multiplier includes exponent circuits and significand circuits. The Exponent part performs addition of operand exponents, while the significand part performs binary multiplication of the operand significands. The operands entering the multiplier are "normalized" floating point numbers, where the first bit is 1. Therefore, the operand significand (m) is between 1≤m<2, meaning it is greater or equal to 1, and less than 2. As such, the product of the two operand significands is in the range of is 1≤p<4 and can never be equal to or greater than 4.

If the product p, which is the result of the significand multiplication, is in a range of 2≤p<4, the exponent will be incremented, and the significand shifted one binary position to the right for normalization.

Figure 4A:
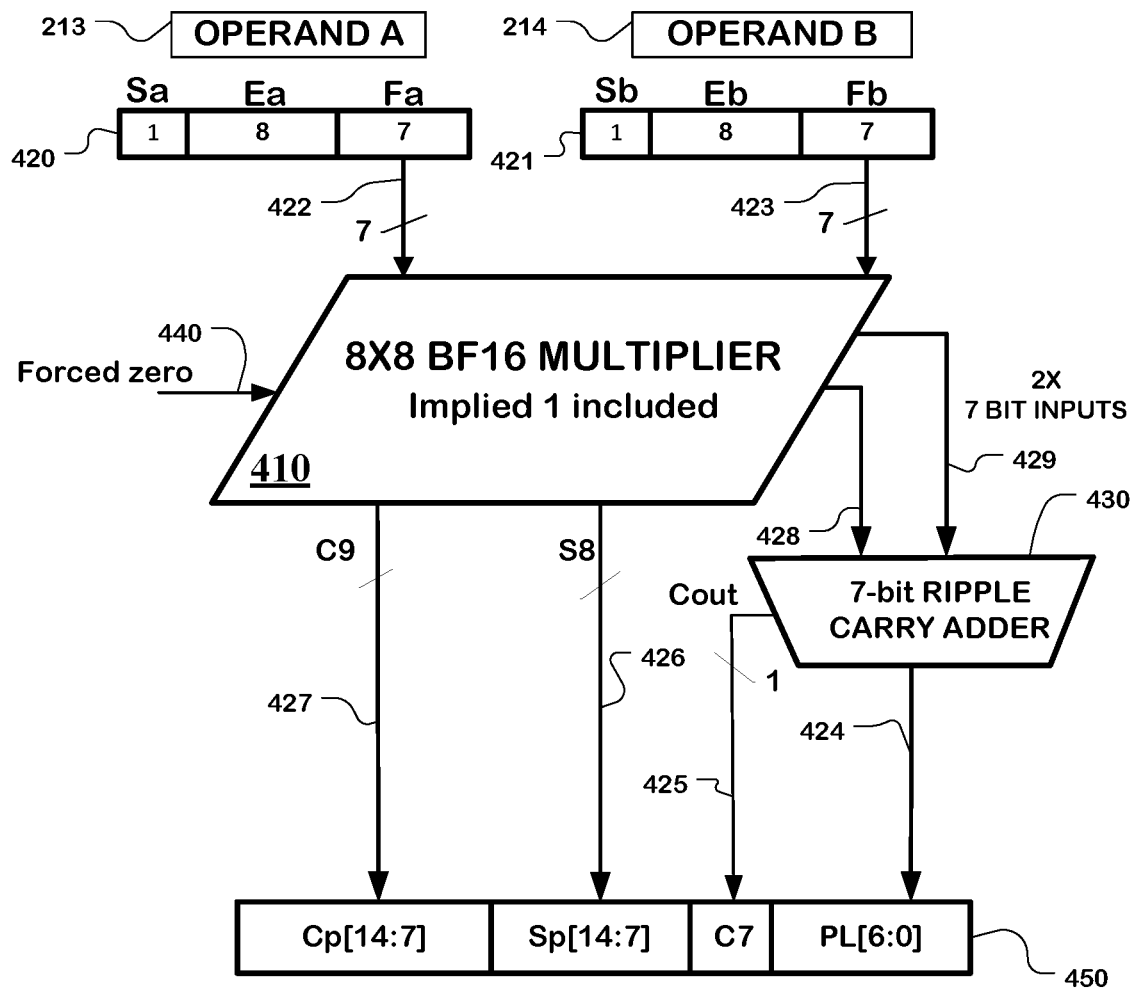
FIG. 4a illustrates an example Multiplier & Adder block comprising an 8×8 Multiplier Partial Product Reduction Tree.

The first pipeline stage performs addition of exponents and multiplication of operand significands using an 8×8-bit integer multiplier including carry-save adders for the partial products. The result from the multiplier array, after summing all the partial products using the carry-save adders, can include two parts: 8-bits of Sum and 9-bits of Carry from carry-save adders for the partial products in the most significant portion of the multiplier array, and an 8-bit product from the least significant portion of the multiplier array. Partial products for the 8-bits in the least significant portion are added together in this example using a ripple-carry adder, as the bits arrive from the partial product reduction tree. This summation can be done using a Ripple-Carry Adder, because the time arrival profile from the least significant portion of the multiplier is such that bits arriving in time from the Least Significant Bit (LSB) to the Most Significant Bit (MSB), of that portion, make a ripple-carry adder adequate. Applying a Ripple-Carry Adder (RCA), reduces the complexity of the multiplier significantly (FIG. 4a).

This stage includes a multiplier circuit to provide multiplier significand and multiplier exponent values prior to the pipeline clock in response to first and second input operands which are registered on the pipeline clock. The multiplier circuit includes a significand multiplier circuit and an exponent adder circuit, the significand multiplier circuit having a carry-save adder for partial products used to generate carry-and-sum values to generate higher order bits of the multiplier output significand and a ripple-carry adder for partial products used to generate lower order bits of the significand carry-and-sum outputs. Also, the multiplier circuit includes a radix-8 conversion circuit to convert the multiplier significand and multiplier exponent values to radix-8 format for the multiplier output exponent and significand; and a 2's complement conversion circuit to convert the multiplier significand value to a 2's complement representation for the multiplier output significand.

Figure 4B:
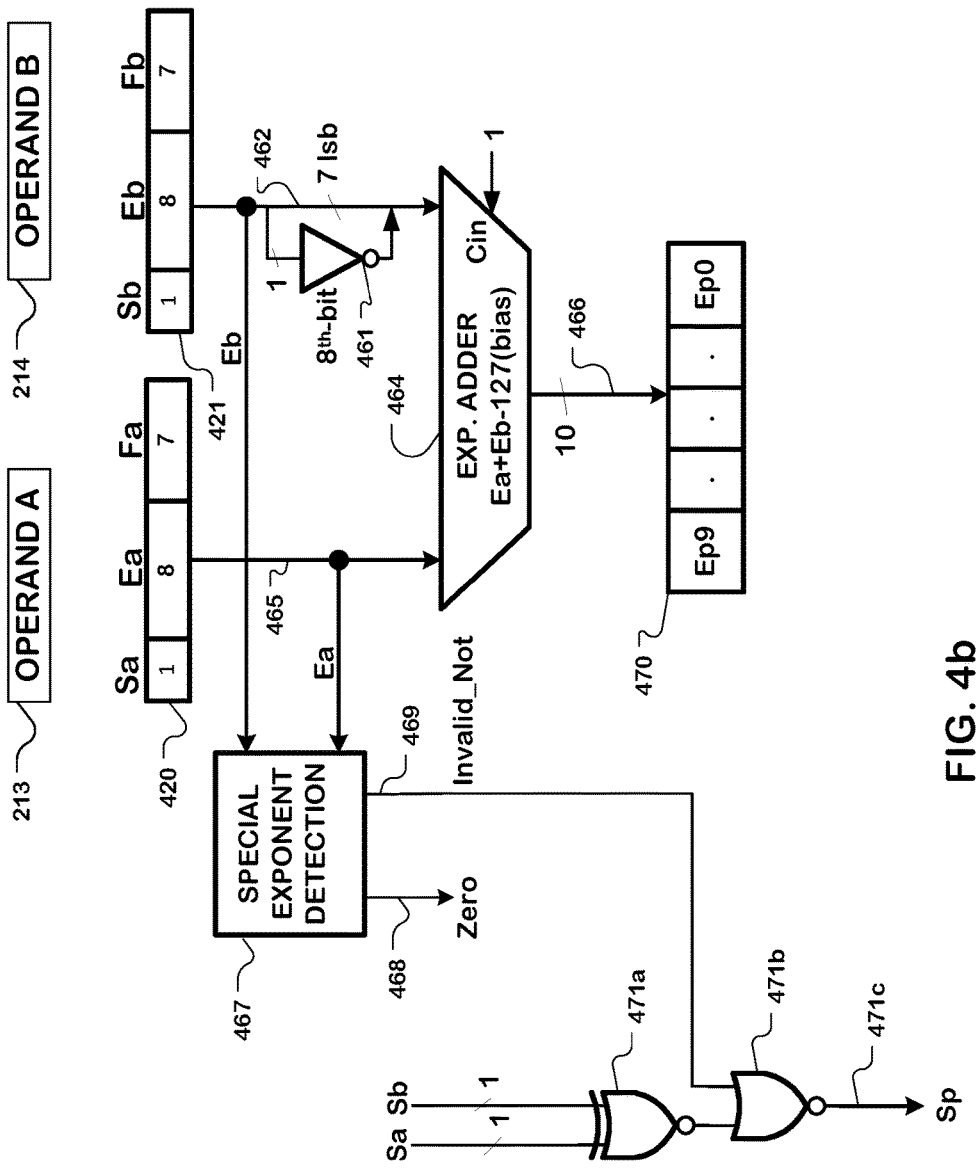
FIG. 4b illustrates an example Exponent Unit with Special Exponent Detection block.

The exponents are added separately. Both exponents are positive numbers larger than zero. When the addition result is a number greater than 256, an indication is the carry-out signal from the exponent adder. If the resulting exponent is equal to 255, the positive infinity indication is asserted. If the exponent equals zero, the significand is set to zero, according to the IEEE 754 standard rules. In this implementation, if the exponent of the product is 0, the significand of the result is forced 0, thus representing +/−zero floating point number (FIG. 4b). In other embodiments, sub-normal numbers may be treated differently.

The exponent addition requires subtracting 127 from the result, since both operands contain a 127 bias in the BF16 and FP32 encoding formats. The conversion process is made faster by adding 129 to the result, which is achieved by inverting the MSB of the exponent of one of the inputs and introducing 1 into the carry input of the adder. This greatly simplifies the circuit and can reduce time required for the pipeline stage (FIG. 4b).

We prove the correctness of this procedure in the following way: the addition results in two biases of 127 being added, making bias to be 254. However, since the carry-out of the adder, which amounts to 256, is ignored, the resulting bias will be −2. We can make up to 127 by adding 129 to the result of the operation. This is achieved by inverting the MSB of an operand, which in the case of a negative operand is equivalent to adding 128, as the MSB position contains zero. In the case of a positive operand, where MSB is equal to one, this is also equivalent to adding 128. An additional 1 at the carry input makes the result to be biased by: −2+129, which is equal to the required 127 bias.

The same pipeline stage converts the result into a radix-8 number which contains a 5-bit exponent, and a significand appropriately shifted 7 positions to the right. Conversion to a 5-bit exponent requires a shift left from the 7th position, for the amount represented by the value of the remaining 3 exponent bits. This requires the significand to be passed through a left shifter which will shift the significand from 0 to 7 bit positions to the left as required by the 3-LSB bits of the 8-bit exponent. (FIG. 5b)

A multiplier saves compute time by recognizing that the signal arrival profile originating from a Partial Product Reduction Tree (PPRT) is uneven. The LSB bit arrives first, followed by the next one and so on for the first 8 least significant bits (LSB) of the PPRT. Because of the unequal arrival profile, the addition of the LSB portion can be masked ("hidden") under the delay of the multiplier array, thus providing savings (in terms of time) for a pipeline stage (e.g. the second pipeline stage in the example outlined above. Summing the LSB portion uses an 8-bit Ripple-Carry Adder (RCA) to reduce the size of the Carry-Propagate Adder (CPA) using carry-save adders for the partial products from 17 to 9 bits. The MSB portion used in a next pipeline stage, includes a final adder which is only 9 bits long. The significand of the product is formed in a pipeline stage by adding the most significant 9 bits from the final adder and augmenting it with the least significant 8 bits previously formed in using the ripple-carry adder of the preceding pipeline stage (FIG. 4a).

Figure 3:
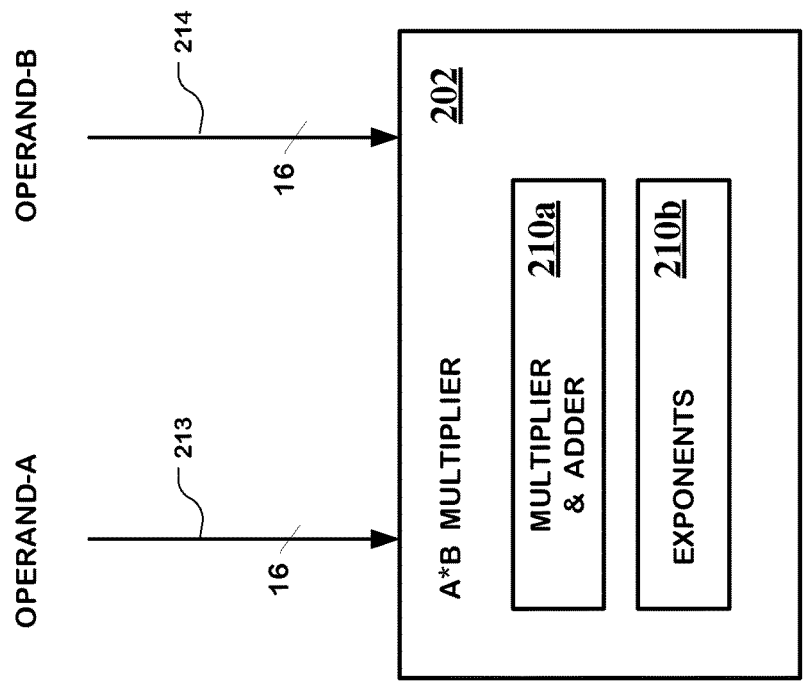
FIG. 3 illustrates a hierarchical block diagram of a Multiplier circuit with two inputs, Operand-A and Operand-B.

FIG. 3 is a simplified block diagram 300 of a Multiplier circuit 202 with two inputs, Operand-A on line 213, and Operand-B on line 214. The Multiplier circuit 202 comprises two blocks, Multiplier & Adder block 210a and the Exponents block 210b.

FIG. 4a illustrates an example of a Multiplier & Adder block 210a, showing an 8×8 Multiplier Partial Product Reduction Tree with carry-save adders for partial products of the more significant bits without a Final 16-Bit Adder (provided in the next stage) with a 7-LSB Ripple-Carry Adder block for partial product additions of the less significant bits. Operand-A 213 is stored in a register 420 comprising three fields: Sa, Ea and Fa. Sa is the sign bit. Ea is the eight exponent bits and Fa is the fraction part of the significand. The Fa field is applied on line 422 to a first input to the 8×8 BF16 Multiplier circuit 410. Operand-B 214 is stored in a register 421 comprising three fields: Sb, Eb and Fb. Sb is the sign bit. Eb is the eight exponent bits and Fb is the fraction part of the significand. The Fb field is applied on line 423 to a second input to the 8×8 BF16 Multiplier circuit 410. The input to the Multiplier circuit 410 on line 440 is a forced zero bit, which, when zero, forces 8×8 BF16 Multiplier circuit to produce zero output.

The 8×8 BF16 Multiplier circuit 410 outputs two 7-bit LSB buses, 428 and 429, which are the inputs to a 7-bit Ripple-Carry Adder 430. Also, the 8×8 BF16 Multiplier circuit 410 outputs eight sum bits S8 426, and nine carry bits C9 427. The 7-bit Ripple-Carry Adder 430 outputs 7 bits on line 424 and a carry-out bit COUT on line 425 into register 450. The register 450 has the following mapping: line 424 maps to PL [6:0], COUT on line 425 to C7, S8 on line 426 to Sp [14:7] and C9 on line 427 to Cp [14:6].

FIG. 4b illustrates an example Exponent Unit (e.g. 210b of FIG. 3) with Special Exponent Detection block 467. Operand-A 213 is in register 420 as in FIG. 4a, and Operand-B is in register 421 as in FIG. 4a. Ea on line 465 is one input to a Special Exponent Detection Block and to the Exponents Adder circuit 464. Eb on line 462 is a second input to a Special Exponent Detection Block. The seven least significant bits of Eb on line 462 are input to the Exponents Adder circuit 464 and the 8th-bit is inverted by inverter 461 before entering the Exponents Adder circuit 464 in the 8th-bit position. A carry in value is set to "1" for the Exponents Adder circuit 464.

The Exponents Adder circuit 464 operates on Ea 465 and Eb 462, adding them together and subtracting the bias value of 127. The output is a 10-bit value 466 to register 470. Two extra bits, beyond the necessary 8 bits for encoding the exponent, are carried to detect an exponent overflow situation. Those 10 bits are further examined in the Exponent Exception Processing circuit 524, shown in FIG. 5C.

The input exponent signals are examined in the Special Exponent Detection block 467 for being Zero as indicated by a signal on line 468, or Invalid as indicated by a signal on line 469. Sign bits Sa and Sb from registers 420 and 421 are input to an XNOR gate 471a, the output of which is applied to XNOR gate 471b. Also, the Invalid signal on line 469 is input to XNOR gate 471c. If the Invalid signal is zero, the resulting sign is an XOR function of Sa and Sb. If the Invalid is true (equal "1") the product sign Sp is set to "zero", as specified in the encoding standard.

Base-8 Conversion

Figure 5A:
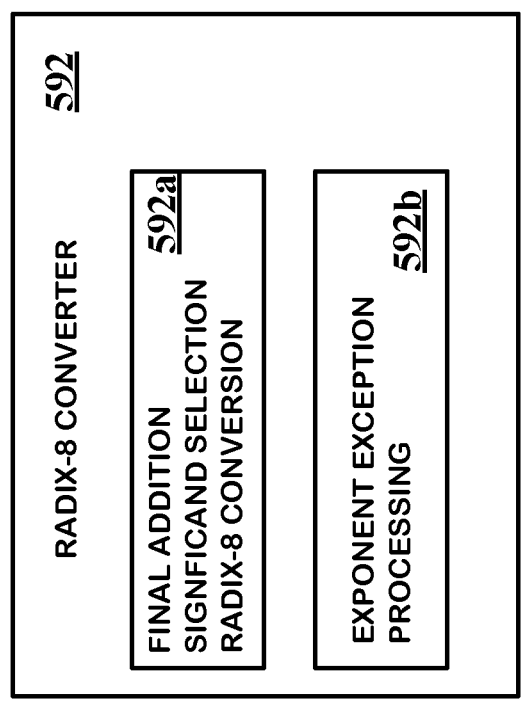
FIG. 5A illustrates a hierarchical block diagram showing a Base-8 Converter comprising an example Final Addition, Significand Selection and Base-8 Conversion block and an example Exponent Exception Processing block.
Figure 5B:
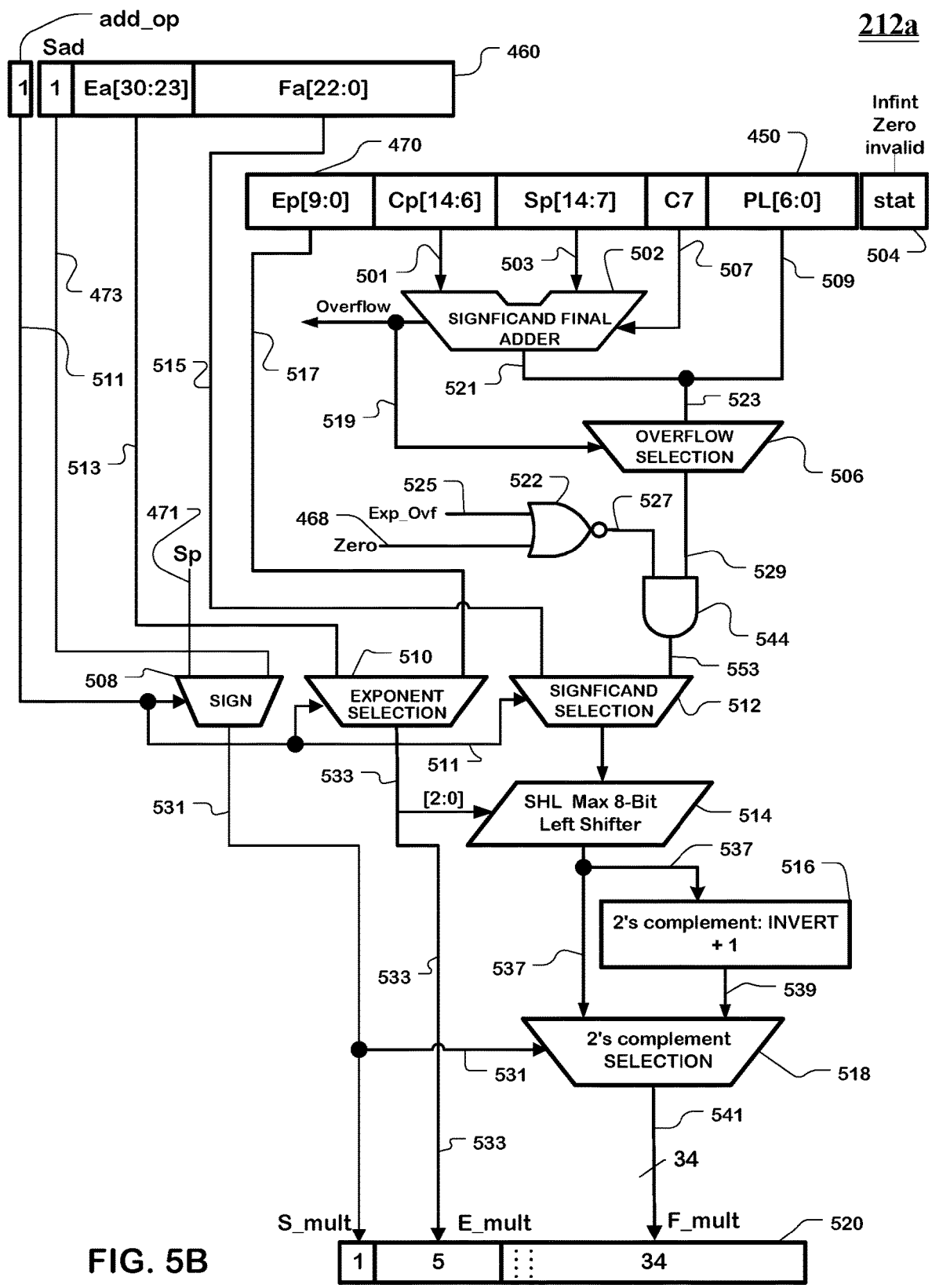
FIG. 5B illustrates an exemplary schematic representation of the final partial product addition, Significand Selection and Base-8 Conversion block.

FIG. 5A is a simplified diagram showing a Radix-8 Converter block 592 (e.g. block 220 of FIG. 2). The Radix-8 Converter block 592 comprises two sub-blocks, in this example, the Final Addition, Significand Selection and Radix-8 Conversion sub-block 592a and Exponent Exception Processing sub-block 592b.

Conversion to Radix-8, 2's Complement Significand

External input Operand-A is converted to a Radix-8 encoding in the second pipeline stage. The operand-A significand is converted into a 2s complement significand. The significand is extended to 34 bits, including two significand sign bits. The resulting pipeline register 520, shown in FIG. 5b, comprises a 5-bit exponent, a 34-bit significand, and two additional status bits for a total of 41 bits.

Conversion to Radix-8 is implemented using the last 3 bits of the exponents to align the 24-bit Operand significand from register 450 of FIG. 4a, into a 32-bit radix-8 significand, where the LSB of the significand aligns with the LSB of the 32-bit significand, if the 3-LSB of the exponent are equal to zero (i.e., shifted 8 positions to the right from the binary point). Any value represented by the 3-LSB of the exponent is the amount for which the significand shifts to the left (from the 8th bit position), to compensate for those bits truncated from the exponent. The rest of the bits up to the binary point, and two bits beyond, are filled with sign extension bits. In the case where all three exponent LSBs are b' 1, i.e., equal to decimal 7, the first significant bit of the 32-bit significand will be a non-zero bit, i.e., normalizes the significand. Since the significand is represented as 2's complement, two extra bits to the left of the significand point will be used to store sign bits (including an extended sign bit). An additional second sign bit is used, instead of one, in order to preserve the sign because of a possible overflow situation which results in a 2-bit integer overwriting the lower sign bit (FIG. 5b).

Depending on the sign of the product, the significand is either passed through, or it is inverted, to create 2's complement negative representation of the significand. This implementation differs from IEEE 754 where a significand can be positive or negative. This operation is performed by adding a sign bit to the 24-bit significand and inverting the bits if the sign is equal to 1 (negative).

Figure 5C:
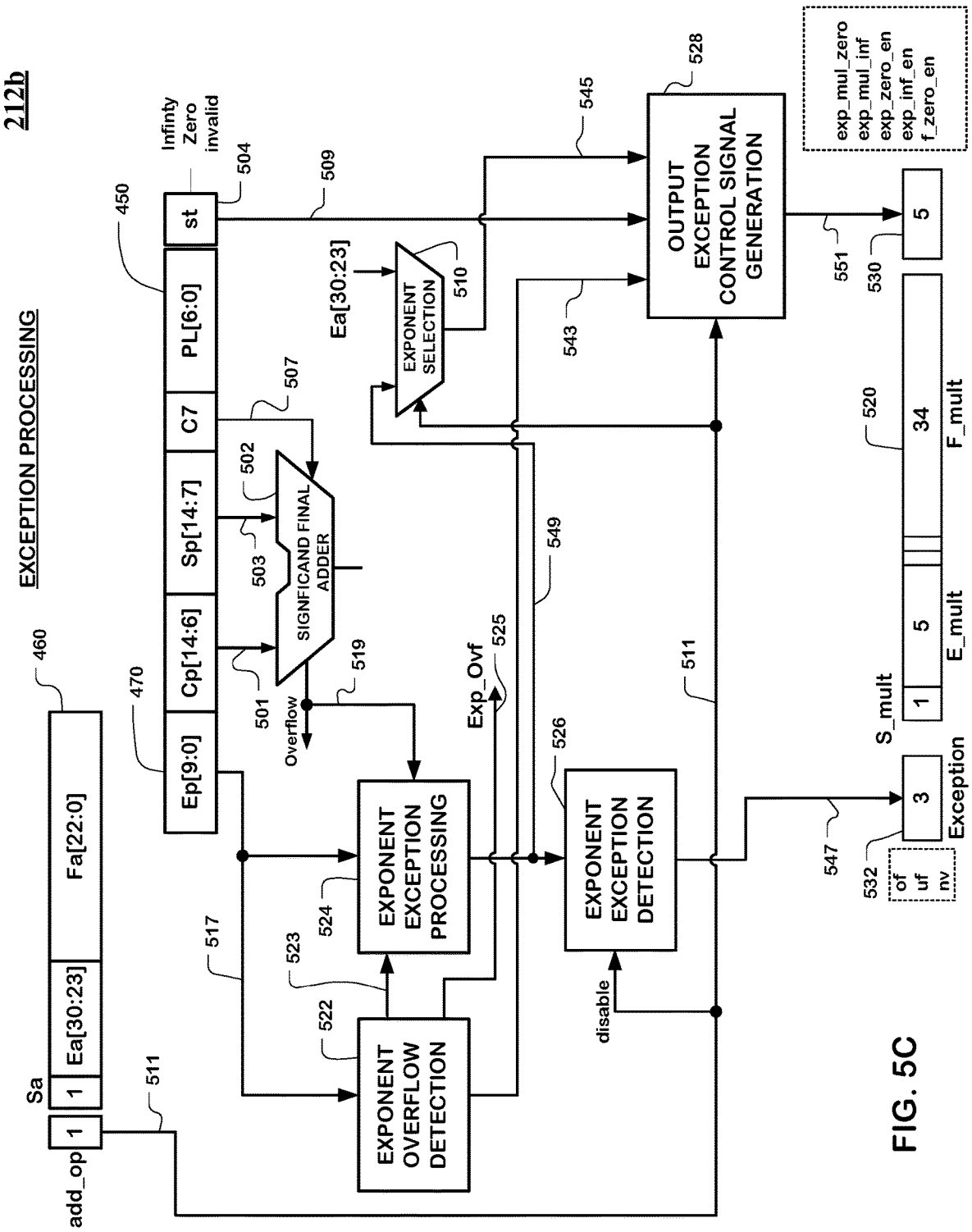
FIG. 5C illustrates an exemplary schematic representation of an Exception Processing block.

The exponent is checked for values between −126 to 126. If greater than 126, it is treated as infinity, or if less than −126 it is a denormalized number (less than −126) and converts to zero (FIG. 5c).

In some implementations, a final register of this stage of the pipeline contains a normalized floating point product with 5-bit exponent and 34-bit 2's complement significand, (containing duplicate sign of the product, and without the implied 1) and three exponent status bits.

FIG. 5B illustrates an exemplary schematic representation of the final partial product addition, Significand Selection and Radix-8 Conversion sub-block 592a. Register 450 (FIG. 4a) comprises fields for PL [6:0], C7, Sp [14:7], and Cp[14:6]. Register 470 (FIG. 4b) comprises fields for the 10-bit Product Exponent (Ep) value. Register 504 includes a status bit.

In the case the pipeline is operated in the FP32 addition mode, Operand-A is in FP32 format and it bypasses the multiplier. In this case Operand-A originates from the register 460, occupying two combined 16-bit registers, 420 and 421. An add_op control signal on line 511 indicates when the pipeline mode is set for Addition (Single Precision Floating point in this example) or Accumulation.

A Significand Final Adder circuit 502 receives as input Sp[14:7] on line 503, Cp[14:6] on line 501 and the carry bit C7 on line 507, outputting an Overflow signal 519 to the Overflow Selection circuit 506. The Overflow Selection circuit 506 has input bus 523 which is a combination of PL[6:0] on line 509 and the Significand Final Adder circuit 502 output on line 521. A NOR gate 522 has the inputs Exponent Overflow bit on line 525 and Zero force bit on line 468 and outputs the signal on line 527. The signal on line 527 and the bus 529 output by the overflow selection circuit 506, route into an AND gate 544, which sets the Significand to all zeroes in case of an exponent overflow, as well as in case the Significand is forced to zero. Further, the Significand Selection circuit 512 chooses between the bypass significand Fa [22:0] on bus 515 or the AND gate 544 output on bus 553 using the add_op control signal on line 511.

An Exponent Selection circuit 510 chooses between the 8 exponents bits, Ep [7:0] on line 517 or the bypass exponent bits Ea[30:23] bits on line 513 and outputs the selected exponent on line 533 to the E_mult field of register 520. A sign bit selection circuit 508 receives the Sp sign bit (FIG. 4*b*) and the bypass sign bit Sa on line 473, as inputs, and outputs a sign bit 531 to the S_mult field in register 520.

The add_op control signal on line 511 routes to the Significand Selection circuit 512, the Exponent Selection circuit 510, and the Sign bit selection circuit 508 for their control inputs.

Output from the Significand Selection circuit 512, enters 8-bit Left Shifter circuit 514. The lower three bits [2:0] of the line 533 from the Exponent Selection circuit 510 output on line 533 control the 8-bit Left Shifter circuit 514. The 8-bit Left Shifter circuit 514 output bus 537 feeds into multiplexer circuit 518 which chooses between input on line 537 (in case the significand is positive) and line 539 (in case the significand is negative). This is selected by the sign bit 531. 2's compliment Invert+1 circuit 516 creates 2's complement of the shifter output on line 537 and outputs the complemented values on line 539. The output of the Multiplexer circuit 518 on line 541 enters the pipeline register 520 in a 34-bit F_mult significand. This process converts the selected significand into 2's complement represented significand which is 32 bits long with 2 sign bits, stored in the pipeline register 520.

FIG. 5C illustrates a block diagram of Exponent Exception Processing sub-block 592*b*. A Significand Final Adder circuit 502 receives the inputs Sp[14:7] 503, Cp[14:6]501 and the carry bit C7 507 from register 450 as described with reference to FIG. 5*b*. Overflow output of the Significand Final Adder circuit 502 is connected to the Exponent Exception Processing circuit 524. Upon detection of overflow conditions, the Significand Final Adder circuit 502 asserts the Overflow signal 519 as a first input to the Exponent Exception Processing circuit 524. A second input to the Exponent Exception Processing circuit 524 is the exponent bits Ep [9:0] (sum of input operand exponents) from register 470 on bus 517. A third input is the Exponent Overflow Detection circuit 522 output signal on line 523. The output of the Exponent Exception Processing circuit 524 is then input on line 549 to the Exponent Exception Detection circuit 526, and the exponent selection circuit 510 (described with reference to FIG. 5*b*).

The exponent bits Ep [9:0] on a bus 517 are input to the Exponent Overflow Detection circuit 522 which detects the overflow conditions:

exp_ovf=Ec[8]: meaning that if bit 8 is one, there is overflow on exponent detected, exp_povf=~Ec[9] & Ec[8]: If bit 9 is zero and bit 8 is one; Positive Overflow, exp_novf=Ec[9] & Ec[8]: If both bit 9 and bit 8 are one; Negative Overflow.

The first output on line 523 of circuit 522 routes to the Exponent Exception Processing circuit 524, a second output on line 543 routes to the Output Exception Control Signal Generation circuit 528, and a third output includes the Exponent Overflow bit on line 525 to the gate 522 in FIG. 5B.

The Exponent Exception Detection circuit 526 outputs, for example via bus 547, an exception to register 532 including the following three bits: of (overflow); uf (underflow); and nv (not valid).

This occurs on the detection of the following conditions:
of (Overflow)—Meaning if Ec is 11111111, and no Infinity is detected, it is interpreted as Overflow.
uf (Underflow)—Meaning if Ec is 00000000 and Zero (Significand) is not signaled, it is Underflow situation.
nv(Invalid) '1'—Meaning result is Invalid.

The Output Exception Control Signal Generation circuit 528 has four inputs. The first input is the add_op control signal on line 511 which indicates the accumulate or bypass add mode, the second input is the status bit on line 509 (infinity, zero, or invalid), the third input on line 545 routes from the Exponent Selection circuit 510 which multiplexes between the Ea[30:23] bits of register 460 or the output of the Exponent Exception Processing circuit 524, and the fourth input is from a second output on line 543 of the Exponent Overflow Detection circuit 522. The Output Exception Control Signal Generation circuit 528 outputs five bits on line 551 representing exp_mul_zero, exp_mul_inf, exp_zero_en, exp_inf_en, and f_zero_en, which are stored into the register 530.

exp_mul_zero meaning: Multiplier Product Exponent is Zero, exp_mul_inf meaning: Multiplier Product Exponent is Infinity exp_zero_en meaning: Enabled when (one of the multiplier input Exponent is Zero, and both of the multiplier input Exponents are not Zero), or Multiplier product Exponent has negative overflow, exp_inf_en meaning: Enabled when one of the multiplier input Exponent is Infinity, or Multiplier product Exponent has positive overflow f_zero_en meaning: Enabled when exp_zero_en signal is Enabled or Multiplier product Exponent has overflow (Positive or Negative) or when the Multiplier product Exponent is Zero.

Carry-Save Accumulation Unit

Figure 6:
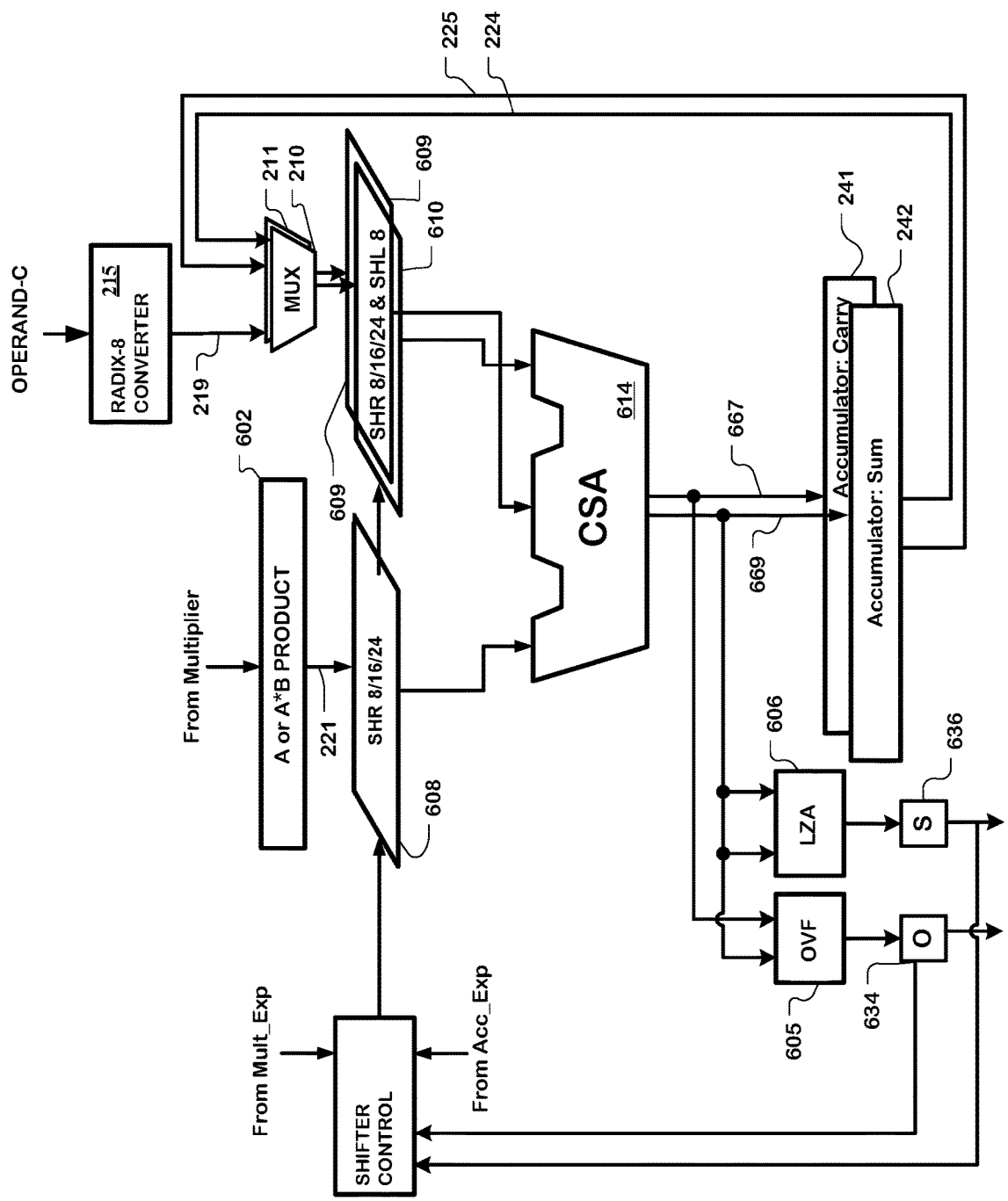
FIG. 6 illustrates a high-level hierarchical block diagram of the Carry-Save Accumulation Unit.

FIG. 6 illustrates a block diagram 600 of a Carry-Save Accumulator (e.g. 240 of FIG. 2) for the significands. A Radix-8 Converter 215 receives Operand-C as an input and outputs operand C in Radix-8 format on line 219 to the Multiplexer 210 and Multiplexer 211. Two additional inputs to the Multiplexers 210 & 211 are the buses 224 & 225 fed back from the accumulator Sum register 242 and accumulator Carry register 241. The outputs of the Multiplexer 210 and Multiplexer 211 route to the shifter circuits 609 & 610 which execute a shifting right 8/16/24 bits or shifting left 8 bits. The outputs of shifter circuits 609 & 610 route to the Carry-save Adder circuit (CSA) 614. The Carry-save Adder circuit 614 has a third input from the shift right circuits for 8/16/24 circuit 608 whose input is either the product of a A*B (BF16) or the A (FP32) operand alone, 602. The outputs of the Carry-save Adder circuit 614 on lines 667 and 669 route to a LZA circuit 606 which provides an output to an S-bit register 636, and to Overflow Detection block 605 which provides an output to the O-bit register 634.

The carry-save accumulation unit includes a significand circuit receiving at a first pipeline clock for cycle (i) a multiplier output significand of term A(i)*B(i) and feedback sum-and-carry values of a previous accumulator output representing summation value S(i−1). The significand circuit includes a 2's complement, carry-save adder, to generate sum-and-carry accumulator output significand values for summation S(i) on a second pipeline clock. The carry-save accumulation unit includes an exponent circuit receiving, at the first pipeline clock, a multiplier output exponent of term A(i)*B(i), and a fed back exponent value of a previous accumulator output representing summation value S(i−1), to generate an accumulator output exponent value on the second pipeline clock for summation value S(i). The significand circuit includes a significand shifter, responsive to exponent comparison signals, stored at the first pipeline clock, to align the multiplier output significand and the feedback sum-and-carry values for addition. The exponent circuit is responsive to the exponent comparison signals, stored at the first pipeline clock, to generate the accumulator output exponent value. The pipeline includes exponent comparison circuits to compare, prior to the first pipeline clock, the multiplier output exponent of term A(i)*B(i) to the fed back exponent value of summation S(i−1), to generate the exponent comparison signals stored at the first pipeline clock.

The carry-save accumulation unit in this embodiment includes an overflow detector circuit to generate a first condition signal indicating an overflow condition for at least one of the fed back sum-and-carry values at the first pipeline clock, and a leading sign bit detector circuit to generate a second condition signal indicating that at least one of the fed back sum-and-carry values has more than, or equal to, a number 8 of extended sign bits at the first pipeline clock. The exponent circuit and significand circuit are also responsive to the first condition signal and the second condition signal. The overflow and leading sign bit adjustments and exponent comparison adjustments are combined for implementation by shifters in a same pipeline cycle, as described with reference to Table 1: CSA Unit Control below.

Also, this stage of the pipeline has an accumulator mode and a summing mode, and includes a selector to provide the fed back accumulator output in the accumulator mode, and to provide a third floating point input operand in the summing mode to the significand circuit and exponent circuit. The significand circuit can include a significand shifter, responsive to exponent comparison signals stored at the first pipeline clock, to align in the accumulator mode the multiplier output significand and the fed back sum-and-carry values for addition, and to align in the summing mode the multiplier output significand and a significand of the third input operand for addition. The exponent circuit is responsive to the exponent comparison signals stored at the first pipeline clock, to generate the accumulator output exponent value. The pipeline includes exponent comparison circuits to compare, prior to the first pipeline clock, the multiplier output exponent to the fed back exponent value in the accumulator mode, and to compare the multiplier output exponent to an exponent of the third input operand in the summing mode, to generate the exponent comparison signals stored at the first pipeline clock.

Significand Circuit:

There are two paths in the Carry-Save Adder (CSA) significand stage: The Accumulator path where the operand from the accumulator can shift to the right for 8, 16 or 24 bits and can shift to the left for 8 bits, and the Multiplier path where the operand from the multiplier can shift to the right for 8, 16 or 24 bits. Shifting right for 8, 16 or 24 bits corresponds to the exponent difference of 1, 2 or 3, between the operands, when using a radix-8 exponent. Shifting Left for 8-bits is done when the carry-save adder outputs a number in which sign extension exceeds 8-bits.

If the difference between operand exponents is greater than 3, that means that one of the operands shifts to the right over 24 bits, which aligns the operand too far to the right to be within the range of the greater operand. This case is equivalent to adding zero to the greater operand, or simply passing the greater operand to the accumulator unchanged using a bypass multiplexer (FIG. 7c).

This implementation eliminates the bypass multiplexer by adding zero to the CSA when the difference in the exponents is greater than 3, and is equivalent to bypassing the operand. Inputs to the CSA are from both the multiplier as well as the accumulator and are gated by AND gates. The Shifter and Exponent Control Unit detects this situation and sets the appropriate operand to zero. This implementation saves one multiplexer stage in each path.

Detection of sign extension occurs after the 3:2 Carry-Save Adder stage. The sign extension bit S, and the overflow bit O are set if the situation is detected, and it is handled in the following pipeline clock. In order not to lose the sign bit due to overflow, a duplicate sign is carried thought the computation. The additional complexity is introduced to increase precision. This involves extending the accumulator to 36 or 40 bits. In another implementation, introducing detection logic improves timing and accuracy. The detection logic takes inputs from three inputs, 683, 685, 689 to the Carry-save Adder circuit (CSA) 614, as opposed to two outputs of the Carry-save Adder circuit (CSA) 614, and is subject of another related disclosure.

Exponent Circuit:

An "Exponent Control Unit" compares the exponent difference between a first exponent operand from the Multiplier and a second exponent operand from the Accumulator. The Exponent Control Unit checks conditions resulting from comparing Multiplier and Accumulator exponents and selects the operand path according to Table 1. Simultaneously, the new accumulator exponent is determined and stored into the Exponent Accumulator (Eacc) register 654 (FIG. 7b).

The exponent part has two branches: left and right branch. The left branch, consisting of inputs 671 and 673 (into the OR gate), selects the greater of the two exponents, which then becomes the resulting exponent. This condition is selected according to the Table 1. The right branch consisting of inputs 675 and 677 (into the exponent output OR gate) will select Ea+1 or Ea−1 according to the conditions described in Table 1. If significand Overflow is signaled, the accumulator significand should be shifted 8-bits to the right (SHR_8) and the exponent incremented by 1.

Overflow (O) detection is performed during the CS Addition. If Overflow is detected, the O bit is latched into the output pipeline register. The overflow situation will be corrected in the next cycle according to Table 1.

Implementation of CS-Accumulation

The functioning of both Exponent and Significand paths is interdependent, and it depends on the status of the exponent and "sign extension" (SE) and "overflow" (O) signal produced in the significand part. There are two accumulators, one for carry and the other for sum. They are summed with the product using a 3:2 Carry-Save Adder (CSA) and passing through the two separate paths, one for carry and the other for sum.

The destination registers of the pipeline stage are an Accumulator comprising Carry and Sum (two registers). Performing the conversion into the conventional format occurs in the next pipeline stages (pipeline-4 and pipeline-5). The Carry-Save stage can be a timing critical stage. Therefore, particular attention is given to timing and area guiding the design decisions described in this section. The critical path in this pipeline stage comprises: Exponent control, three 2:1 multiplexers, one 5-bit subtractor, one 5-bit decrementer, and comparison unit, in the exponent part, and, in the significand part, Exponent control, 5-bit incrementer, 3:2 Carry-Save Adder (CSA), and one AND gate. The critical path can traverse exponent and significand paths, as is the case in this design.

Accumulator Design

Figure 7A:
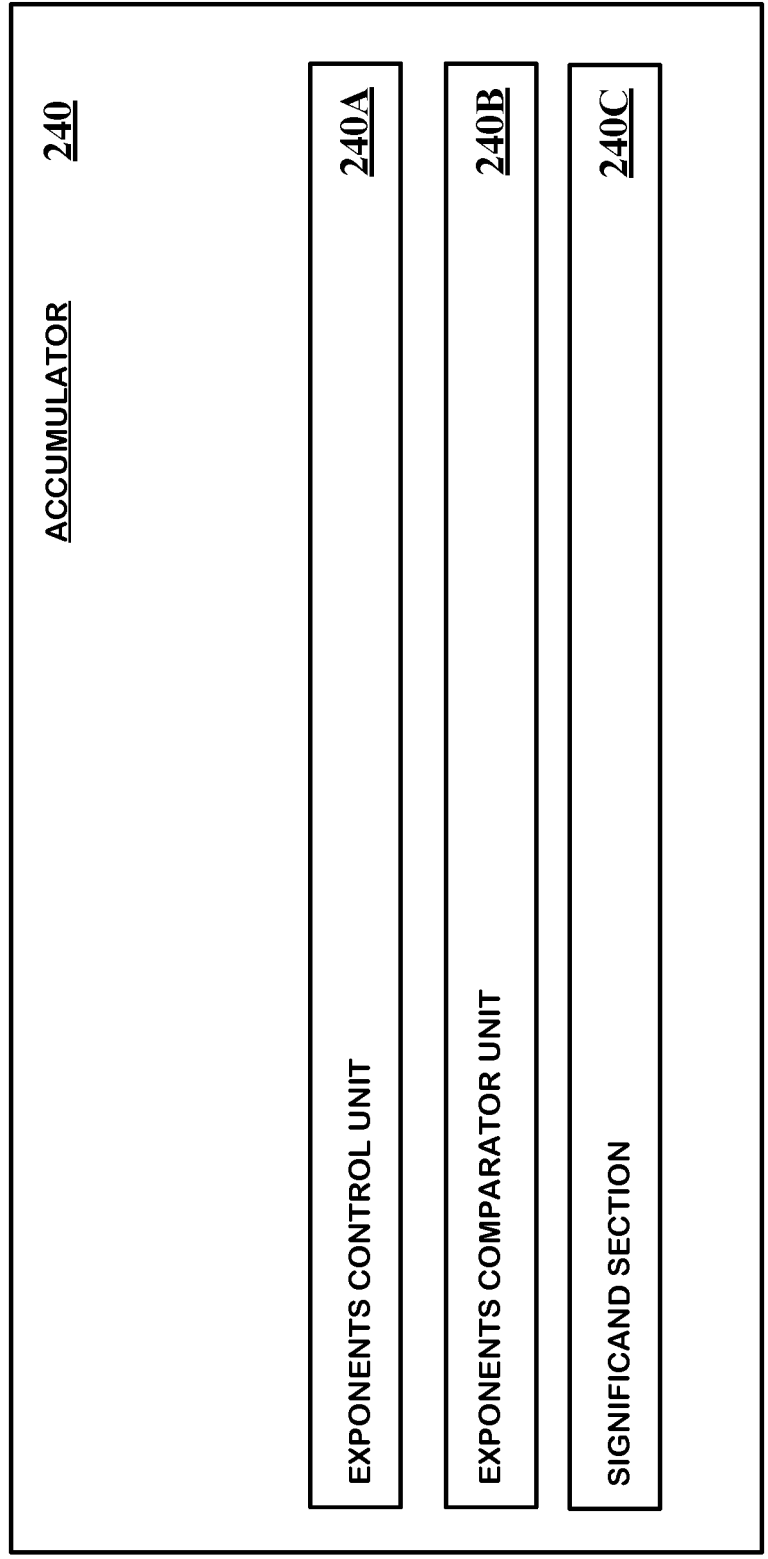
FIG. 7A illustrates a high-level hierarchical block diagram of an Accumulator comprising two hierarchical blocks: Exponents Control Unit and the Significand Unit.
Figure 7B:
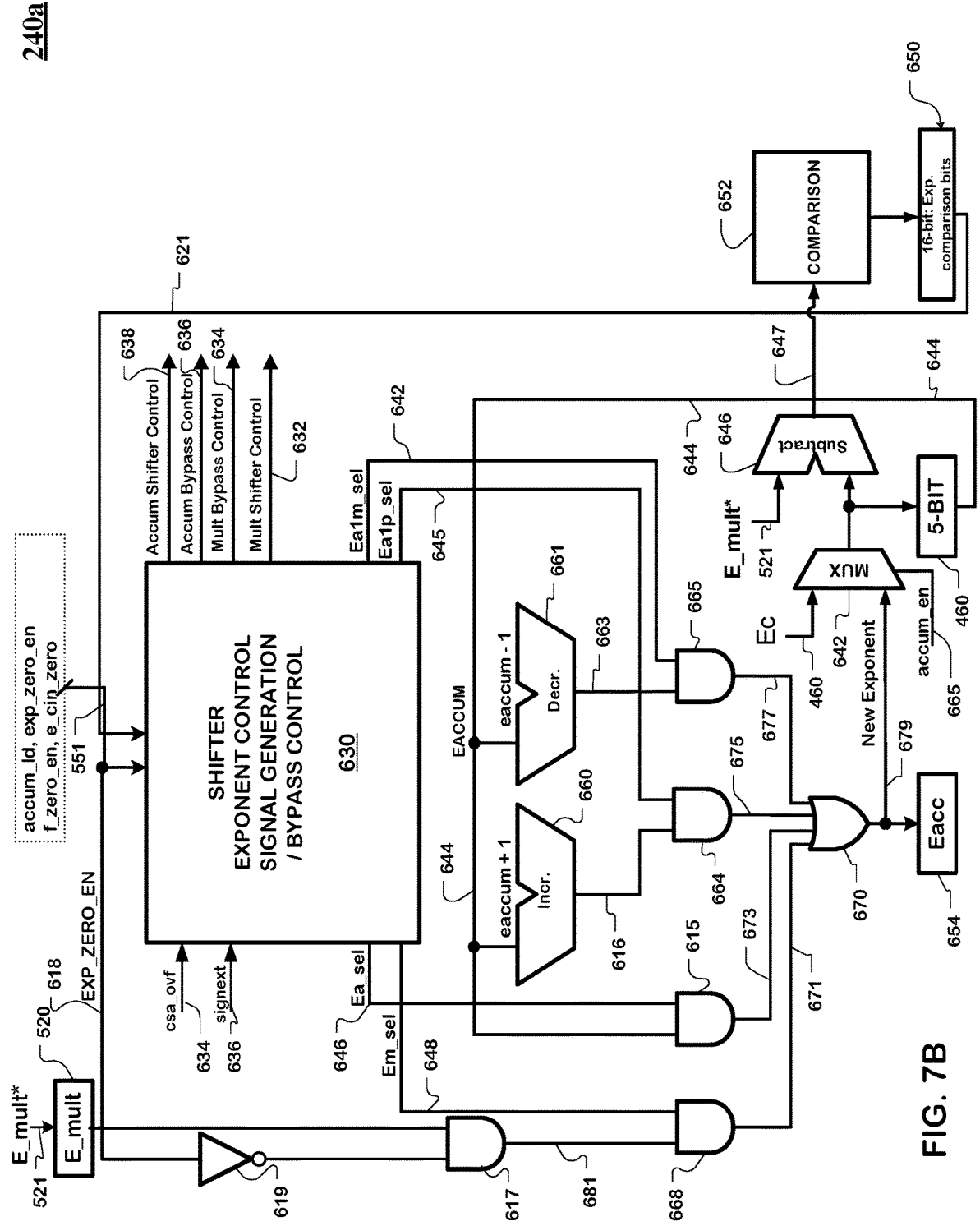
FIG. 7B illustrates an exemplary hierarchical block and schematic diagram of the Exponents Control Unit.
Figure 7C:
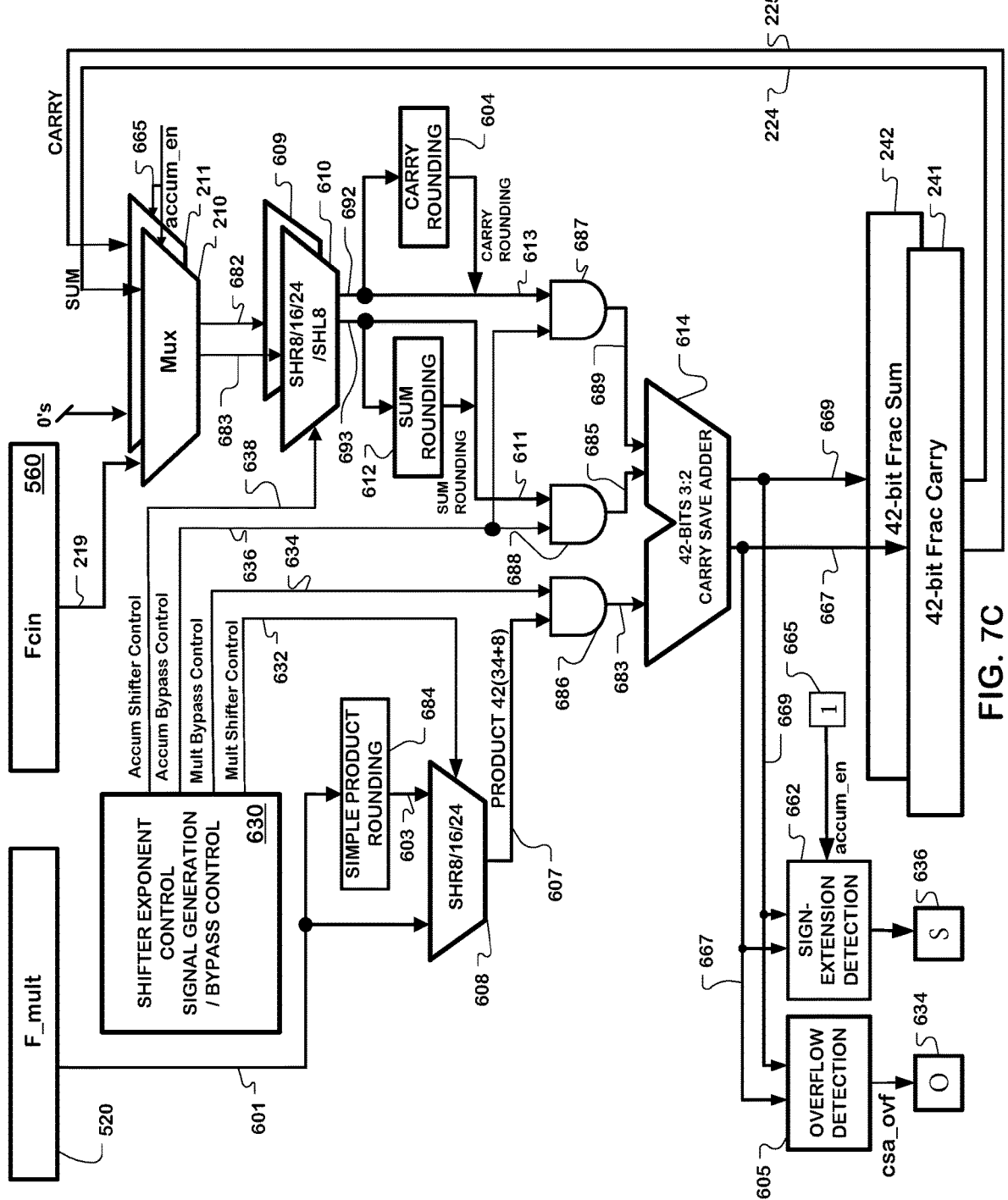
FIG. 7C illustrates an exemplary hierarchical block and schematic diagram of the Significand Unit.

FIG. 7A illustrates a simplified block diagram 610 of an Accumulator 240 comprising three circuit blocks: Exponents Control Unit 240A, Exponents Comparator Unit 240B, and the Significand Section 240C.

FIG. 7B illustrates an exemplary hierarchical block and schematic diagram of the Exponents Control Unit 240A and Exponent Comparator Unit 240B. A Shifter Exponent Control Signal Generation/Bypass Control circuit 630 receives the inputs from: accum_ld, exp_zero_en, f_zero_en, e_cin_zero, 551, csa_ovf bit 634 O, and signext, which is the S-bit 636 in addition to the output of the 16-bit Multiplier Exponent Comparison circuit 652, which stores into the 16-bit condition register 650, sixteen Exponent Comparison Bits*:

| | |
|---|---|
| z_diff | emult and eaccu are same |
| mgrt | emult is greater than eaccu |
| agrt | eaccu is greater than emult |
| em1p | emult is 1 bigger |
| em2p | emult is 2 bigger |
| em3p | emult is 3 bigger |
| ea1p | eaccu is 1 bigger |
| ea2p | eaccu is 2 bigger |
| ea3p | eaccu is 3 bigger |
| ea4p | eaccu is 4 bigger |
| emz | emult is zero |
| eaz | eaccu is zero |
| eminf | emult is infinity |
| eainf | eaccu is infinity |

*where:

| | |
|---|---|
| emult: | is Product Exponent |
| eaccu: | is Accumulator Exponent |
| emmp | meaning, emult is bigger for more than 3 |
| eamp | meaning, eaccu is bigger for more than 4 |

There are additional control signals:
accum_ld—meaning: Accumulator receiving input C value.
exp_zero_en—meaning: setting the Product Exponent to zero.
f_zero_en—meaning: setting product significand to 0 if Exponent=0 (because denormal is not allowed)
e_cin_zero—meaning: Input C Exponent equal zero Outputs of the Shifter Exponent Control Signal Generation/Bypass Control circuit 630 are the control signals Accum Shifter Control on line 638, Accum bypass Control on line 636, Multiplier bypass Control on line 634, and Multiplier Shifter Control on line 632, Ea_sel on line 646, Ea1m_sel on line 642, Em_sel on line 648 and Ea1p_sel on line 645.

The Comparison circuit 652 compares the exponents of the two operands arriving from: (1) the multiplier exponent E_mult on line 521 and accumulator exponent on line 679; (2) or input A (from exponent E_mult on line 521 in bypass mode) and the accumulator exponent on line 679; (3) or input A (from exponent E_mult on line 521 in bypass mode) and input C (from the exponent Ec on line 460). The Comparison circuit 652 generates the following condition bits that are stored in the 16-bit condition register 650: emult: Multiplier Exponent; eaccu: Accumulator Exponent; z_diff—emult and eaccu are same; mgrt—emult is greater than eaccu; agrt—eaccu is greater than emult; em1p—emult is 1 bigger; em2p—emult is 2 bigger; em3p—emult is 3 bigger; emmp—emult is more than 3 bigger; ea1p—eaccu is 1 bigger; ea2p—eaccu is 2 bigger; ea3p—eaccu is 3 bigger; ea4p—eaccu is 4 bigger; eamp—eaccu is more than 4 bigger; emz—emult is zero; eaz—eaccu is zero; eminf—emult is infinity; and eainf—eaccu is infinity. The 16-bit condition register 650 interfaces to the Shifter Exponent Control Signal Generation/Bypass Control circuit 630 via bus 621. The 16-bit condition register 650 stores the results of a comparison of the Eacc from summation S(i−1) and the E_mult register 520 stores the term A(i)*B(i) in the accumulation mode, during the generation of the Eacc for summation S(i).

Inputs on line 647 to the Comparison circuit 652 come from the Subtractor circuit 646. The subtractor circuit 646 receives E_mult on line 521 from the pipeline register 520 and the output of Multiplexer 642, which chooses between Ec of register 460 and the New Exponent output on line 679 of OR Gate 670, where Multiplexer 642 is controlled by the accum_en signal on line 665 which indicate the mode. (FIG. 7*b*)

Exp_Zero_En on line 618 is applied to inverter 619, the output of which is applied as an input to AND gate 617. The E_mult exponent bits from the pipeline register 520 are input to the AND gate 617 as well, the output of which on line 681 which feeds into to the AND gate 668, with the Em_sal bit on line 648 from Shifter Exponent Control Signal Generation/Bypass Control circuit 630 to pass or block E_mult. The output on line 671 of AND gate 668 connects to a four input OR gate 670. The OR gate 670 has three other inputs, including the output of AND gate 615, which is selected by signal Ea_sel to pass or block Eaccum, and the outputs of the incrementer 660 on line 616 and decrementor 661 on line 663, are each controlled at AND gates 664 and 665 by outputs Ea1p_sel and Ea1m_sel, respectively. Depending on the select signals (of which only one can be 1), 648, 646, 645, 642, a proper exponent is selected as an output of the OR gate 670. This output is the Eacc signal, also known as the New-Exponent which is an input to Exponent Accumulator (Eacc) register 654, also input to the Multiplexer 642.

The output of multiplexer 665 (either the "new exponent for summation S(i), or the exponent of the operand C, depending on the mode) is also registered in this embodiment in register 460, which is connected on line 644 as inputs to the incrementer 660 and to the decrementer 661.

So, as the new exponent on line 679 is developed representing summation S(i) using the comparison bits produced with summation S(i−1), the new exponent is compared to the E-mult value for term A(i−1)*B(i−1) in register 520 to generate the comparison signals to be latched with summation S(i), and used for shifter control during generation of summation S(i+1).

FIG. 7C is a schematic diagram of the Significand Section 240C. A Shifter Exponent Control Signal Generation/Bypass Control circuit 630 is illustrated showing four output control signals. The first control signal is the Accum Shifter Control on line 638 which is the select signal for the shifter circuits SHR8/16/24/SHL8 609 and 610. Two shifter circuits. SHR8/16/24/SHL8 609 and 610 receive their inputs on line 682 and on line 683 from a set of Multiplexers, 210 and 211. The accum_en signal on line 665, controls Multiplexer 210 and Multiplexer 211 to choose between the SUM on line 224, CARRY on line 225 or the value on line 219, originating from register Fcin 560 or logic "0" as another input of the multiplexer 211. Multiplexer 210 and Multiplexer 211 output the selected values on bus 682 and bus 683 into shifter circuits SHR8/16/24/SHL8 609 and 610. Shifter circuits 609 and 610 output shifted values on buses 692 and 693. Bus 692 can interface directly to bus 613 or can traverse an optional Carry Rounding block 604 which appends rounding bits to the bus 613. Bus 693 can interface directly to bus 611 or can traverse an optional Sum Rounding block 612, and append rounding bits to 693. Buses 611 and 613 are inputs to the AND gates 687 and 688, the outputs of which are applied as inputs to the Carry-save Adder circuit 614 on line 689 and 685 (the AND symbol represents a multiplicity of AND gates for each signal line on the busses: 613, 611 and 607. The inputs for the AND gates 688 and the AND gates 686 are selected by control signals on line 633 and on line 634, respectively.

The F_mult value in the pipeline register 520 is input to a Simple Product Rounding block 684 which inputs on line 603 directly to a shift registers SHR 8/16/24 circuit 608. The select signal for SHR 8/16/24 circuit 608 is the Multi-Shifter Control on line 632 which selects between the F_mult input on line 601 and rounded product on line 603. The output is the Product containing 42-bits (34+8) on bus 607, which is applied to an input to the AND gates 686, the output of which is an input to the Carry-save Adder circuit 614.

The 42-Bits 3:2 Carry-save Adder circuit 614 has three inputs, including the output 683 of the AND gates 686, the output 689 of the AND gates 687, and the output 685 of the AND gates 688. The 42-Bits 3:2 Carry-save Adder circuit 614 outputs are two buses: Sum bus 669 and Carry bus 667. The two outputs, 669 and 667 enter the 42-bit Frac Sum register 242 via bus 669 and the 42-bit Frac Carry register 241 via Carry bus 667 respectively. Bus 669 and bus 667 are also inputs to an Overflow Detection block 605 and Sign Extension Detection Unit 662. The two blocks, Overflow Detection block 605 and Sign Extension Detection Unit 662 provide output to the O-bit 634, which is the csa_ovf signal and the S-bit 636 which is the Sign Extension signal. The Sign Extension Detection unit 662 has an enable bit accum_en signal on line 665 which is set to a logic "1" when the operation is Accumulate. The Sign Extension Detection block is operational only working when the "accum_en" signal is enabled. There are three operation modes available, which are:

Input-A(BF16)×Input-B(BF16)+Input-C(FP32),
Input-A(BF16)×Input-B(BF16)+Accumulation Loop (summation),
Input-A(FP32)+Input-C(FP32).

The "accum_en" signal is only enabled during the second mode condition (accumulation). In addition mode, Sign Extension Detection is not needed. It is only required in the Accumulation mode as gradual growth of the sign extension bits can only occur during the Accumulation operation.

Sign Extension Detection Unit 662:

According to some aspects, the Sign Extension Detection Unit 662 is attached to the accumulator output of both Sum and Carry. When detecting 10-bits sign (that includes two sign bits, plus additional 8 bits in the first byte of the Sum or Carry) the output shifts left in the following cycle (SHL_8) to preserve operand accuracy. If Sign Extension Detection is not implemented, during the normal operation, the significant bits of the operand gradually shift to the right until being replaced with extended sign bits, thus, resulting in the loss of accuracy. In this implementation, every time one of the operands has at least 10 leading sign bits detected, an adjustment executes a shifting of the operands left for 8-bit positions. The exponent is adjusted accordingly by decrementing exponent value by one, which is executed in the same cycle. When S is detected on the Carry or Sum portion of the accumulator, S bit is latched in the output pipeline register 636, for a correction in the next cycle. The corrective action executes a shift of the accumulator to the left for 8-bit positions (SHL_8). Sometimes this situation may cancel itself with the next action (requiring SHR_8), often leaving things unchanged as shown in Table 1.

Normalization and Conversion to Sign Magnitude Format

Figure 8A:
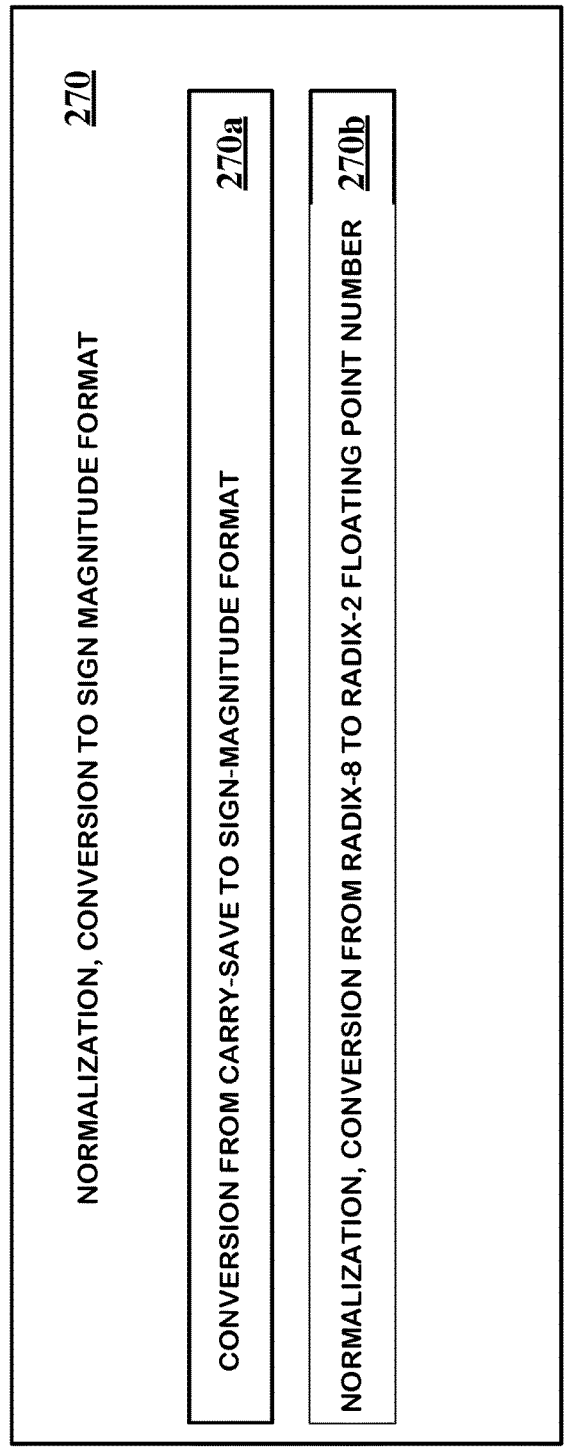
FIG. 8A illustrates an exemplary hierarchical block showing the Normalization, Conversion to Sign Magnitude Format block comprising two sub-blocks, a first Conversion from Carry-Save To Sign Magnitude sub-block and a second Conversion from Radix-8 To Radix-2 Floating Point Number sub-block.

FIG. 8A illustrates the Normalization, Conversion to Sign Magnitude Format block 270 comprising two sub-blocks, a first sub-block is Conversion from Carry-Save To Sign-Magnitude format block 270a and a second sub-block is Conversion from Radix-8 To Radix-2 Floating Point Number block 270b.

Figure 8B:
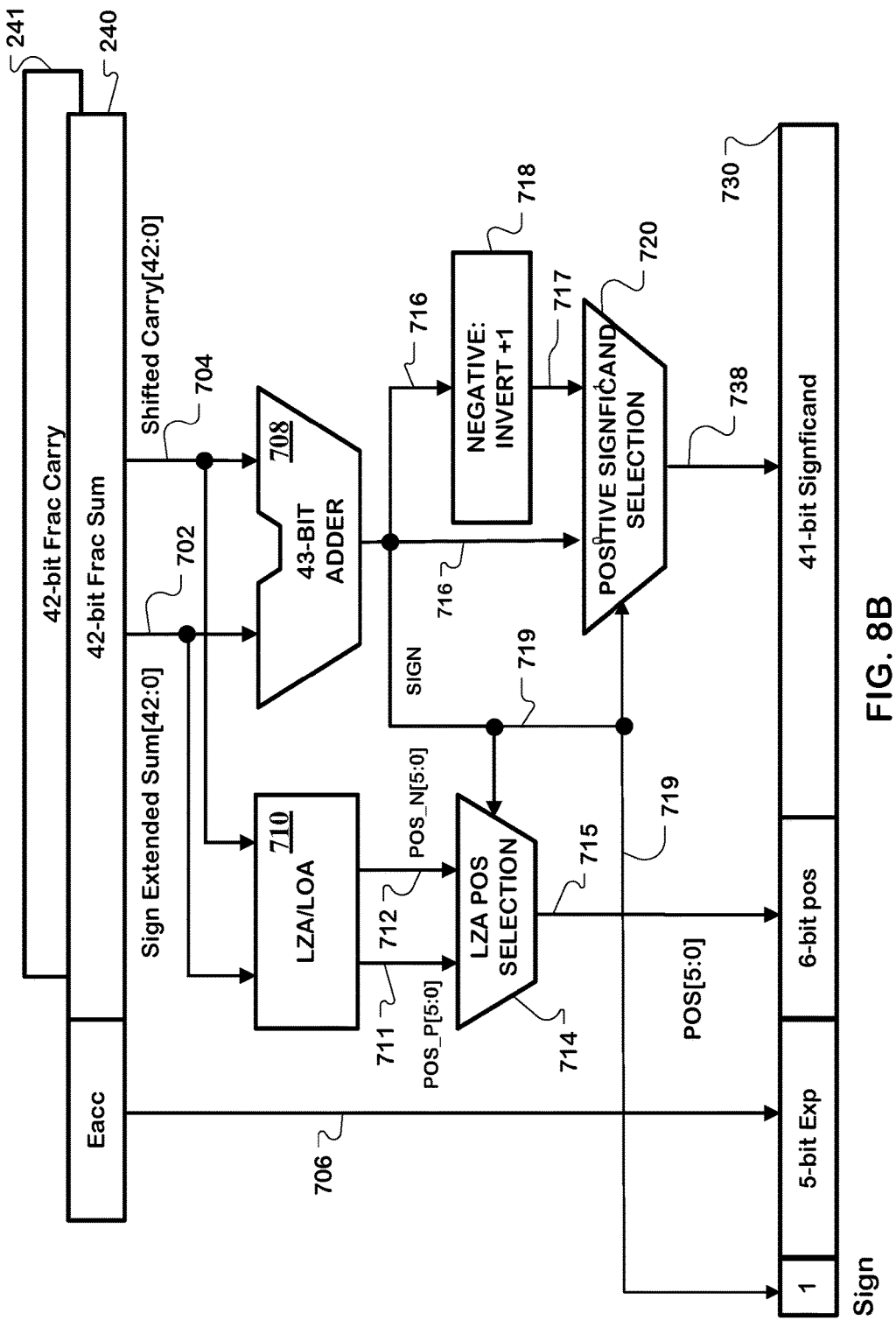
FIG. 8B illustrates an exemplary schematic diagram for the Conversion from Carry-Save To Sign Magnitude block.

FIG. 8B illustrates an exemplary schematic diagram for the Conversion from Carry-Save To Sign-Magnitude format block 270a. Two registers, a 42-bit Frac Sum register 242, and a 42-bit Frac Carry register 241 output the Shifted Carry [42:0] bus 704 and the Sign Extended Sum [42:0] bus 702 as inputs to a 43-BIT ADDER circuit 708. A second circuit LZA/LOA 710 receives input bus 702 and bus 704. The second circuit LZA/LOA 710 outputs two buses POS_P [5:0] on line 711 and POS_N [5:0] on line 712 to a third LZA POS Selection circuit 714. The output, for example, via bus 715, of the LZA POS Selection circuit 714 is the POS [5:0] which maps to the register 730 as the 6-bit position, designating the amount of shift left required to normalize significand.

A 43-BIT ADDER circuit 708 outputs the signal SIGN on line 719 to control the LZA POS Selection circuit 714, routes bus 716 to the Significand Selection Multiplexer circuit 720 on the "0" leg input, and routes bus 716 to the input of Negative: Invert+1 circuit 718. The "1" leg of the 2'S Significand Selection Multiplexer circuit 720 receives bus 717, which represents negative significand, converted into a positive one. The SIGN 719 controls the Significand Selection multiplexer, so that the output 738 contains always a positive significand. The output of the 2'S Complement Selection Multiplexer circuit 720 is the bus 738 which maps to the register 730 as the 41-bit positive significand. A 5-bit exponent maps on line 706 directly to the register 730 as well as the SIGN bit 726. This step finishes conversion of the Accumulator significand represented in the Carry-Save format into a Sign-Magnitude Radix-8 format.

In this stage the two values on Sum bus 702 and Carry bus 704 (representing significand in carry-save format), are summed together in the 43-BIT ADDER circuit 708 to produce Sign-Magnitude format of the significand. Leading Zero/Leading One Anticipator (second LZA/LOA circuit)

710 will calculate two numbers: number of Leading Zeroes 711 (in case the significand 716 is positive) and number of leading Ones 712 (in case the significand 716 is negative). Depending on the significand sign bit 719, the correct position will be selected by the multiplexer, LZA POS Selection circuit 714 and will be stored into the register 730. Both LZ and LO positions, POS_P and POS_N are 6-bit long numbers, anticipating the situation containing 32 leading zeroes or ones.

If the significand at the output of the 43-BIT ADDER circuit 708 is negative, this negative number is converted into a positive number (as IEEE 754 uses sign-magnitude representation, i.e., positive significand). For that purpose, 2's complement converter 718 is used. The sign bit 719 controls the multiplexer circuit 720, so that if the number is positive, it will be stored directly into the 41-bit significand register 730. In case the output is negative, the output on line 717, which is the value on 716 converted into a positive value, will be passed to register 730 on line 738.

Figure 8C:
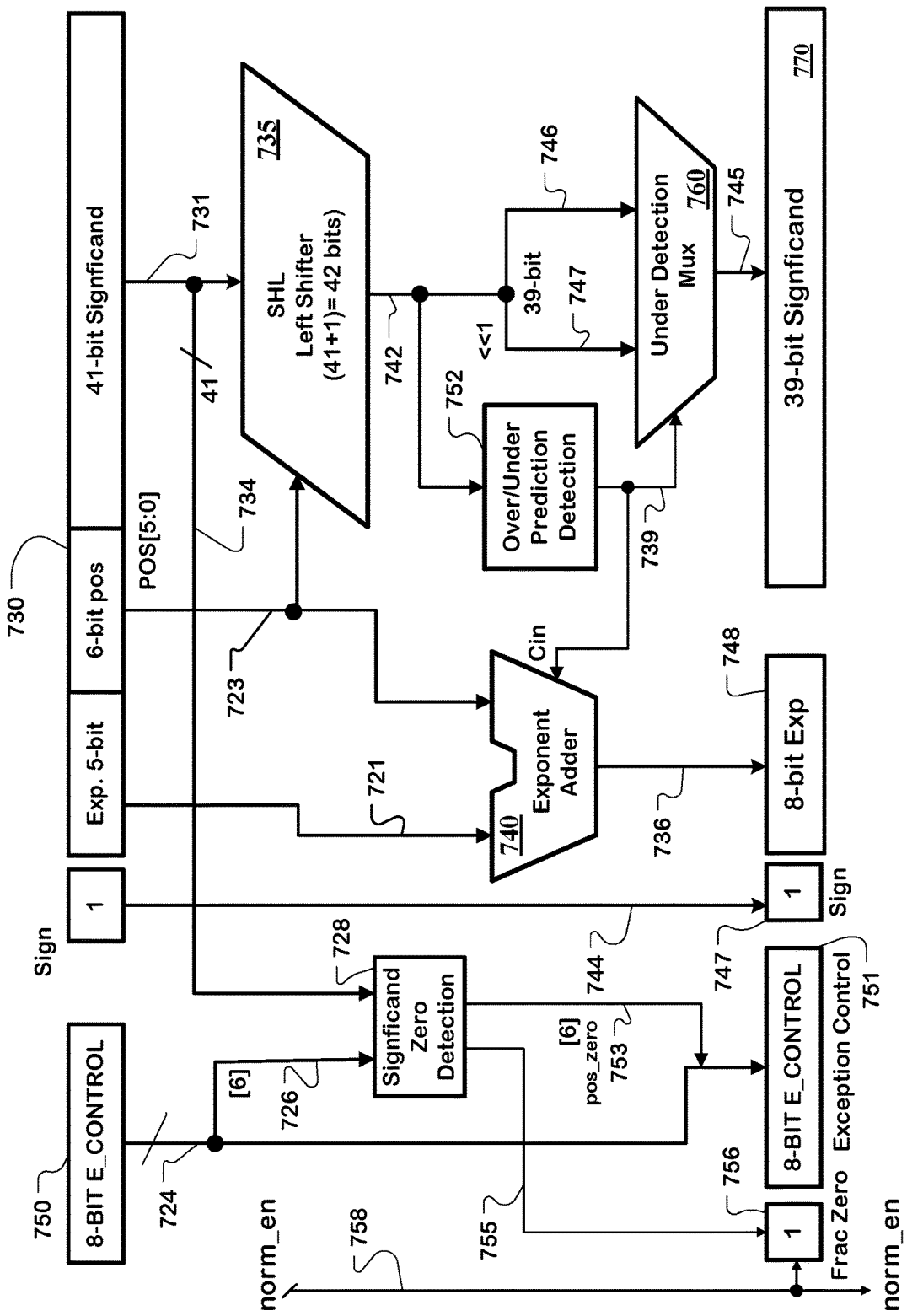
FIG. 8C illustrates an exemplary schematic diagram for the Conversion from Radix-8 To Radix-2 Floating Point Number block.

The predicted 6-bit position of the significand will be added to the 5-bit exponent to produce the new 8-bit exponent compliant with the standard floating point number representation, and the significand will be aligned with respect to the floating point significand, using the same 6-bit predicted position (FIG. 8c).

FIG. 8C illustrates an exemplary schematic diagram for the Conversion from Radix-8 To Radix-2 Floating Point Number block 270b. The register 730 interfaces to the SHL Left shifter circuit 735 via the 41-bit bus 731. The register 730 interfaces to the Significand Zero Detection circuit 728 via the 41-bit bus 734. The 6-bit position field of register 730 provides Pos [5:0] on line 723 to control the SHL Left shifter circuit 735. The Pos [5:0] on line 723 is also an input to the Exponent adder circuit 740. The Exponent 5-bit field of register 730 is a second input on line 721 to the Exponent adder circuit 740. Exponent adder circuit 740 adjusts (increments) the exponent for the number of positions the significand is shifted to the left as indicated by the POS[5:0], and provides an output on line 736 to register 748. However, given that the predictor can be in error for one position, the output of the shifter is passed to the Over/Under Detection circuit 752 which will signal the error by issuing the signal 739 which is applied to the carry input of Exponent adder circuit 740 and to a control input of under detection multiplexer 760. Under Detection Multiplexer 760 has an input on line 746 where the significand on line 742 from shifter circuit 735 is in the same position (no error detected), and an input on line 747 where the significand on line 742 is shifted for one bit position to the left (error detected). If the signal 739 indicates under detection, correct output will be latched into the register 770 via bus 745. The error in exponent adjustment is corrected by entering 1 into the adder via carry-in input. The SIGN value is copied from register 730 to register 747.

The sign bit in register 730 is passed through on line 744 to register 747.

The Exception Control (8-bit) register 750 passes its value on line 724 to Exception Control register 751. The meaning of the Exception Control register bits is given as:

| | |
|---|---|
| exp_inf_en: | Operand A is infinity or Operand B is infinity |
| z_diff | Accumulator exponent equal to Product exponent |
| s_mult: | Product Sign |
| s_cin: | Input C Sign |
| e_mul_zero: | Product Exponent = 0 |
| e_cin_zero: | Input C Exponent = 0 |
| e_mul_inf: | Product Exponent is equal to infinity. |
| e_cin_inf: | Input C Exponent is equal to infinity. |

The bit six 726 of the Exception Control (8-bit) register 750, is "z_diff" and indicates the result of the exponent comparison between accumulator and product exponent. When equal to 1, The exponent of the Accumulator is equal to the exponent of the product. When "z_diff"=zero, it indicates that the Accumulator exponent is smaller than or equal to the product exponent. The bit [6] "z_diff" is the first input on line 726 to the Significand Zero Detection circuit 728. The Significand Zero Detection circuit 728 outputs a 1-bit signal on line 753, which replaces bit [6]"z_diff", in the Exception Control register 751 now becoming "pos_zero" 753, indicating that the resulting significand is zero. A second output of the Significand Zero Detection circuit 728 provides a signal on line 755 for the Frac-Zero register 756 once the accumulation operation is finished and the operation proceeds to normalization.

Figure 9A:
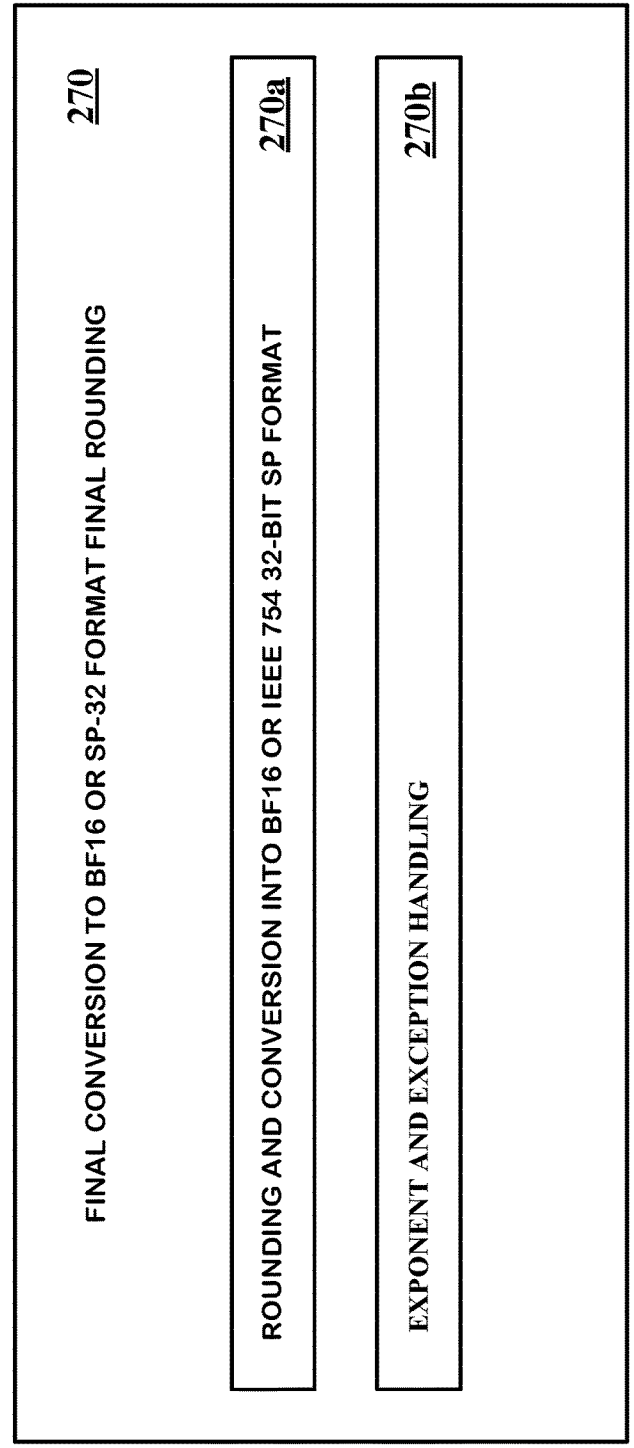
FIG. 9A illustrates an exemplary hierarchical block showing Rounding and Conversion into BF16 or IEEE 754 32-Bit Single Precision Format sub-block and an exponent and exception handling sub-block.

FIG. 9A illustrates block 270 performing 700 the Final Conversion into BF16 or IEEE 754 32-Bit Single Precision Format, consisting of a Sign-Magnitude format block 270a performing Rounding and Conversion into BF16 or IEEE 754 32-Bit Single Precision Format and sub-block 270b performing Exponent and Exception Handling.

Rounding and Conversion to FP32 Format

According to some aspects, the final stage is pipeline-6 which performs rounding of the result to a standard Floating point Sign/Magnitude number with the following: sign bit, 8-bit exponent, 23 bit, normalized significand (+1 implied integer bit). In the process of converting from the 31-bit significand to 24-bit normalized significand with one implied bit, rounding of the result from 31 to 24-bit is performed. In this implementation two rounding modes are implemented: Round Towards Zero (RTZ) truncate, Round to Nearest Even, (RNE). However, any other rounding modes e.g., Round to Nearest Odd (RNO) are easily incorporated.

According to some aspects, rounding logic checks the last 15 LSB bits out of 39 significant bits (not counting GRS bits which make the total 42-bits, 39+3 GRS bits) from the register 770 and determines if the remaining 24 bits require rounding (according to the rule applied: RNE or RTZ). The Incrementer needed for RNE is contained in the Rounding box. The three bits, GRS, carried over from the accumulator (CSA) operations are ignored in this implementation. They can be incorporated in the final rounding in other possible implementations.

Rounding is done in one of the several ways:
(a) During CS Accumulate operation Rounding to Nearest Odd (RNO) is applied,
  on Sum signal only with rounding bit being inserted into the Carry LSB open position,
  on each Sum and Carry signal separately,
(b) During CS Accumulate, and in the pipeline-6 stage (final rounding), and
(c) Only in the pipeline-6 stage, while CSA is disabled.
Each of the rounding modes is applied according to the accuracy and particular requirement imposed by a particular application program.

The output to pipeline-6 is either FP32 or BF16, as required. Therefore, the significand length is either 24 (23+ implied bit) or 8-bit (7+implied bit). That is controlled by the "Out_FP32" signal applied to the first Multiplexer. In case rounding resulted in 25-bit significand, the significand will be right-shifted one position and the exponent will be incremented by one.

The properly normalized and rounded result is stored in the output register of the pipeline-6, as either BF16 number consisting of 1-bit sign, 8-bit exponent, and 7-bit fraction of the significand, or FP32 number consisting of 1-bit sign, 8-bit exponent, and 23-bit fraction of the significand.

Figure 9B:
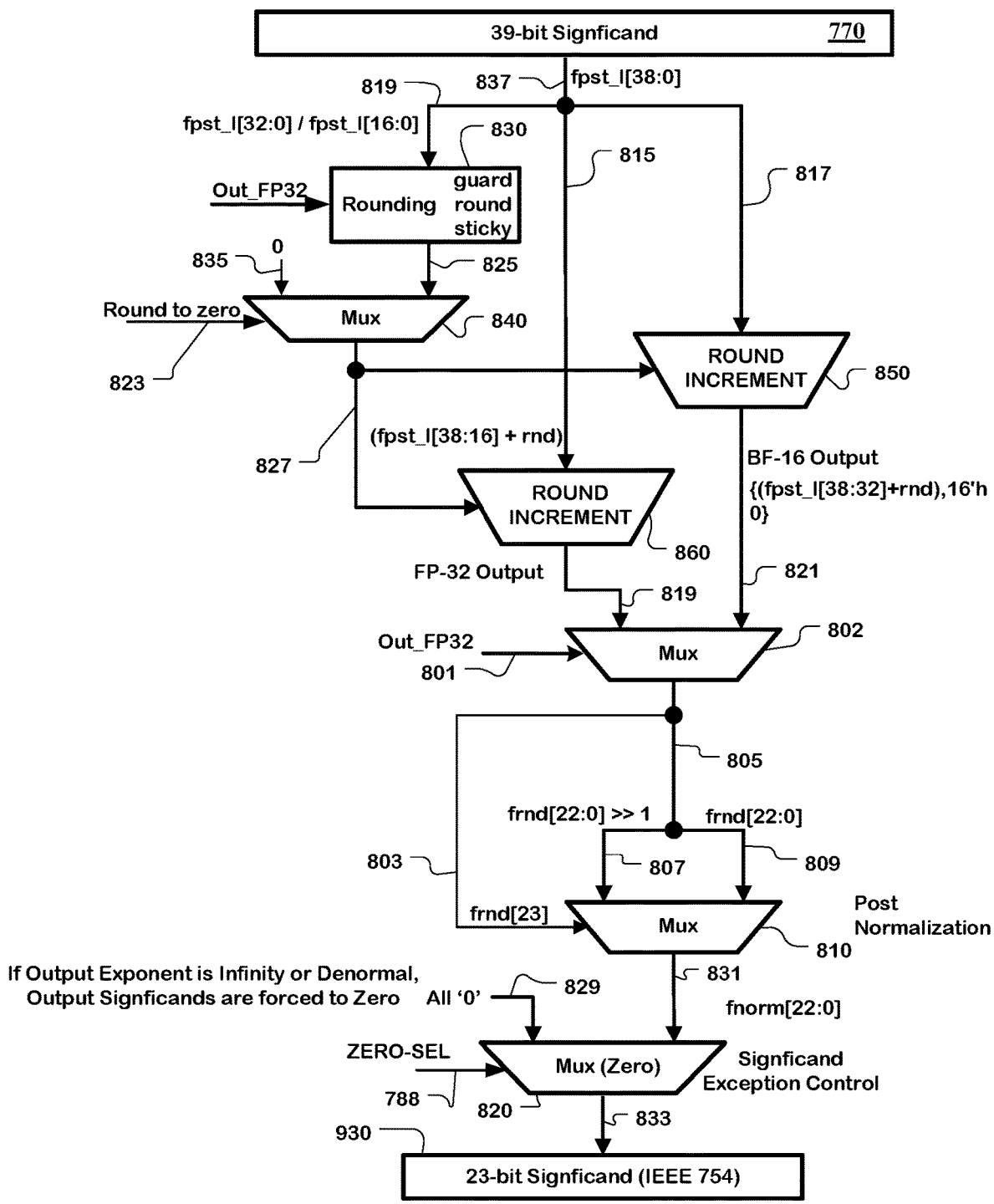
FIG. 9B illustrates an exemplary schematic diagram showing the Rounding and Conversion into BF16 or IEEE 754 32-Bit SP Format block.

FIG. 9B illustrates an exemplary schematic diagram showing the Rounding and Conversion into BF16 or IEEE 754 32-Bit SP Format. The 39-bit significand register 770 bus fpst_1 [38:0] 837 provides fpst_1 [32:0] 819 or fpst_1 [16:0] 819 to a Rounding circuit 830 comprising the guard, round, and sticky bits. The control Out_FP32 selects the portion of the significand on line 819 which is to be rounded by Rounding circuit 830. In case 32-bit SP format is selected, the upper 24-bits [38:16] are augmented with 3 round bits. A Multiplexer 840 chooses between a "0" input on line 835 or the Rounding circuit 830 output on line 825 where the Multiplexer 840 is controlled by the Round to Zero select line 823. This situation occurs when the exponent exceeds −126 and the significand becomes de-normalized, which in this implementation results in rounding to zero. The output on line 827 routes 23-bits (one implied) and 3-rounding bits to a first Round Increment circuit 860 resulting in properly rounded significand in IEEE 754 SP 32-bit format on line 819.

The second Round Increment circuit 850 is operative for rounding into BF-16 format, when BF16 output format is selected. The conversion of the 39-bit significand on line 817 from fpst_1 [38:0] 817 to the BF-16 output is done in Round Increment circuit 850 resulting in 7-bits (one implied), augmented with 1 rounding decision bit, and with 16 zeros appended. This represents significand at the output on line 821 as one of the Multiplexer 802 inputs.

A first Multiplexer 802 selects the FP-32 or BF16 output using the control line signal Out_FP32 801. When Out_FP32 801 is active, it outputs the FP-32 format significand on line 805. When the Out_FP32 801 control signal is inactive, the output on line 805 is in BF-16 format significand. The output of the first Multiplexer 802 is bus 805 which divides into bus 807 and bus 809, entering the second Multiplexer 810. The Multiplexer 810 is controlled by the 24-th bit of the output bus on line 805, frnd [23] signal on line 803. In case rounding produced a 25-bit significand, the 24-th bit will be one. In this case, signal on line 803 frnd [23] bit selects the input bus 807 which is bus 805 shifted for one bit position to the right. (frnd [23] signal will also increment the exponent of the result for 1, to adjust for the right shift. In case frnd [23] is equal 0, right shift is not needed and the bus 805 will pass straight to the output on line 831, via selected input bus 809.

The third Multiplexer (Zero) 820 chooses between an all "0" on line 829 input or the fnorm [22:0] on line 831. If the Output Exponent is Infinity or Denormal, Output Significands are forced to Zero which is done via Zero_Sel on line 788 control signal, which choses all '0' input 829. If there is no exception the normalized significand bus 831 is routed as bus 833 and maps to the 23-bit Significand (IEEE 754) register 930.

Figure 9C:
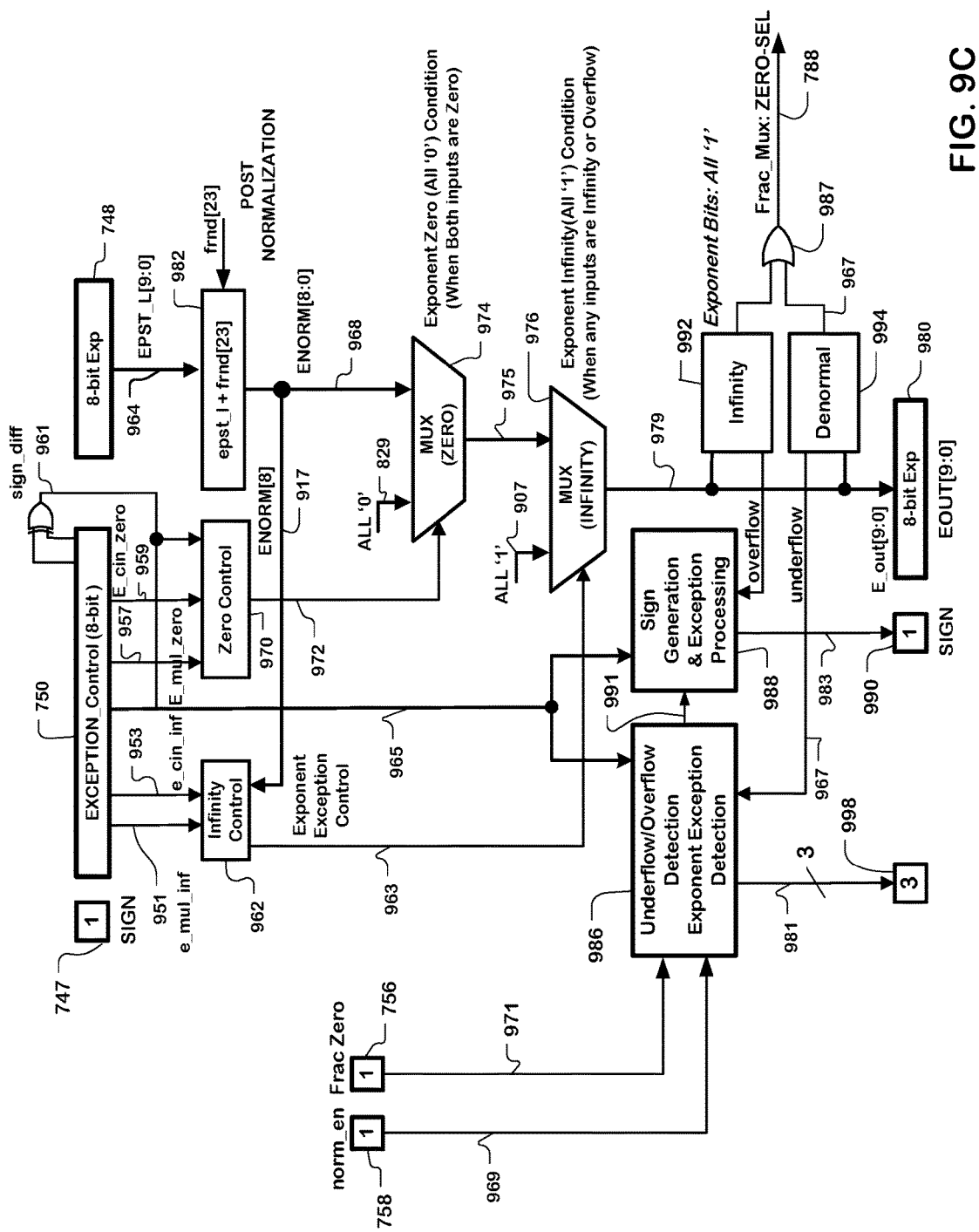
FIG. 9C illustrates an exemplary schematic diagram showing an Exponent and Exception Handling block.

FIG. 9C illustrates an exemplary schematic diagram showing Exponent and Exception Handling block 270*b*. An 8-bit Exponent 748 provides the EPST_L [9:0] 964 bus and is incremented by 1 if frnd[23]=1. This is accomplished by routing frnd[23] into the carry-in position of the incrementer 982. The output of exponent incrementer 982 is the 9-bit Enorm [8:0] bus 968 which is a first input to a first Multiplexer (Zero) 974. The second input to the first Multiplexer (Zero) 974 are ALL '0's bus 829. The purpose of the first Multiplexer (Zero) 974 is to set the exponent to all '0' in case this is required by an exception, indicated by Exception Control (8-bit) register 750, via Zero Control logic 970.

The Exception Control (8-bit) register 750 operates on the following eight conditions 953: exp_inf_en, pos_zero, s_mult, s_cin, e_mul_zero, e_cin_zero, e_mul_zero and e_cin_inf.

The Zero Control logic 970 has three inputs: sign_diff on line 961 from the XOR gate and, e_cin_zero on line 959, e_mul_zero on line 957 from an Exception Control (8-bit) register 750, and the output on line 972 controls the first Multiplexer (Zero) 974. The output on line 975 of the first Multiplexer (Zero) 974 passes through the Multiplexer 976 providing the exponent signal bus 979 which is stored in the Exponent register 980. In case Infinity Control 962 signals infinity on line 963, ALL '1' input on line 907 is passed through the multiplexer 976 setting all exponent bits to '1', as recommended by the IEEE 754 standard. The meaning of signals is:

| | |
|---|---|
| exp_inf_en | Operand A is infinity or Operand B is infinity |
| pos_zero | resulting significand is zero |
| s_mult | Product Sign |
| s_cin | Input C Sign |
| e_mul_zero | Product Exponent = 0 |
| e_cin_zero | Input C Exponent = 0 |
| e_mul_inf | Product Exponent is equal to infinity. |
| e_cin_inf | Input C Exponent is equal to infinity. |

In addition, signal "sign_diff" indicating that the sign of the product "s_mult" and sign of the input C, "s_cin" are different. This signal is obtained by applying an XOR function to s_mult and s_cin signals taken from the Exception Control (8-bit) register 750.

The Exception Control (8-bit) register 750 provides the following signals: s_cin, s_mult, exp_inf_en, e_cin_inf, e_mul_inf, pos_zero, sign_diff, on the bus 965 to the Sign Generation and Exception Processing circuit 988 and the Underflow/Overflow Detection and Exponent Exception Detection circuit 986. The control signals for the circuit 986 are norm_en 758 on line 969 and Frac Zero register 756 on line 971. The outputs of the circuit 986 are three signals ov (Overflow), uf (Underflow) and (Invalid) nv. A fourth output on line 991 is sent to the Sign Generation and Exception Processing circuit 988 from the Infinity detection circuit 992 indicating overflow.

Signals have the following abbreviations as follows: s_cin (Input C Sign), s_mult (Product Sign), e_mul_zero (Product Exponent Zero), e_cin_zero (Input C Exponent Zero), e_mul_inf (Product Exponent Infinity), and e_cin_inf (Input C Exponent Infinity).

Two correlated events contribute to underflow. One is the creation of a tiny nonzero result between ±2-126 [where −126 is minimal exponent value] which, because it is so small, may later cause some other exception such as overflow upon division. The other event is the extraordinary loss of accuracy during the approximation of such small numbers. Loss of accuracy may be detected when the delivered result differs from what would have been computed were both exponent range and precision unbounded. The IEEE Standard 754 does not track accuracy other than to require single and double precision. In this disclosed implementation, "denormal" numbers are not used and any value where exponent value is −126, and significand is smaller than 1, will be converted to zero. Zero is represented by setting all the significand bits to zero and exponent value to zero, which is handled by Exception Processing Circuits in our disclosed implementation.

The Sign Generation and Exception Processing circuit 988 receives an input from the Exception Control (8-bit) register 750 via bus 965 and Infinity detection circuit 992. The output of Sign Generation and Exception Processing circuit 988 is a SIGN bit which is stored into the register 990 via signal line 983.

An Infinity detection circuit 992 operates on the exponent signal bus 979 input and if it detects all exponent bits to be 1, it will provide '1' to the OR gate 987 which will in turn set its output 788 to '1'. This sets ZERO-SEL signal 788 which sets significand to all zero (Mux 820, FIG. 9B).

Denormal Circuit 994 detects the situation when the exponent value on exponent signal bus 979 is out of range, and signals underflow situation on signal line 967. This condition is also signaled to the OR gate 987 which generates the signal ZERO-SEL on line 788. ZERO-SEL signal on line 788 (FIG. 9B) will instruct the Multiplexer 820 to insert all "0"s into the significand, thus creating proper IEEE 754 "Zero" representation (both exponent and significand contain all "0"s).

significand which also carries the sign of the operand. This avoids unnecessary subtraction of significands when the exponents are equal to determine the greater of the two as imposed by the IEEE-754 standard. Introducing 2's complement representation requires novel Leading Zero (Leading One) Detector (Predictor) which works on both positive and negative numbers. The same applies to Overflow (OV) detection. In addition, it is necessary to determine when addition of Carry and Sum results in a long Sign Extension (SE), requiring introduction of novel design features.

Floating point Multiply-Add-Accumulate Unit, supporting BF16 format for Multiply-Accumulate operations, and FP32 Single-Precision Addition complying to IEEE 754 Standard is described. The Multiply-Accumulate unit uses higher internal precision and longer accumulator by converting the operands into a higher-radix and longer internal 2's complement significand representation to facilitate precision as well as comparison and operation with negative numbers. The addition is performed using Carry-Save format to avoid long carry propagation and speed up the operation. Operations including overflow detection, zero detection and sign extension are adopted for 2s complement and Carry-Save format. Handling of Overflow and Sign Extension allows for fast operation relatively independent

TABLE 1

CSA Unit Control

| | | | Input Conditions | | Output Control | |
|---|---|---|---|---|---|---|
| | | | Overflow Signext Inputs | Significand Output Mux Control | Exponent Output | (alternate) |
| | | Exponent | Condition | Mult. | Accu. | Bypass |
| $E_a = E_m$ | 1 | $E_a = E_m$ | (OV = 0 & SE = 0) | Fm | Fa | Ea | (Em) |
| | | | (OV = 1 & SE = 1) | | | | |
| | | | (OV = 0 & SE = 1) | | | | |
| | | | OV = 1 & SE = 0 | Fm >> 8 | Fa >> 8 | Ea + 1 | (Em + 1) |
| | | | (OV = 0 & SE = 0) | Fm >> 8 | Fa | Ea | |
| | | | (OV = 1 & SE = 1) | | | | |
| | 2 | $E_a = E_m + 1$ | OV = 1 & SE = 0 | Fm >> 16 | Fa >> 8 | Ea + 1 | |
| | | | OV = 0 & SE = 1 | Fm | Fa << 8 | Ea − 1 | (Em) |
| | | | (OV = 0 & SE = 0) | Fm >> 16 | Fa | Ea | |
| | 3 | $E_a = E_m + 2$ | (OV = 1 & SE = 1) | | | | |
| | | | OV = 1 & SE = 0 | Fm >> 24 | Fa >> 8 | Ea + 1 | |
| | | | OV = 0 & SE = 1 | Fm >> 8 | Fa << 8 | Ea − 1 | (Em + 1) |
| | | | (OV = 0 & SE = 0) | Fm >> 24 | Fa | Ea | |
| | | | (OV = 1 & SE = 1) | | | | |
| $E_a > E_m$ | 4 | $E_a = E_m + 3$ | OV = 1 & SE = 0 | (Fm) | Fa >> 8 | Ea + 1 | Bypass (Acc) |
| | | | OV = 0 & SE = 1 | Fm >> 16 | Fa << 8 | Ea − 1 | (Em + 1) |
| | | | (OV = 0 & SE = 0) | (Fm) | Fa | Ea | Bypass (Acc) |
| | | | (OV = 1 & SE = 1) | | | | |
| | | | OV = 1 & SE = 0 | (Fm) | Fa >> 8 | Ea + 1 | Bypass (Acc) |
| | 5 | $E_a > E_m + 3$ | OV = 0 & SE = 1 | If Ea = Em + 4 Fm >> 24 | Fa << 8 | Ea − 1 | |
| | | | | If Ea > Em + 4 (Fm) | Fa << 8 | Ea − 1 | Bypass (Acc) |
| | 6 | $E_m = E_a + 1$ | | Fm | Fa >> 8 | Em | |
| | 7 | $E_m = E_a + 2$ | | Fm | Fa >> 16 | Em | |
| $E_a < E_m$ | 8 | $E_m = E_a + 3$ | | Fm | Fa >> 24 | Em | |
| | 9 | $E_m > E_a + 3$ | | Fm | (Fa) | Em | Bypass (Mult) |

A Floating point Multiply-Add Accumulate Unit using Carry-Save addition and accumulation with a radix-8 exponent is described. This balances the critical timing in the exponent unit against that of the significand unit. Also, unlike utilizing sign-magnitude representation as proposed in the Floating point IEEE-754 standard, a 2's complement number system is used to represent a positive and a negative on the size of the accumulator. Rounding suitable for Machine Learning is introduced in the Accumulate operation without timing impact, considerably improving the accuracy of the computation.

Exception Handling

FIGS. 10 to 21 are referred to in connection with exception handling in circuits and methods like those described above. Floating point numbers can assume values which are special cases such as: positive or negative infinity, zero, and de-normalized numbers according to the particular encoding format utilized to represent the significand and exponent.

Figure 10:
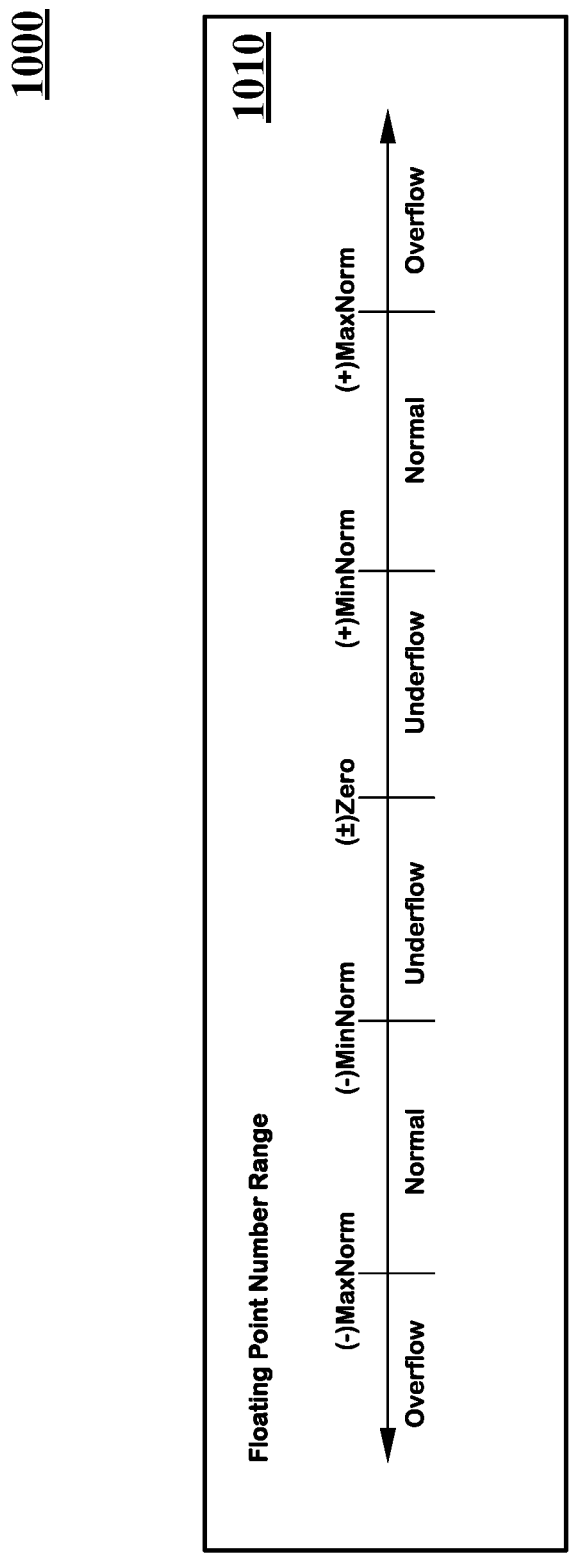
FIG. 10 illustrates the floating point number range processed by the exception processing in carry-save accumulation unit for machine learning.

FIG. 10 illustrates a Floating Point Number Range 1000 shown in block 1010 as a horizontal number line divided into regions of interest by numerous terms. The definitions of the terms are defined in Table-1.

Floating Point Special Numbers

The following list shown in Table-1 comprises three columns. The first column lists the definition of a special floating point numbers. The second column lists the value in BF16 floating point encoding format. The third column shows the value in floating point encoding FP32 format.

In the comment columns of Table 1, the term (+)Nan includes the value 7F81 in BF16 and the value 7F800001 in FP32, as both conventions for representing NaN. The term (+)Norm is listed as (+)Pi, (3.14 . . . ) and the term (−)Norm is listed as (−)Pi for testing purposes. The terms (+)DeNorm and (−)DeNorm are the smallest representable values. There are two representations of (+)Zero and the (−)Zero, the difference being the most significant sign bit. This is also true for all the other terms regarding the sign bit.

TABLE 1

| Definition | BF16 | FP32 | BF16 Comments | FP32 Comments |
| --- | --- | --- | --- | --- |
| (+)Infinity | 0x7F80 | 0x7F800000 | | |
| (−)Infinity | 0xFF80 | 0xFF800000 | | |
| (+)Zero | 0x0000 | 0x00000000 | | |
| (−)Zero | 0x8000 | 0x80000000 | | |
| (+)Nan | 0x7FC0 | 0x7FC00000 | or 7F81 | or 7F800001 |
| (−)Nan | 0xFFC0 | 0xFFC00000 | | |
| (+)Norm | 0x4049 | 0x40490FDB | (+)Pi is a value for testing | |
| (−)Norm | 0xC049 | 0xC0490FDB | (−)Pi is a value for testing | |
| (+)MaxNorm | 0x7F7F | 0x7F7FFFFF | | |
| (−)MaxNorm | 0xFF7F | 0xFF7FFFFF | | |
| (+)MinNorm | 0x0080 | 0x00800000 | | |
| (−)MinNorm | 0x8080 | 0x80800000 | | |
| (+)DeNorm | 0x0001 | 0x00000001 | Smallest | |
| (−)DeNorm | 0x8001 | 0x80000001 | Smallest | |

The BFloat16 floating-point format, also known as the brain floating-point format, (sometimes "BF16") is a 16-bit numerical encoding format. BF16 retains an approximate dynamic range of an IEEE single precision number. The BF16 format includes a 7-bit fraction, also known as a mantissa or significand, an "implied bit" or "hidden bit", an 8-bit exponent, and one sign bit. Single-precision floating point values can convert to BF16 for accelerating machine learning. The dynamic range is the same as single-precision FP32 (8-bit exponent) using an 8-bit precision rather than a 24-bit fraction. BFloat16 can lower memory requirements, can lower storage requirements, and can increase machine learning algorithm calculation speeds. BF16 is a truncated 16-bit version of the 32-bit single-precision IEEE 754 format with the intent of accelerating Machine Learning.

A second numerical format is the IEEE 754 single-precision 32-bit floating point (FP32). The IEEE 754 single-precision 32-bit floating point includes a 23-bit fraction, an "implied" bit or "hidden bit", an 8-bit exponent, and one sign bit.

The following contents of Table-2 lists BFloat16 terms and their numerical definitions.

TABLE 2

| Term Name | Hex Value | Decimal Value | Comments |
| --- | --- | --- | --- |
| Zero offset | 0x7F | 127 | |
| Exponent Bias | 0x7F | 127 | |
| Emin | 0x01 − 0x7F | −126 | 1-127 |
| Emax | 0xFE − 0x7F | +127 | 254-127 |
| Exponent | 0x00 | 0 | (+)Zero or (−)Zero |
| Exponent | 0x01 − 0xFE | 1-254 | Normalized Value |
| Exponent | 0xFF | 255 | ±Infinity |

The following contents of Table-3 lists additional BFloat16 terms and their numerical definitions in binary format. Positive and negative infinity are defined as when all the exponent bits equal one and when all the fraction bits equal zero. Positive and negative NaN (not a number) are defined as when all the exponent bits equal one and when not all the fraction bits equal zero. Positive and negative DeNorm are defined as when all the exponent bits equal zero and when not all the fraction bits equal zero. Positive or negative infinity, NaN, or DeNorm depend on the sign bit.

TABLE 3

| Term | Sign | Exponent | Fraction | Comments |
| --- | --- | --- | --- | --- |
| +Inf | 0 | 11111111 | 0000000 | Positive Infinity |
| −Inf | 1 | 11111111 | 0000000 | Negative Infinity |
| +NaN | 0 | 11111111 | xxxxxxx | (Not a Number) Not all fraction bits are Zero |
| −NaN | 1 | 11111111 | xxxxxxx | (Not a Number) Not all fraction bits are Zero |
| +DeNorm | 0 | 00000000 | xxxxxxx | Denormalized Numbers Not all fraction bits are Zero |
| −DeNorm | 1 | 00000000 | xxxxxxx | Denormalized Numbers Not all fraction bits are Zero |

In some embodiments, the exception processing unit for machine learning operations does not support DeNormal or NaN Operations. The DeNormal numbers are treated as zero, and the NaN numbers are treated as infinity.

Exceptions

Chapter 7 of the IEEE std 754-2019 specification describes the five categories of floating-point exceptions listed below. According to one embodiment, three of the following categories are implemented: (1) Invalid Operation, (3) overflow, and (4) underflow. This embodiment does not support division by zero and inexact.

1) Invalid Operation
2) Division by zero
3) Overflow
4) Underflow
5) Inexact

According to some other embodiments, four of the categories are implemented: (1) Invalid Operation, (2) division by zero, (3) overflow, and (4) underflow. According to other embodiments, all five categories are implemented.

Invalid Operation

The IEEE std 754-2019 specification describes the following as invalid operations:
a) any general-computational operation on a signalling NaN;
b) multiplication: multiplication(0, ∞) or multiplication(∞, 0);
c) fusedMultiplyAdd: fusedMultiplyAdd(0, ∞, c) or fusedMultiplyAdd(∞, 0, c);
d) addition or subtraction or fusedMultiplyAdd: magnitude subtraction of infinities, such as addition(+∞, −∞);
e) division: division(0, 0) or division(∞, ∞);

f) remainder: remainder(x, y), when y is zero or x is infinite, and neither is a NaN;
g) SquareRoot if the operand is negative; and
h) quantize when the result does not fit in the destination format or when one operand is finite and the other is infinite.

According to one embodiment, the exception processing in a carry-save accumulation unit implements the invalid operations a/b/c/d listed above. According to another embodiment, any combination of the categories (a) through (h) are possible.

Invalid Operation Exception

The following contents of Table-4 list invalid operations that generate exceptions.

TABLE 4

| Action | First Operand | Second Operand | Comment | Result |
|---|---|---|---|---|
| Multiplier | (±)Inf | (±)0 | And vice versa | Positive infinity |
| Adder Norm/Rounding | (+)Inf | (−)Inf | And vice versa | Positive infinity |

Overflow Exception

The following contents of Table-5 list overflow exceptions for the one example of the two operands MaxNorm is multiplied by MaxNorm. These overflow exceptions generate the result "Signed Infinity". This overflow exception occurs when the results are larger than Signed MaxNorm and only when no Infinity value exists on the input to the operand.

TABLE 5

| Action | First Operand | Second Operand | Comment | Result |
|---|---|---|---|---|
| Multiplier | MaxNorm | MaxNorm | And vice versa | Signed Infinity |
| Adder Norm/Rounding | MaxNorm | MaxNorm | And vice versa | Signed Infinity |

Underflow Exception

In one embodiment, several cases exist where the results are smaller than signed MinNorm. This exception occurs when there is no exact Zero value on the operand input. When adder Norm/Rounding: (+) Norm+(−)Norm occurs, the result is the DeNormal value (but not Exact Zero), but the Actual result will be "Signed Zero". See Table-6 showing one example where the two operands MinNorm is multiplied by MinNorm.

TABLE 6

| Action | First Operand | Second Operand | Comment | Result |
|---|---|---|---|---|
| Multiplier | MinNorm | MinNorm | And vice versa | Signed Zero |
| Adder Norm/Rounding | (+)Norm | (−)Norm | And vice versa | Signed Zero |

In some embodiments, exception processing can be divided into "exception flag generation" and "exception result generation". Exceptions are processed for example on both floating-point multiplier block 1110 and the floating-point carry-save adder block 1130 of FIG. 12A.

Exception Flag Generation

In some embodiments, Floating-Point multiplier exception flags are provided for: (1) overflow, (2) underflow, and (3) Invalid.

In some embodiments, the following floating-point adder exception flags are provided: (1) the overflow, (2) the underflow, and (3) and the invalid.

Exception Result Generation

The operations of exception processing are explained on the IEEE std 754-2019 Chapter 6. The following two tables summarize one embodiment and implementation for multiplication and adder operations.

Multiplier Operations

According to one embodiment, the contents of Table-7 list multiplication operations with comments of invalid, underflow, and overflow operations.

TABLE 7

| Operation | Operand #1 | Operand #2 | Result | Comment |
|---|---|---|---|---|
| Multiplication | (+)Zero | (+)Zero | (+)Zero | |
| Multiplication | (+)Zero | (−)Zero | (−)Zero | |
| Multiplication | (+)Zero | (+)Inf | (+)Inf | Invalid |
| Multiplication | (+)Zero | (−)Inf | (+)Inf | Invalid |
| Multiplication | (+)Zero | (+)Norm | (+)Zero | |
| Multiplication | (+)Zero | (−)Norm | (−)Zero | |
| Multiplication | (−)Zero | (−)Zero | (+)Zero | |
| Multiplication | (−)Zero | (+)Inf | (+)Inf | Invalid |
| Multiplication | (−)Zero | (−)Inf | (+)Inf | Invalid |
| Multiplication | (−)Zero | (+)Norm | (−)Zero | |
| Multiplication | (−)Zero | (−)Norm | (+)Zero | |
| Multiplication | (+)Inf | (+)Inf | (+)Inf | |
| Multiplication | (+)Inf | (−)Inf | (−)Inf | |
| Multiplication | (+)Inf | (+)Norm | (+)Inf | |
| Multiplication | (+)Inf | (−)Norm | (−)Inf | |
| Multiplication | (−)Inf | (−)Inf | (+)Inf | |
| Multiplication | (−)Inf | (+)Norm | (−)Inf | |
| Multiplication | (−)Inf | (−)Norm | (+)Inf | |
| Multiplication | (+)Norm | (−)Norm | (−)Norm | |
| Multiplication | (+)Norm | (+)Norm | (+)Norm | |
| Multiplication | (−)Norm | (−)Norm | (+)Norm | |
| Multiplication | (+)MaxNorm | (+)MaxNorm | (+)Inf | Overflow |
| Multiplication | (+)MaxNorm | (−)MaxNorm | (−)Inf | Overflow |
| Multiplication | (+)MaxNorm | (+)MinNorm | (+)Norm | |
| Multiplication | (+)MaxNorm | (−)MinNorm | (−)Norm | |
| Multiplication | (+)MaxNorm | (+)DeNorm | (+)Zero | |
| Multiplication | (+)MaxNorm | (−)DeNorm | (−)Zero | |
| Multiplication | (−)MaxNorm | (−)MaxNorm | (+)Inf | Overflow |
| Multiplication | (−)MaxNorm | (+)MaxNorm | (−)Inf | |
| Multiplication | (−)MaxNorm | (−)MaxNorm | (+)Inf | |
| Multiplication | (−)MaxNorm | (+)DeNorm | (−)Zero | |
| Multiplication | (−)MaxNorm | (−)DeNorm | (+)Zero | |
| Multiplication | (+)MinNorm | (+)MinNorm | (+)Zero | Underflow |
| Multiplication | (+)MinNorm | (−)MinNorm | (−)Zero | Underflow |
| Multiplication | (+)MinNorm | (+)DeNorm | (+)Zero | |
| Multiplication | (+)MinNorm | (−)DeNorm | (−)Zero | |
| Multiplication | (−)MinNorm | (−)MinNorm | (+)Zero | Underflow |
| Multiplication | (−)MinNorm | (+)DeNorm | (−)Zero | |
| Multiplication | (−)MinNorm | (−)DeNorm | (+)Zero | |
| Multiplication | (+)DeNorm | (+)DeNorm | (+)Zero | |
| Multiplication | (+)DeNorm | (−)DeNorm | (−)Zero | |
| Multiplication | (−)DeNorm | (−)DeNorm | (+)Zero | |

Addition Operations

According to one embodiment, the contents of Table-8 list of adder operations with comments of Invalid and Overflow operations.

TABLE 8

| Operation | Operand #1 | Operand #2 | Result | Comment |
|---|---|---|---|---|
| Adder | (+)Zero | (+)Zero | (+)Zero | |
| Adder | (+)Zero | (−)Zero | (+)Zero | |
| Adder | (+)Zero | (+)Inf | (+)Inf | |
| Adder | (+)Zero | (−)Inf | (−)Inf | |
| Adder | (+)Zero | (+)Norm | (+)Norm | |
| Adder | (+)Zero | (−)Norm | (−)Norm | |
| Adder | (−)Zero | (−)Zero | (−)Zero | |

TABLE 8-continued

| Operation | Operand #1 | Operand #2 | Result | Comment |
|---|---|---|---|---|
| Adder | (−)Zero | (+)Inf | (+)Inf | |
| Adder | (−)Zero | (−)Inf | (−)Inf | |
| Adder | (−)Zero | (+)Norm | (+)Norm | |
| Adder | (−)Zero | (−)Norm | (−)Norm | |
| Adder | (+)Inf | (+)Inf | (+)Inf | |
| Adder | (+)Inf | (−)Inf | (+)Inf | Invalid |
| Adder | (+)Inf | (+)Norm | (+)Inf | |
| Adder | (+)Inf | (−)Norm | (+)Inf | |
| Adder | (−)Inf | (−)Inf | (−)Inf | |
| Adder | (−)Inf | (+)Norm | (−)Inf | |
| Adder | (−)Inf | (−)Norm | (−)Inf | |
| Adder | (+)Norm | (−)Norm | (+)Norm | |
| Adder | (+)Norm | (+)Norm | (+)Norm | |
| Adder | (−)Norm | (−)Norm | (−)Norm | |
| Adder | (+)MaxNorm | (+)MaxNorm | (+)Inf | Overflow |
| Adder | (+)MaxNorm | (−)MaxNorm | (+)Zero | |
| Adder | (+)MaxNorm | (+)MinNorm | (+)MaxNorm | |
| Adder | (+)MaxNorm | (−)MinNorm | (+)MaxNorm | |
| Adder | (+)MaxNorm | (+)DeNorm | (+)MaxNorm | |
| Adder | (+)MaxNorm | (−)DeNorm | (+)MaxNorm | |
| Adder | (−)MaxNorm | (−)MaxNorm | (−)Inf | Overflow |
| Adder | (−)MaxNorm | (+)MinNorm | (−)MaxNorm | |
| Adder | (−)MaxNorm | (−)MinNorm | (−)MaxNorm | |
| Adder | (−)MaxNorm | (+)DeNorm | (−)MaxNorm | |
| Adder | (−)MaxNorm | (−)DeNorm | (−)MaxNorm | |
| Adder | (+)MinNorm | (+)MinNorm | (+)Norm | |
| Adder | (+)MinNorm | (−)MinNorm | (+)Zero | |
| Adder | (+)MinNorm | (+)DeNorm | (+)MinNorm | |
| Adder | (+)MinNorm | (−)DeNorm | (+)MinNorm | |
| Adder | (−)MinNorm | (−)MinNorm | (−)Norm | |
| Adder | (−)MinNorm | (+)DeNorm | (−)MinNorm | |
| Adder | (−)MinNorm | (−)DeNorm | (−)MinNorm | |
| Adder | (+)DeNorm | (+)DeNorm | (+)Zero | |
| Adder | (+)DeNorm | (−)DeNorm | (+)Zero | |
| Adder | (−)DeNorm | (−)DeNorm | (−)Zero | |

An exception handling circuit is described herein to detect at least one invalid operation or result in the multiplier and at least one invalid operation or result in the adder, according to the floating point encoding format, and to set the output operand of the multiplier or adder to a value useable in further processing.

High Level Architecture

Figure 11:
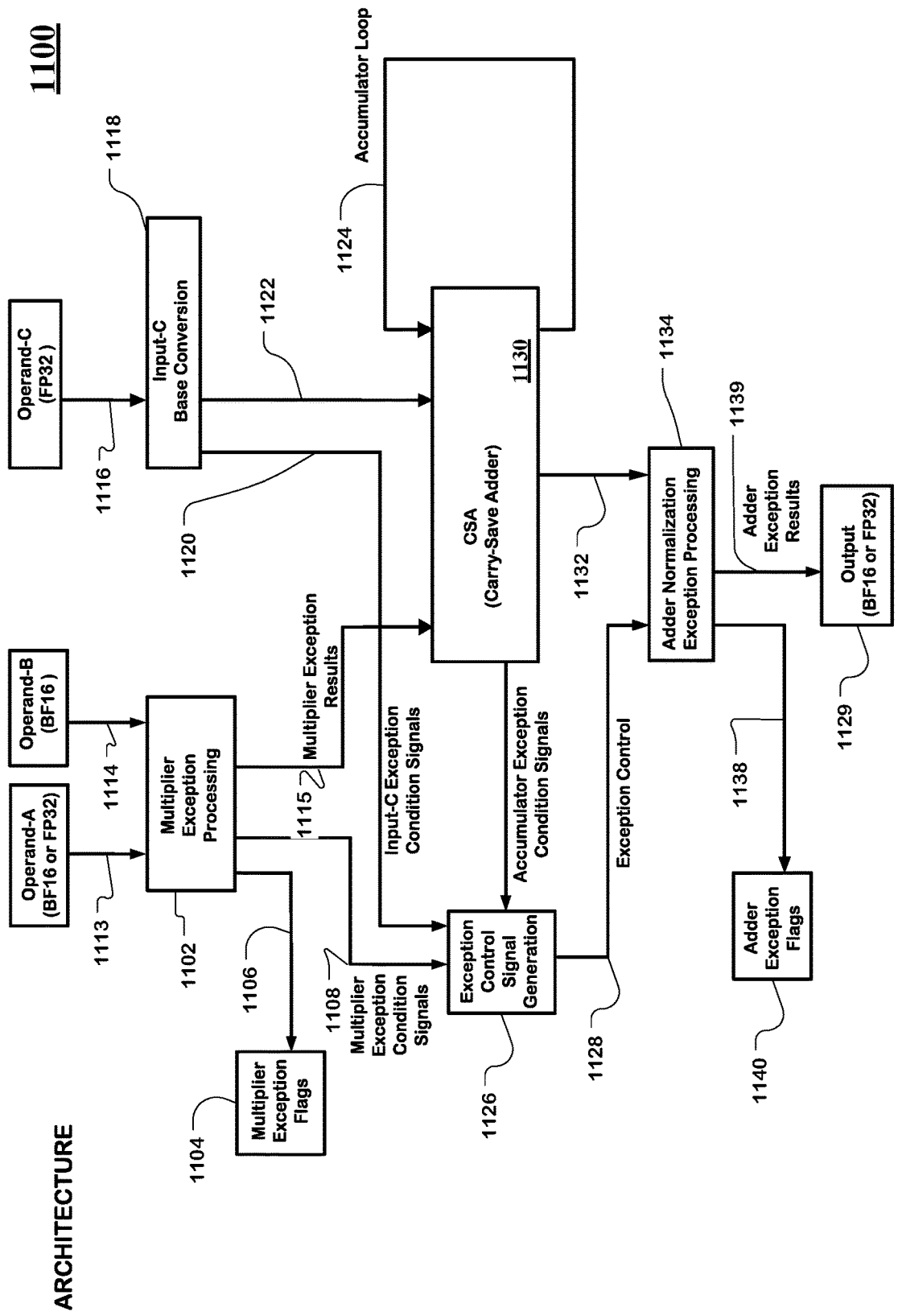
FIG. 11 shows a high level architecture block diagram depicting elements of exception processing in a carry-save accumulation unit for machine learning.

FIG. 11 illustrates one example high level architecture block diagram 1100 depicting elements of exception processing in carry-save accumulation unit for machine learning.

In one embodiment, the exception processing in a carry-save accumulation unit design comprises three different input signals. These are Operand-A 1113, Operand-B 1114, and Operand-C 1116. Operand-A 1113 can be in both BF16 and FP32 formats. Operand-B 1114 is a BF16 format and Operand-C 1116 is FP32 format. The Operands are also known as inputs.

A multiplier exception Processing block 1102 ingests Operand-A 1113 and Operand-B 1114. The output of the multiplier exception Processing block 1102 is connected to the following: (1) multiplier exception flags 1104 via bus 1106, (2) exception output control signal generation 1126 via bus multiplier exception condition signals 1108, and (3) multiplier exception results 1115.

Operand-C, 1116, in FP32 format enters the Operand-C Base Conversion block 1118 and outputs to: (1) the exception output control signal generation 1126, via Operand-C exception condition signals bus 1120, and (2) to the carry-save adder block 1130 via bus 1122.

The carry-save adder (CSA) block 1130 processes the two inputs: (1) the multiplier exception results 1115, and (2) the output from the Operand-C Base Conversion block 1118, via bus 1122. In one embodiment, the CSA block 1130 has an Accumulator Loop 1124 which will output data only at the end of the loop. The CSA block 1130 outputs via bus 1132.

An adder normalization exception processing block 1134 ingests two inputs. The first input is the CSA block 1130 output via bus 1132. The second input is the exception control 1128 from the exception output control signal generation 1126 block.

The outputs from the adder normalization exception processing block 1134 are the adder exception results 1139 and the bus 1138 which routes to the adder exception flags block 1140.

Operand-A is a 32-Bit bus and provides BF16 input for a multiplication operation and FP32 for the addition operation. Operand-B is only used for multiplication operation purpose and always has BF16 16-Bit input format. Operand-C is used for addition operation or accumulator initialization, and always has an FP32 32-bit input format. The Multiplier part has separated output flags (overflow, underflow and invalid) and the multiplier exception results become the direct input of the adder. The exception condition signals for the adder are generated from the multiplier and connected to the "exception control signals generation" block and with the exception condition signals from Operand-C and the accumulator, is generating "exception control" signals for the adder normalization block for adder exception processing.

Operating Modes

According to one embodiment, the exception processing in a carry-save accumulation unit design supports three different operating modes.

Figure 12A:
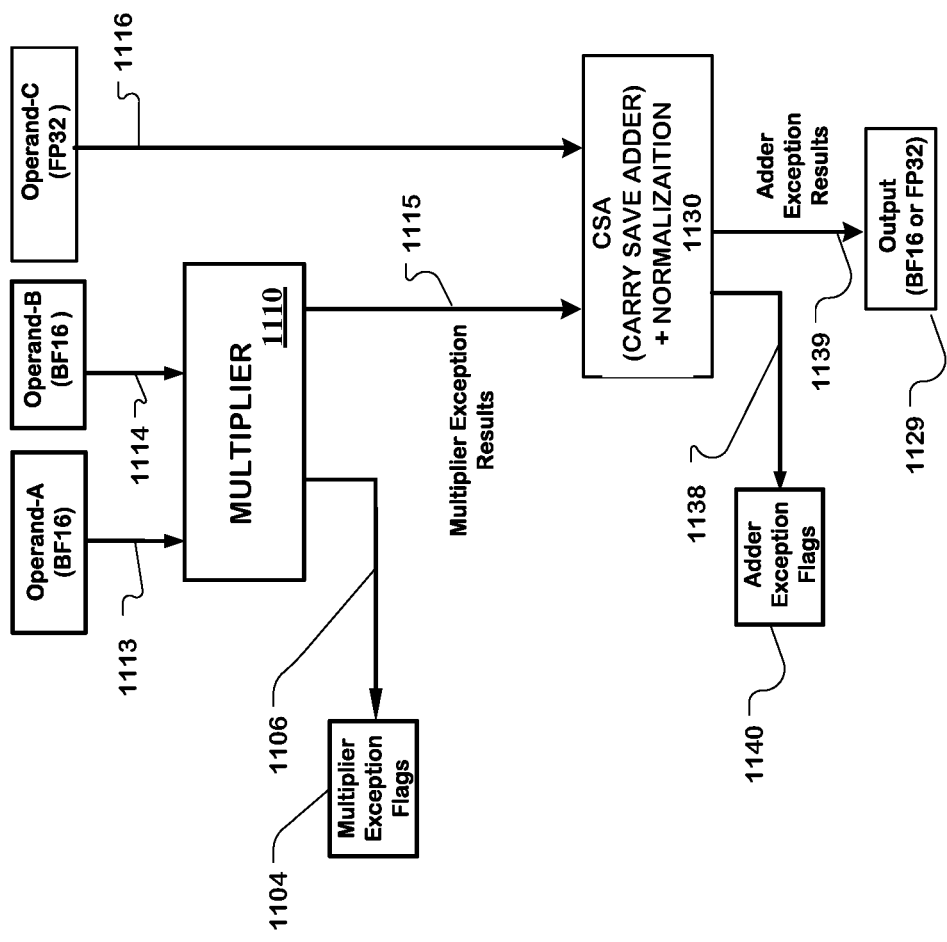
FIG. 12A illustrates a first operating mode high level block diagram architecture comprising Input-A in BF16 format, Input-B in BF16 format, and Input-C in FP32 format, where BF16 designates 16-bit Machine Learning Floating point encoding format known as "B-float", or (Brain Floating Point) developed by Google, while FP32 designates 32-bit Single Precision IEEE 754 standard representation.

FIG. 12A illustrates a first operating mode 1200 according to the high level block diagram architecture of FIG. 11. A multiply-addition operation is shown with Operand-A 1113 in BF16 format which is first multiplied with Operand-B 1114 in BF16 format and then the product is added to Operand-C 1116 in FP32 format. The multiply-addition operation is done in a single operation. This operation generates both multiplication and addition exception flags and results.

A multiplier block 1110 ingests Operand-A 1113 and Operand-B 1114. The output of the multiplier block 1110 is connected to the following: (1) multiplier exception flags 1104 block via the bus 1106, and (2) connects the multiplier exception results 1115 to the carry-save adder (CSA) block 1130. In some embodiments, the first operating mode uses the multiplier exception flags 1104 for statistical purposes.

The carry-save adder (CSA) block 1130 processes the following two inputs: (1) multiplier exception results 1115 and (2) Operand-C 1116. The CSA block 1130 has two outputs. A first output is the adder exception results 1139 which routes to the output block 1129 in BF16 or FP32 format. A second output is the bus 1138 which routes to the adder exception flags block 1140.

Figure 12B:
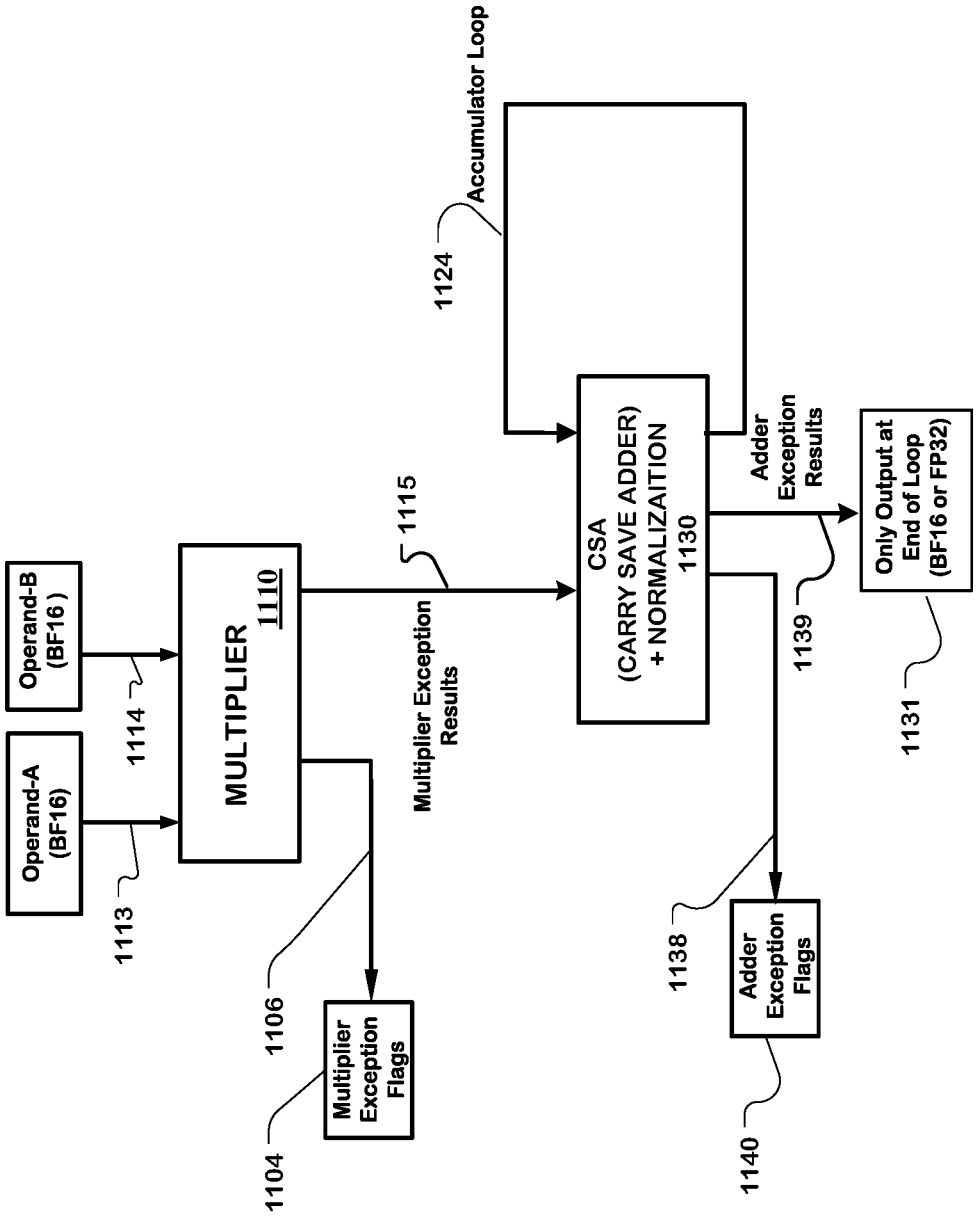
FIG. 12B illustrates a second operating mode high level block diagram architecture comprising Input-A in BF16 format, Input-B in BF16 format, and executing accumulation.

FIG. 12B illustrates a second operating mode 1202 according to the high level block diagram architecture of FIG. 11. A multiply-accumulation operation is shown with Operand-A 1113 in BF16 format multiplied with Operand-B 1114 in BF16 in a single operation. It generates the output results at the end of the accumulation loop. During the accumulation, the adder output and adder exceptions are disabled. This operation generates both multiplication and addition exception flags and results.

A multiplier block 1110 ingests Operand-A 1113 and Operand-B 1114. The output of the multiplier block 1110 is connected to the following blocks: (1) the multiplier exception flags 1104 via bus 1106, and (2) the carry-save adder (CSA) 1130 via the multiplier exception results 1115. In some embodiments, a second operating mode uses the multiplier exception flags 1104 for statistical purposes.

The carry-save adder (CSA) block 1130 processes the following two inputs: (1) the multiplier exception results 1115 and the Accumulator Loop 1124. The CSA block 1130 has two outputs. A first output is the adder exception results 1139 which routes to the output block 1131 in BF16 or FP32 format only at the end of the Accumulator Loop 1124. A second output is the bus 1138 which routes to the adder exception flags block 1140.

Figure 12C:
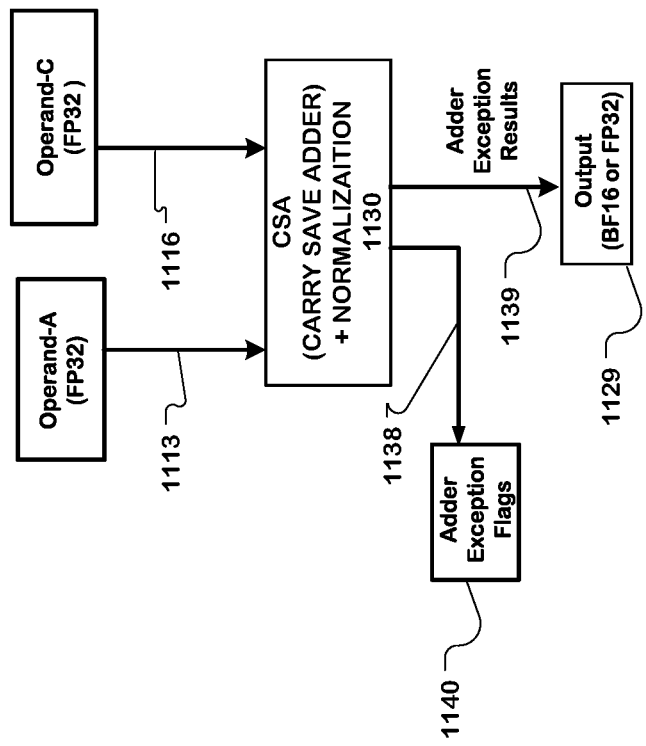
FIG. 12C illustrates a third operating mode high level block diagram architecture comprising Input-A in FP32 format and Input-C in FP32 format.

FIG. 12C illustrates a third operating mode 1203 according to the high level block diagram architecture of FIG. 11. An addition operation is shown with Operand-A 1113 in FP32 format summed with Operand-C 1116 in FP32 format. This operation generates only addition exception flags and results. The multiplier exception processing is disabled.

The carry-save adder (CSA) block 1130 sums two inputs. The Operand-A 1113 in FP32 format is summed with Operand-C 1116 in FP32 format. The CSA block 1130 has two outputs. A first output is the adder exception results 1139 which routes to the output block 1129 in BF16 or FP32 format. A second output is the bus 1138 which routes to the adder exception flags block 1140.

Exception Processing Structure

According to some embodiments, exception processing is divided into "exception flag generation" and "exception result generation" and both parts can also be separated into multiplier and adder exceptions.

The multiplier and adder flag generation produces the overflow, the underflow, and the invalid flags. These flags are shown below in the application as a group of circuit implementation.

The multiplier and adder exception result generation comprises three conditions: (1) sign generation, (2) exponent generation, and (3) fraction generation. The sign has positive or negative outputs. The exponent can have All '0' and All '1' conditions when exception cases occur and normal output when there are no occurrences of exception cases. The fraction value can have two conditions; they are either All '0' for all the exception conditions and normal for non-exception cases.

Figure 13:
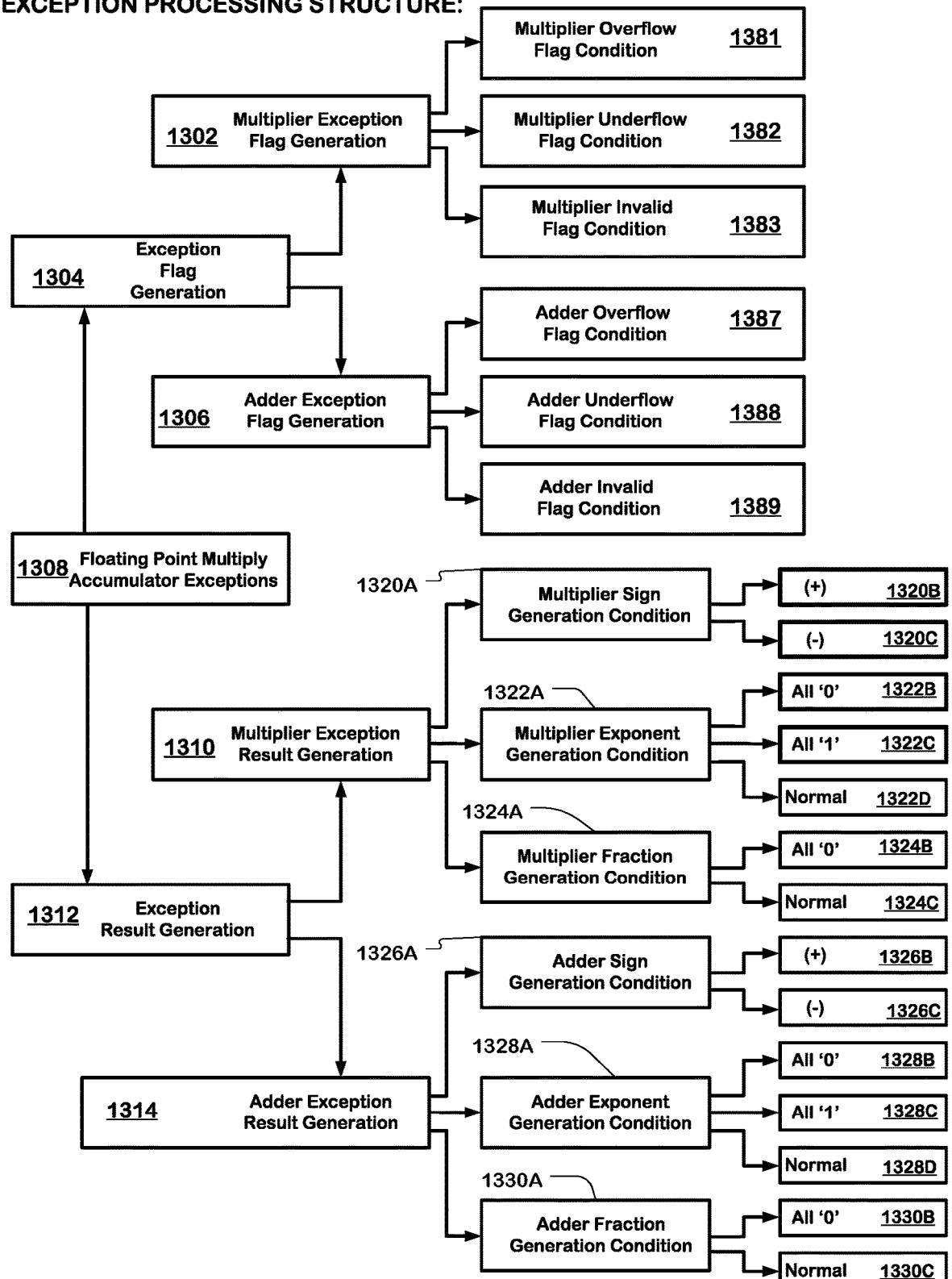
FIG. 13 illustrates a high level block diagram of the exception processing structure.

FIG. 13 illustrates an exception processing structure 1300 depicted in a high level block diagram. A floating point multiply accumulator exceptions block 1308 outputs flags to the exceptions flag generation block 1304 and outputs results to the exceptions result generation block 1312. The flags comprise state information, or data for processing by dedicated exception processing blocks as will be further described below.

The exceptions flag generation block 1304 can output flags to either the multiplier exception flag generation block 1302 or the adder exception flag generation block 1306. The multiplier exception flag generation block 1302 drives the multiplier overflow flag condition block 1381, the multiplier underflow flag condition block 1382, and the multiplier invalid flag condition block 1383.

The adder exception flag generation block 1306 drives the adder overflow flag condition block 1387, the adder underflow flag condition block 1388, and the adder Invalid flag condition block 1389.

The exceptions result generation block 1312 provides the results to the multiplier exception result generation block 1310 and the adder exception result generation block 1314.

The multiplier exception result generation block 1310 outputs the results to: (1) the multiplier sign generation condition block 1320A, (2) the multiplier exponent generation condition block 1322A, and (3) the multiplier fraction generation condition block 1324A.

The adder exception result generation block 1314 outputs the results to: (1) the adder sign generation condition block 1326A, (2) the adder exponent generation condition block 1328A, and (3) the adder fraction generation condition block 1330A.

The multiplier sign generation condition block 1320A outputs conditions to blocks 1320B and 1320C. The multiplier exponent generation condition block 1322A outputs conditions to blocks 1322B, 1322C, and 1322D. The multiplier fraction generation condition block 1324A outputs conditions to blocks 1324B and 1324C.

The adder sign generation condition block 1326A outputs conditions to blocks 1326B and 1326C. The adder exponent generation condition block 1328A outputs conditions to blocks 1328B, 1328C, and 1328D. The adder fraction generation condition block 1330A outputs conditions to blocks 1330B and 1330C.

The following figures, from FIG. 14A to FIG. 21B, illustrate schematic implementations of high level blocks shown in FIG. 13. For example, block 1381 in FIG. 13 is implemented in FIG. 14A, block 1382 is implemented in FIG. 14B. The following figure titles correspond to the block names of FIG. 13.

Condition Circuitry

Figure 14A:
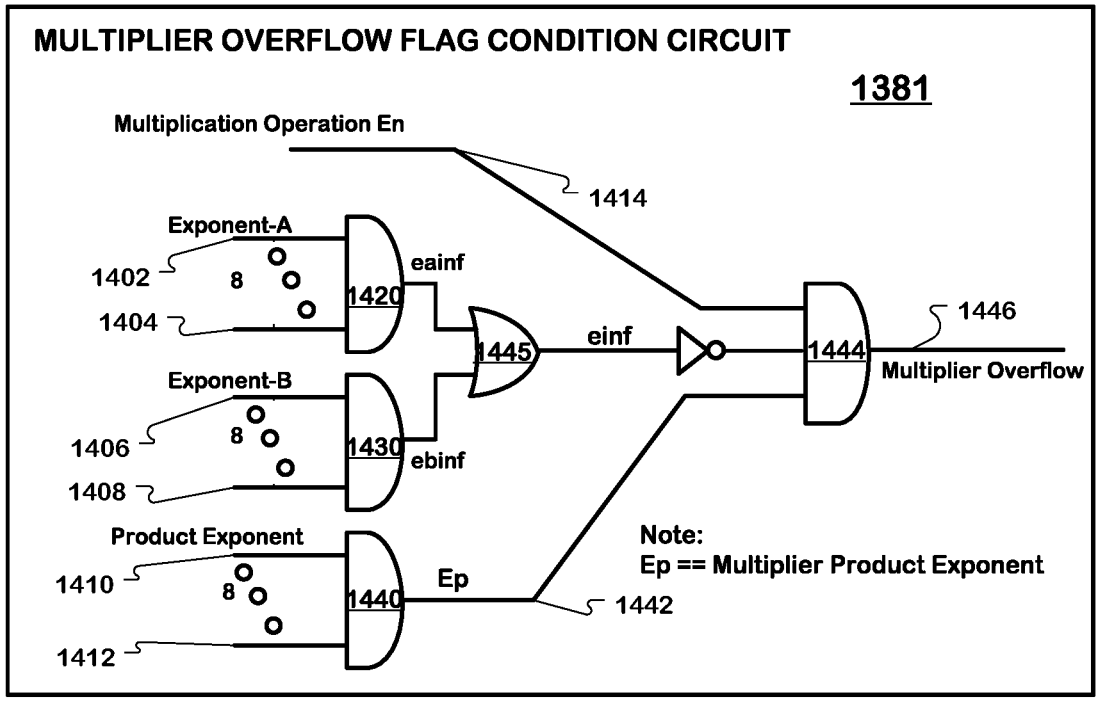
FIG. 14A depicts a multiplier overflow flag condition circuit.

FIG. 14A depicts one implementation 1400 of a multiplier overflow flag condition circuit 1381. The schematic shows the multiplier overflow flag condition 1446 is active on a high level output from the multiplier overflow AND gate 1444. The AND gate 1444 has the following three inputs: (1) the multiplication operation enable 1414, (2) the output of NOR gate 1445, and (3) 1442, which is the output of product exponent AND gate 1440 and is also known as Ep (exponent product) and the multiplier product exponent.

The NOR gate 1445 has two inputs eainf and ebinf, The signal exponent A infinity (eainf) occurs if Input-A is Infinity and is detected when the exponent equals 0xFF (means all '1'). The signal exponent B infinity (ebinf) occurs if Input-B is Infinity and is detected when the exponent equals 0xFF (means all '1'). Table-2 shown above defines BFloat16 terms and their numerical definitions. Eainf is the output of AND gate 1420. The input to AND gate 1420 is the exponent of Operand-A is and is shown having a least significant bit (LSB) 1402 and a most significant bit (MSB) 1404, comprising eight exponent bits.

Ebinf is the output of AND gate 1430. The input to AND gate 1430 is the exponent of Operand-B is and is shown having a least significant bit (LSB) 1406 and a most significant bit (MSB) 1408, comprising eight exponent bits.

The inputs to the product exponent AND gate 1440 inputs are the least significant bit (LSB) 1410 and the most significant bit (MSB) 1412, comprising eight exponent bits.

Figure 14B:
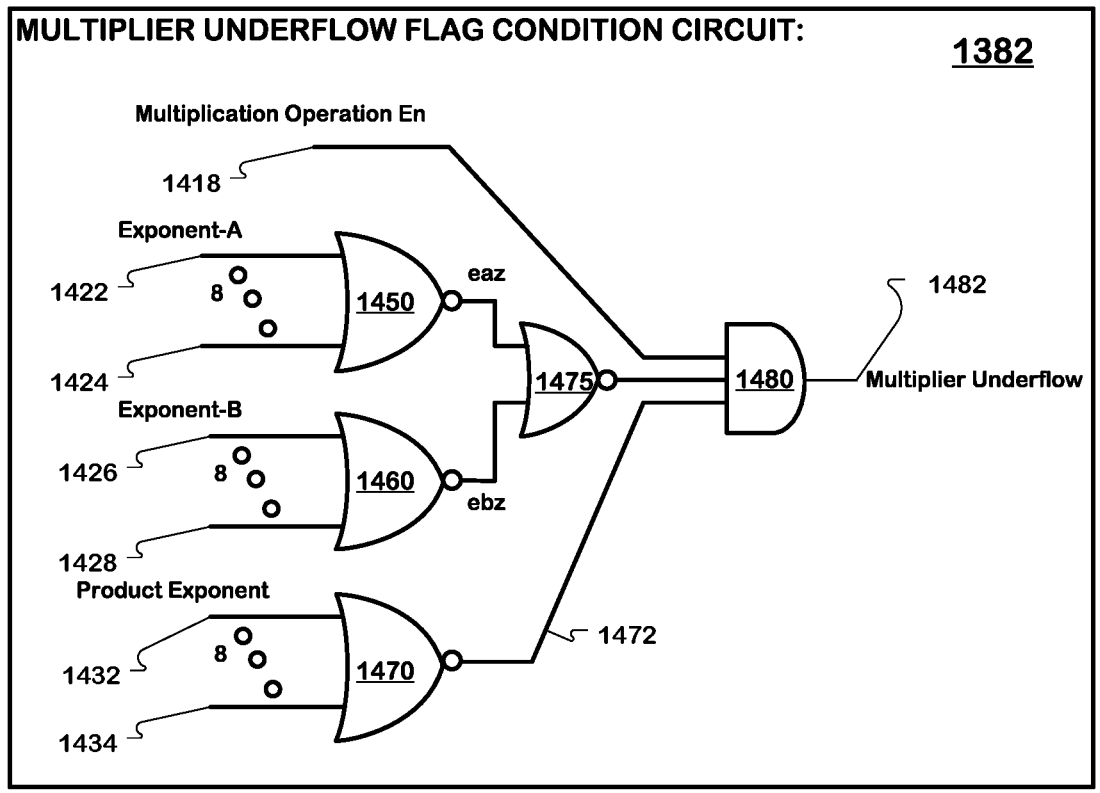
FIG. 14B shows a multiplier underflow flag condition circuit.

FIG. 14B depicts one implementation 1400 of a multiplier underflow flag condition circuit 1382. The multiplier underflow flag condition 1482 is active on a high level output from the multiplier underflow AND gate 1480. The AND gate 1480 has the following three inputs: (1) the multiplication operation enable 1418, (2) the output of NOR gate 1475, and (3) 1472, which is the output of product exponent NOR gate 1470.

The NOR gate 1475 has two inputs, eaz (Input-A exponent is zero) and ebz (Input-B exponent is zero). Eaz is the output of NOR gate 1450. The input to NOR gate 1450 is the exponent of Operand-A is and is shown having a least significant bit (LSB) 1422 and a most significant bit (MSB) 1424, comprising eight exponent bits.

Ebz is the output of NOR gate 1460. The input to NOR gate 1460 is the exponent of Operand-B is and is shown having a least significant bit (LSB) 1426 and a most significant bit (MSB) 1428, comprising eight exponent bits.

The inputs to the product exponent NOR gate 1470 inputs are the least significant bit (LSB) 1432 and the most significant bit (MSB) 1434, comprising eight exponent bits.

Assertion of the multiplier underflow flag occurs when the multiplication operation is enabled, the Ep (product exponent) is 0x00, and any of multiplier exponent input is not zero. A multiplier exponent input which is not zero means any of the exponents of Operand-A or Operand-B are not 0x00.

Assertion of the multiplier invalid flag occurs according to the following two conditions: (1) the multiplication operation is enabled and (2) the invalid is '1'. An invalid "1" is defined as the condition when either the Operand-A exponent is infinity (0xFF) and Operand-B exponent is zero (0x00), or when the Operand-B exponent is infinity (0xFF) and Operand-A exponent is zero(0x00).

Figure 15:
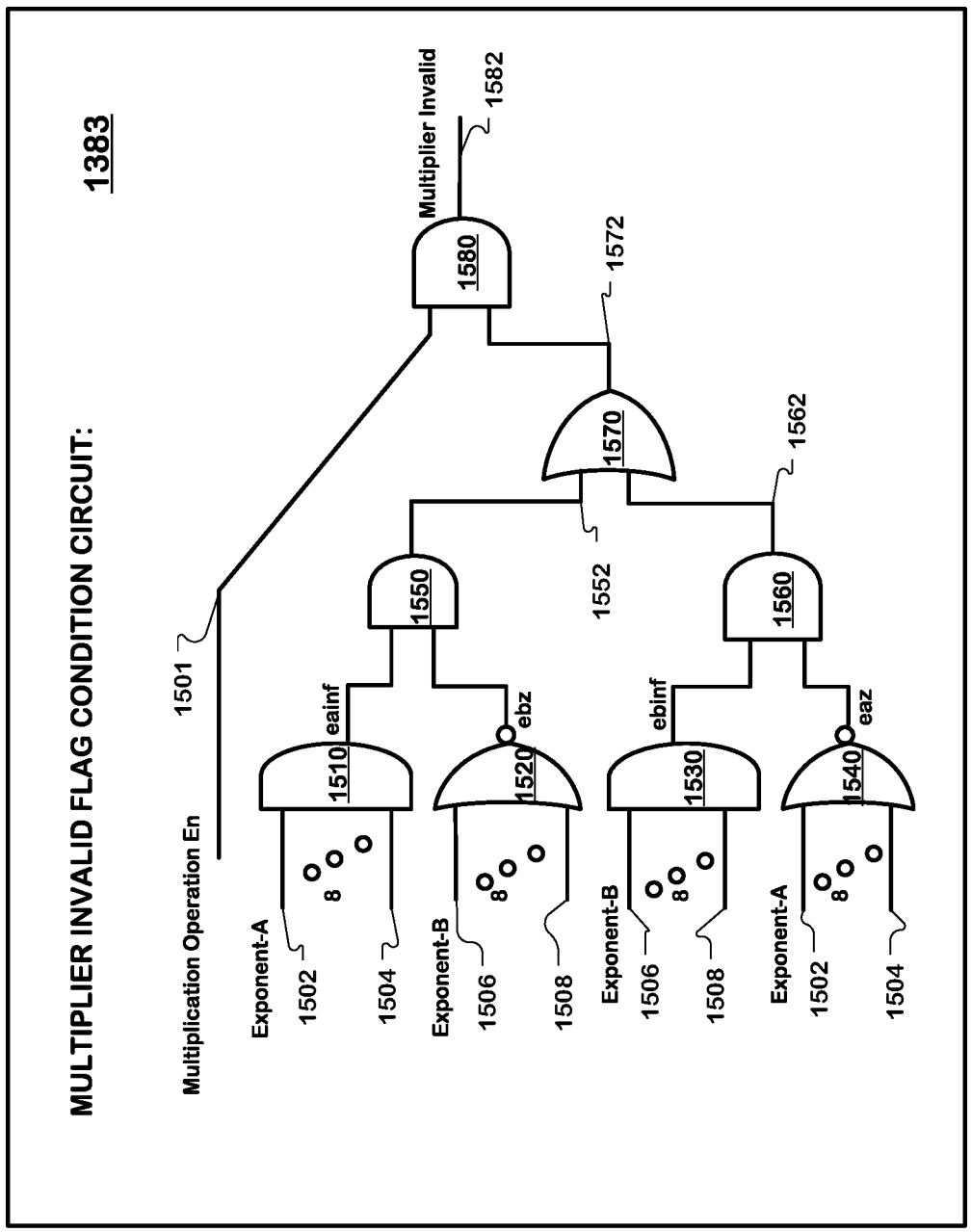
FIG. 15 illustrates a multiplier invalid flag condition circuit.

FIG. 15 depicts one implementation 1500 of a multiplier Invalid flag condition circuit in block 1383. The multiplier Invalid flag condition 1582 is active on a high level output from the multiplier Invalid AND gate 1580. The AND gate 1580 has the following two inputs: (1) the multiplication operation enable 1501, and (2) 1572, the output of OR gate 1570.

The OR gate 1570 has two inputs, the first input is 1552 derived from AND gate 1550: the second input is 1562, derived from AND gate 1560.

The AND gate 1550 has the two inputs: eainf and ebz. The signal ebz occurs when Input-B is Zero, which is (+) Zero or (−) Zero, and the condition is the exponent is 0x00 (means all '0'). Eainf is the output of AND gate 1510. The input to AND gate 1510 is the exponent of Operand-A is and is shown having a least significant bit (LSB) 1502 and a most significant bit (MSB) eight bit 1504. Ebz is the output of NOR gate 1520. The input to NOR gate 1520 is the eight bit exponent of the Operand-B is and is shown having a least significant bit (LSB) 1506 and a most significant bit (MSB) 1508.

The AND gate 1560 has the two inputs: ebinf and eaz. Ebinf is the output of AND gate 1530. The input to AND gate 1530 is the eight bit exponent of the Operand-B and is shown having the least significant bit (LSB) 1506 and the most significant bit (MSB) 1508. Eaz is the output of NOR gate 1540. The signal eaz occurs when Input-A is Zero, which is (+) Zero or (−) Zero), and the exponent is 0x00 (means all '0'). The input to NOR gate 1540 is the exponent of Operand-A is and is shown having a least significant bit (LSB) 1502 and a most significant bit (MSB) eight bit 1504 comprising eight exponent bits.

Figure 16:
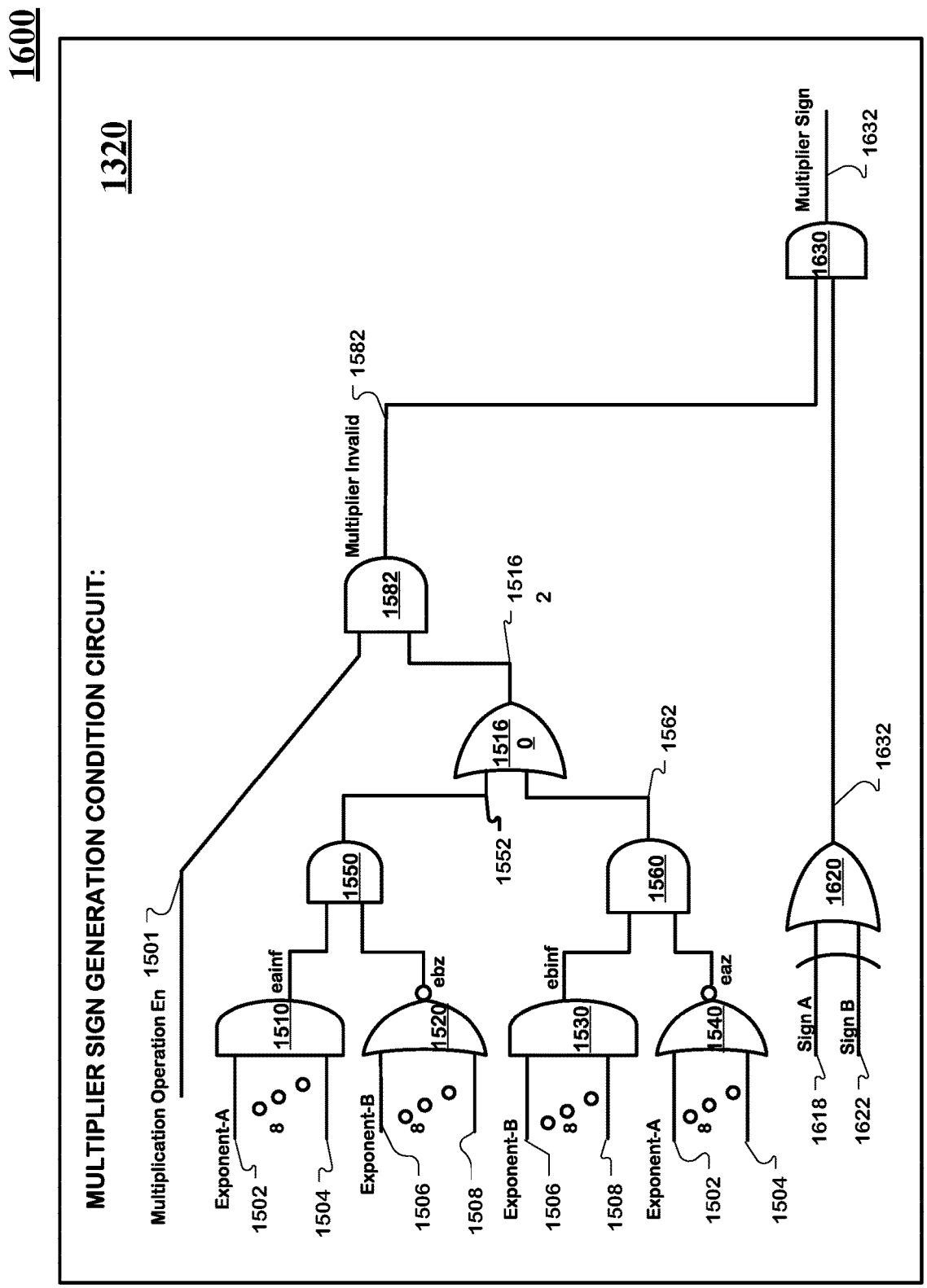
FIG. 16 depicts a multiplier sign generation condition circuit.

FIG. 16 depicts one implementation 1600 of a multiplier sign generation condition circuit 1320. A multiplier sign condition 1632 is generated by AND gate 1630. The multiplier Invalid flag condition 682 of FIG. 15 is a first input to the AND gate 1630. The second input to AND gate 1630 is 1632 which is derived from the output of the EX-OR gate 1620. The sign-A 1618 and sign-B 1622 comprise the inputs to the EX-OR gate 1620.

Figure 17A:
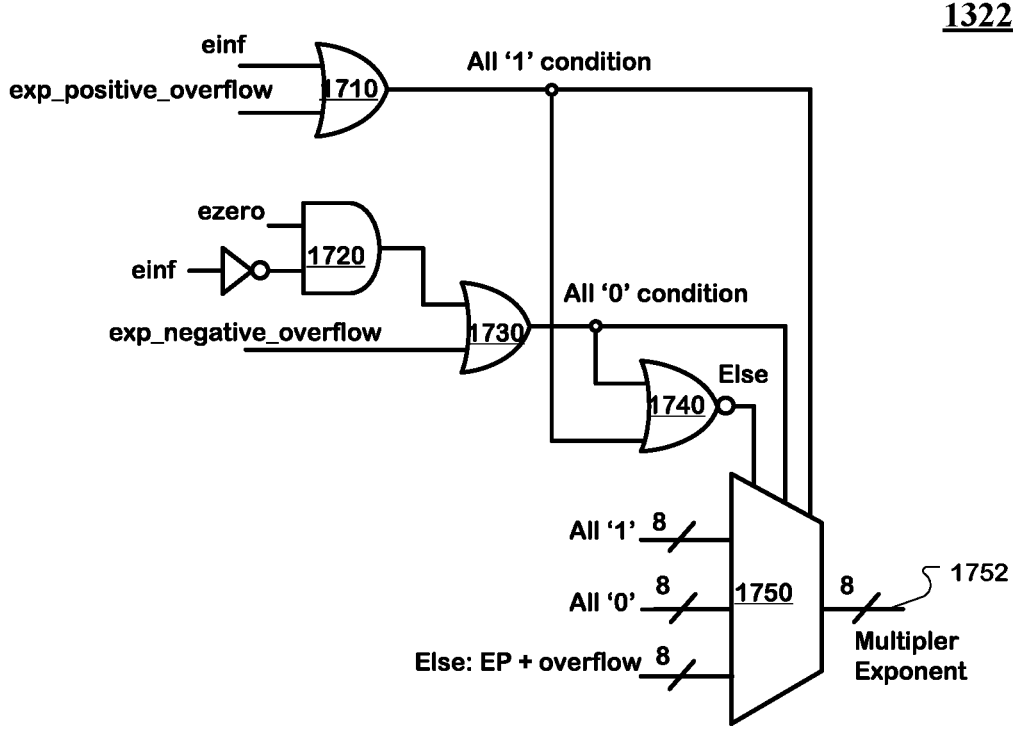
FIG. 17A shows a multiplier exponent generation condition circuit.

FIG. 17A shows one implementation 1700 of a multiplier exponent generation condition circuit 1322. The multiplier exponent 1752 is generated according to three conditions. These are: (1) All '0' (0x00=Zero), (2) All '1' (0xFF=infinity), and (3) Normal exponent.

The first condition is exponent All '0'. This first condition can occur if any exponent of Operand-A or any exponent Operand-B is zero. The first condition can also occur if the multiplier exponent calculation results in negative overflow, which means the multiplier exponent calculation results in a number smaller than −126.

The second condition is All '1'. This second condition can occur if any exponent of Operand-A or any exponent Operand-B is infinity. The second condition can also occur if the multiplier exponent calculation result is positive overflow, which means the result of the multiplier exponent calculation is greater than Emax (+127).

The third condition is Normal output and is defined as there is not a first or second condition that is occurring. This is defined as other than All '0' or All '1' conditions.

An eight bit wide multiplexer 1750 has three 8-bit buses as inputs. These are the All '0', the All '1' and Else buses. A Control gating using the OR gate 1710, the AND gate 1720, the OR gate 1730 and the NOR gate 1740 control the outputs of the multiplexer 1750.

Figure 17B:
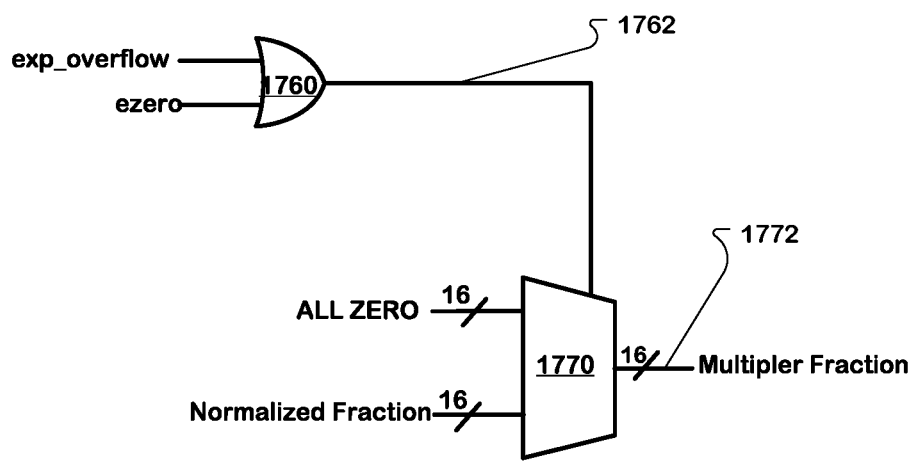
FIG. 17B depicts a multiplier fraction generation condition circuit.

FIG. 17B shows one implementation 1700 of a multiplier fraction generation condition circuit 1324. The multiplier fraction bus 1772 is 16 bits wide and generated according to two conditions: (1) exception, (2) normal fraction. The two multiplexer inputs are: (1) the All '0' condition (0x00=Zero), and (2) the normal fraction condition.

The multiplexer 1770 has two 16 bit input buses. These are the All '0', and fraction buses. The OR gate 1760 control the gating of the 1770 multiplex sixteen bit wide multiplex output.

The signals exp_overflow and ezero are the two inputs to the OR gate 1760. The signal exp_overflow is a logical OR of either a positive overflow or a negative overflow, where overflow is described above in FIG. 17A. In some embodiments, there is one status bit provided after the exponent calculation to detect an exponent overflow. The term ezero is defined as eaz (Input-A exponent is zero) or ebz (Input-B exponent is zero). The output of the OR gate 1760 is 1762 which is the control to choose between the two sixteen bit wide multiplexer 1770 input buses. All '0' occurs when: (1) the product exponent is positive overflow, or (2) there is negative overflow, or (3) the exponent of Operand-A is zero, or (4) the exponent of Operand-B is zero.

In some embodiments, exception processing in a carry-save accumulation unit does not support DeNormal or NaN operations. In this case, the DeNormal numbers are treated as zero, and the NaN numbers are treated as infinity. The fraction output will be All '0' when any of those exceptions happened. Otherwise the output of the multiplexer 1770 is Normalized Fraction.

Figure 18A:
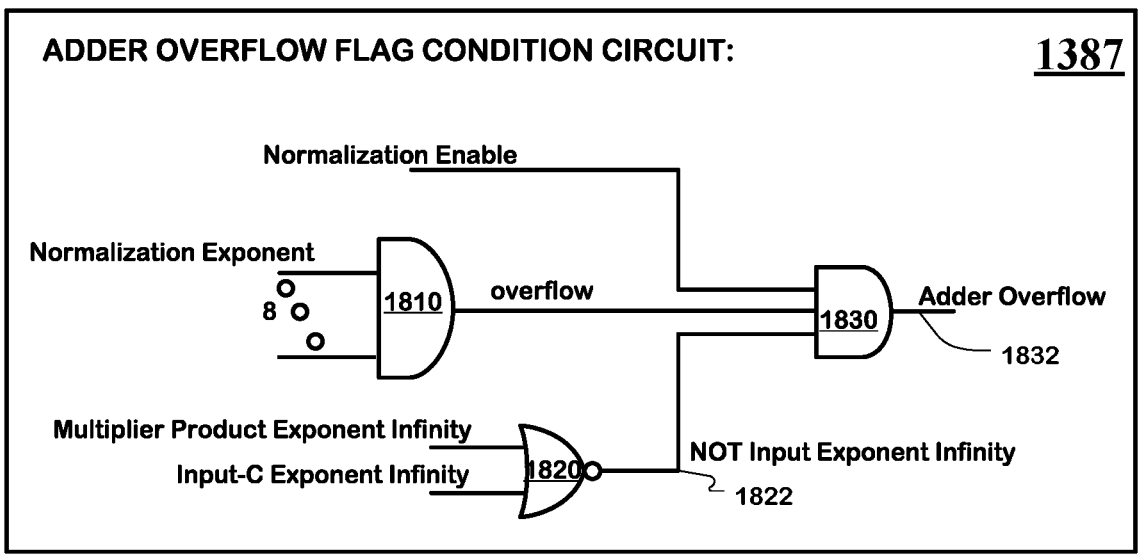
FIG. 18A illustrates an adder overflow flag condition circuit.

FIG. 18A illustrates one schematic implementation 1800 of an adder overflow flag condition circuit in block 1387. The signal named adder overflow 1832 demonstrates the overflow flag condition and is an output from the AND gate 1830. The adder overflow flag conditions occurs when AND gate 1830 has the following three inputs: (1) the normalization_enable, (2) the AND gate 1810 output named overflow, and (3) the NOR gate 1820 output named not input exponent infinity 1822. The inputs to the AND gate 1810 are the eight normalization exponent bits. The inputs to the NOR gate 1820 are the multiplier product exponent infinity and the input-C exponent infinity. In summary, during the normalization, an adder overflow 1832 flag condition can occur if the normalization exponent equals a 0xFF and there is no input having an exponent infinity condition.

Figure 18B:
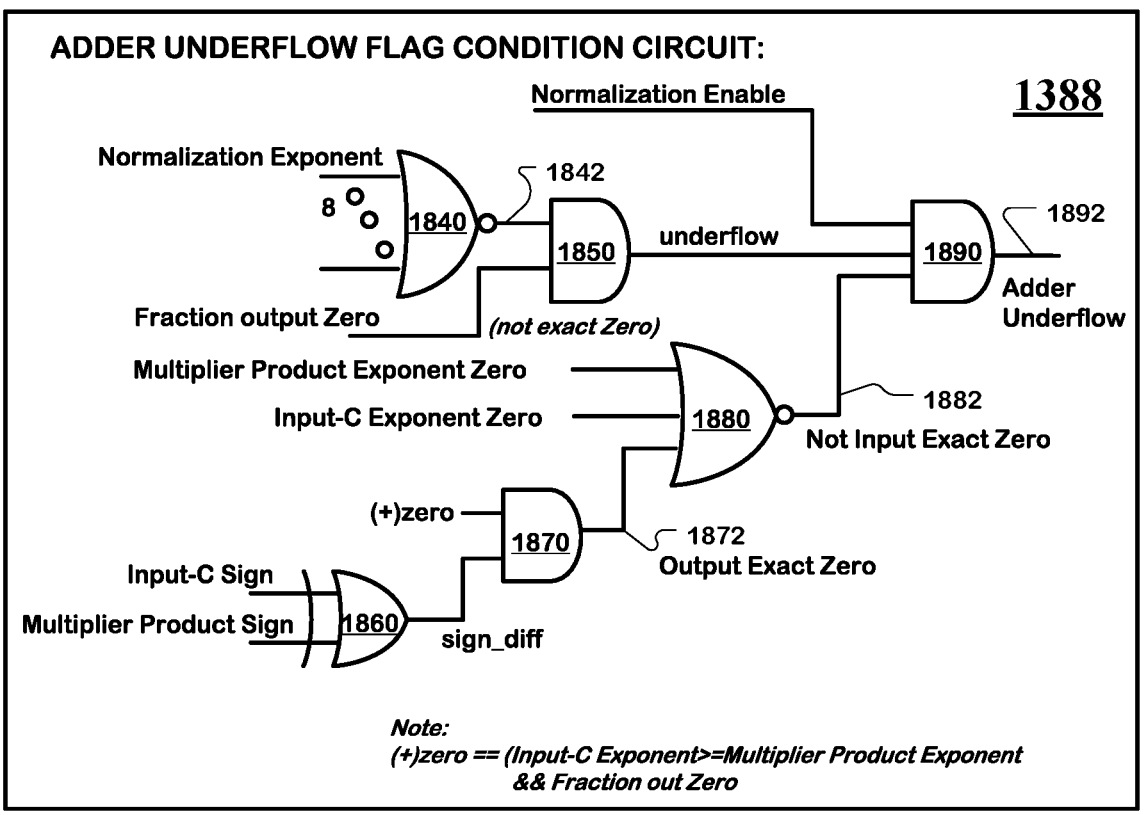
FIG. 18B shows an adder underflow flag condition circuit.

FIG. 18B shows one implementation 1800 of an adder underflow flag condition circuit in block 1388. The adder underflow 1892 is active on the AND gate 1890 high level output which has the following three inputs: (1) the normalization_enable, (2) the AND gate 1850 output named underflow, and (3) and the NOR gate 1880 output named not input exact zero 1882. Inputs to the AND gate 1850 are the eight normalization exponent bits and the fraction output zero. In summary, generally the adder underflow flag condition can occur during normalization when the normalization exponent is 0x00 (equals 0) and the input is not exact zero. The following paragraph will describe one implementation of the circuit that can check for a not input exact zero 1882 condition.

Further describing the circuit of FIG. 18B, generation of the not input exact zero 1882 signal is via the three inputs to the NOR gate 1880. These three inputs are: (1) the multiplier product exponent zero, (2) the input-C exponent zero, and (3) output exact zero 1872, derived from the output of AND gate 1870. The AND gate 1870 has two inputs. The first input is the EX-OR 1860 gate output named sign_diff. The EX-OR 1860 gate operates on the two inputs, multiplier product sign and the input-C sign. The second input to the AND gate 1870 is the (+) zero, where (+)zero is the Input-C Exponent greater than or equal to the multiplier product exponent logically ANDed with the fraction out zero signal.

The adder underflow is a combination of the following conditions as shown in the circuit. The first condition; (1) is when the final normalization is enabled. The second condition; (2) is when the final addition exponent result, which is when the normalization exponent equals 0x00 and when the final addition fraction result (fraction output zero signal) is not exactly zero. The third condition; (3) is when neither the multiplier product exponent zero, input-C exponent zero, and output not exact zero are enabled, meaning one of them is zero. An adder underflow does not occur if any of the three condition are zero.

Figure 19A:
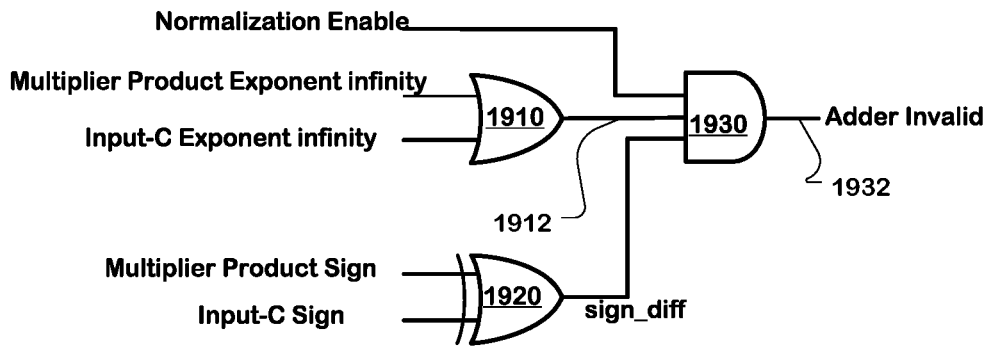
FIG. 19A shows an adder invalid flag condition circuit.

FIG. 19A shows one implementation 1900 of an adder Invalid flag condition circuit in block 1389. Referring to Table-8, one Invalid condition can occur when adding (+)Infinity and (−)Infinity. Adding (+)Infinity and (+)Infinity or (−)Infinity and (−)Infinity does not cause an Invalid flag condition 1389. This circuit checks for two operands having Infinity with opposite signs. The adder Invalid 1932 flag is the output of AND gate 1930. The AND gate 1930 has the following three inputs: (1) the normalization enable, (2) the OR gate 1910 output named 1912, and (3) the sign_diff output from the EX-OR gate 1920.

The two inputs to the adder Invalid OR gate 1910 are the multiplier product exponent infinity and the input-C exponent infinity. The EX-OR gate 1920 operates on the two inputs, the multiplier product sign, and the input-C sign.

To summarize the circuit function, an adder Invalid flag condition occurs when (1) the final normalization is enabled, (2) if input signs from input-A (or multiplier product) and input-C are different (positive and negative, or negative and positive), and (3) the exponents of the two inputs are infinity (0xFF).

Adder Sign Generation Circuitry

Figure 19B:
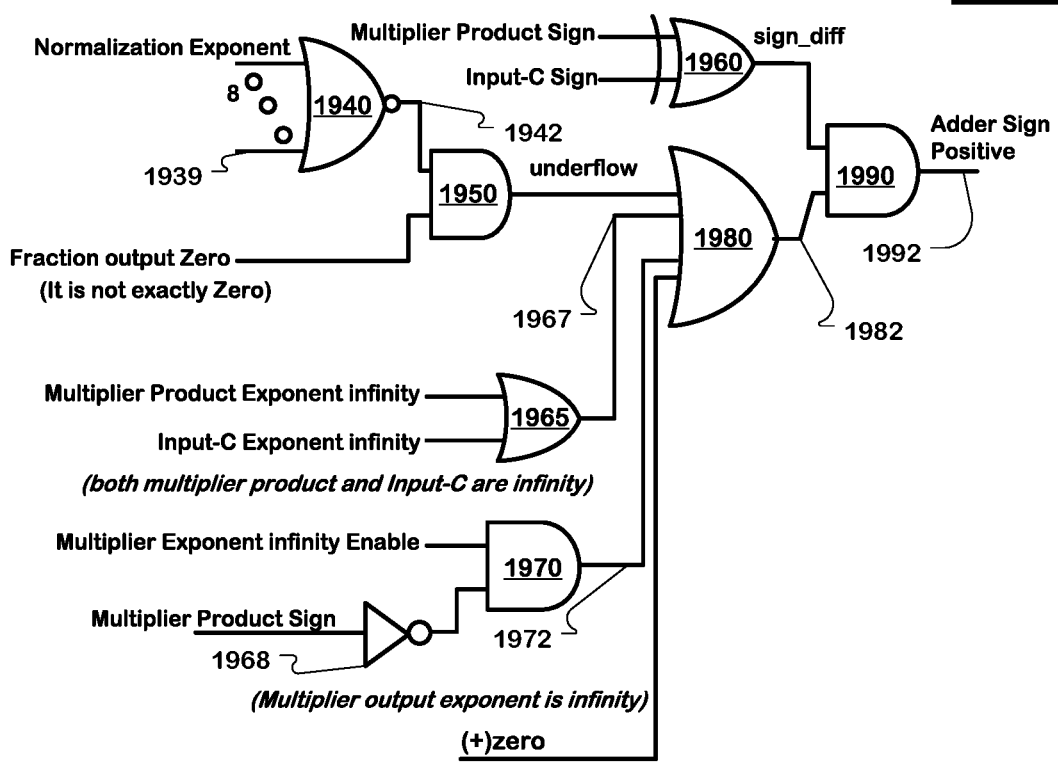
FIG. 19B depicts an adder sign positive condition circuit.

FIG. 19B shows one implementation 1900 of an adder sign positive condition circuit 810A for generating the adder sign positive output. As discussed above, the exception result generation has three parts: sign generation; exponent generation; and fraction generation. The sign output generated can be either positive or negative. One implementation of the sign output has two circuits which combine to provide the correct sign output for the exception result generation. The first circuit is the adder sign positive condition circuit 810A. The adder sign output has a positive condition (+) when the adder sign positive 1992 bit is equal to '1'.

The sign output function forces a positive condition to zero according to the following additions: (1) (+)Zero+(−)Zero, (2) (+)DeNorm+(−)DeNorm, (and vice versa), (3) the sign is different and one of the exponent inputs are infinity ((+)Inf+(−)Inf and vice versa), (4) the sign is different and multiplier product is positive and exponent is infinity ((+)Zero x (+)Inf=(+)Inf), (5) the sign is different and Operand-C exponent is greater than Operand-A (or multiplier product) exponent, (6) the equal and fraction output is zero, and (7) when both the multiplier product sign and the input-C sign is positive.

One implementation of a first circuit for generating a sign bit forced to "0" for a positive condition is shown in FIG. 19B is where the positive sign is the signal adder sign positive 1992 which is the output of the AND gate 1990. The AND gate 1990 has two inputs. The first input is the OR gate 1980 output named 1982, and the second input is the sign_diff, which comes from the EX-OR gate 1960. The EX-OR gate 1960 gate operates on the two inputs, the multiplier product sign, and the input-C sign. The OR gate 1980 has four inputs. These are the underflow, 1967, 1972 and plus zero and fraction out zero.

The AND gate 1950 output is named underflow and is a combination of the NOR gate 1940 output 1942 ANDed Fraction output Zero. The input to the NOR gate 1940 is an 8 bit normalization exponent vector. The two inputs to the OR gate 1965 are the multiplier product exponent infinity and the input-C exponent infinity. The AND gate 1970 has a first input multiplier exponent infinity enable and a second input is the output of the NOT gate 1968 whose input is the multiplier product sign.

Figure 20A:
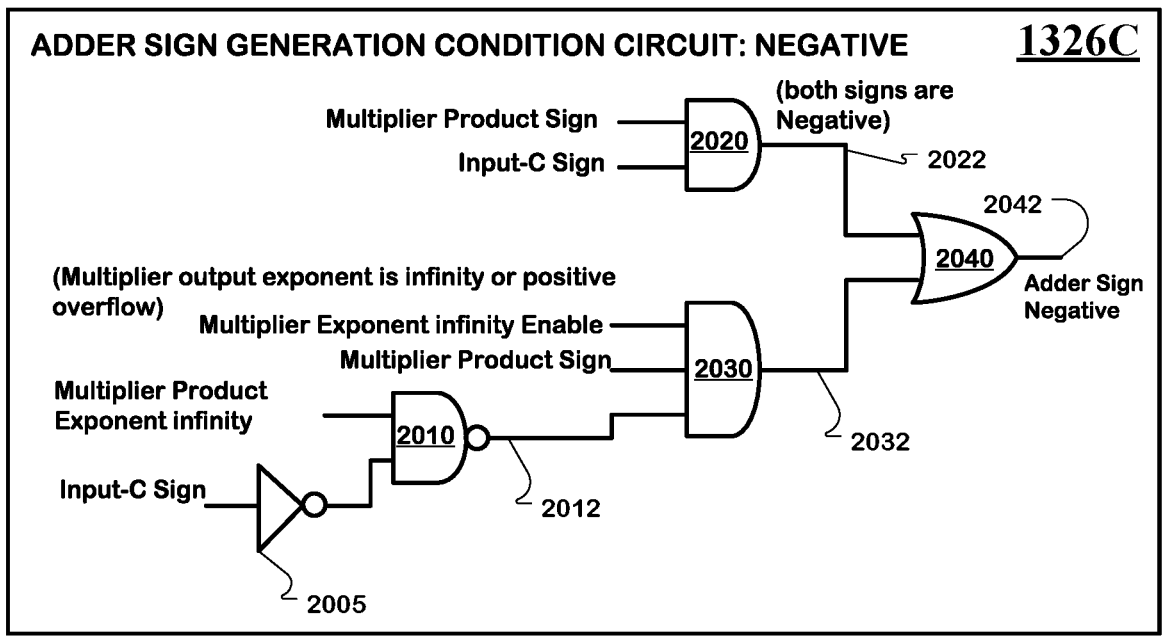
FIG. 20A depicts an adder sign negative circuit.

FIG. 20A depicts one implementation 2000 of an adder sign negative condition circuit block 1326C for generating the adder sign negative (−) condition output. This is the second circuit for generating a sign output as discussed above. The sign output comprises two circuits which combine to generate the positive (+) condition or negative (−) condition. The adder sign negative condition circuit 810B generates the negative (−) condition when the adder sign negative condition 2042 bit is equal to '1'. This second circuit is first described as a schematic implementation and the function is summarized in a few paragraphs below.

One implementation of a circuit generating a sign output bit forced to 1' for the negative (−) condition is shown in FIG. 20A. The OR gate 2040 outputs the adder sign negative condition 2042. The two inputs to the OR gate 2040 are the AND gate 2020 output 2022 and the AND gate 2030 output 2032. The first adder sign negative condition can occur when the AND gate 2020 is asserted. The AND gate 2020 operates on the input multiplier product sign and the input-C exponent, and if both signs are negative, asserts the output.

A second adder sign negative condition can occur with an assertion of the AND gate 2030. This will occur when the following inputs to AND gate 2030 are asserted: the multiplier exponent infinity enable, the multiplier product sign, and 2012. The output of the NAND gate 2010 is 2012 is enabled by the multiplier product exponent infinity and the NOT gate 2005 output with an Operand-C sign as an input.

Summarizing the adder sign negative condition, the sign output is forced to logic '1' for a negative condition (−) according to the following: (1) when both Operand-A (or multiplier product) and Operand-C signs are '1' (both negative); (2) or when Operand-A (or multiplier product) is negative infinity and Operand-C is not positive infinity.

Adder Exponent Circuits

The adder exponent output is generated using three conditions. The first condition is an All '0'(0x00=Zero). The second condition is an All '1', where 0xFF will equal an infinity condition. The third condition is a normal exponent.

Figure 20B:
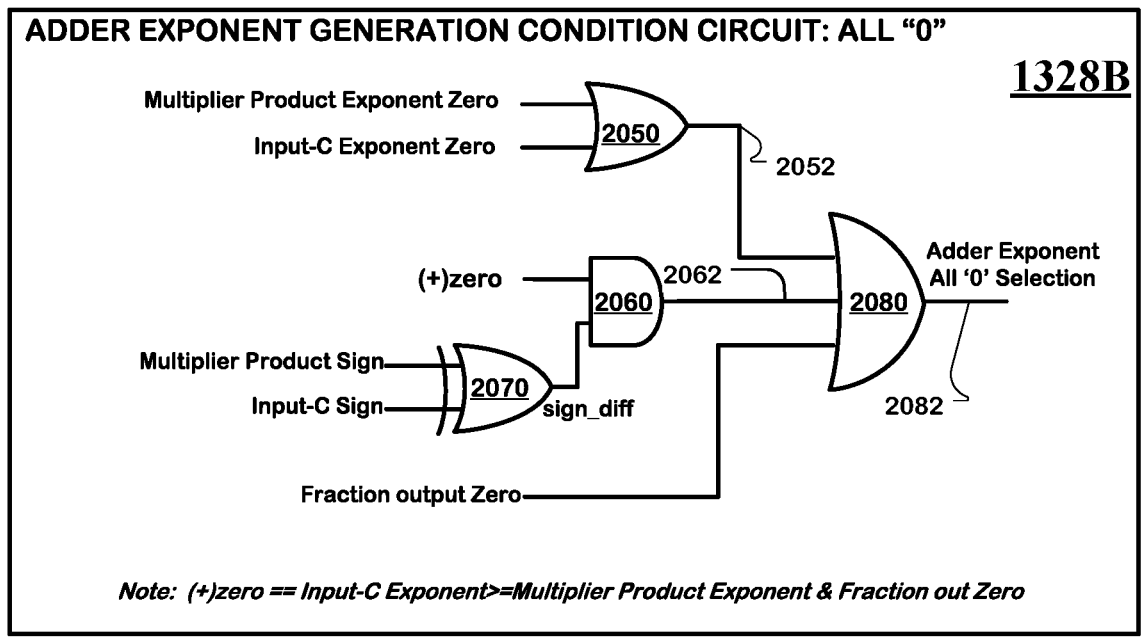
FIG. 20B illustrates an adder exponent generation all "0" condition circuit.

FIG. 20B illustrates one implementation 2000 of an adder exponent generation in an All "0" condition circuit block 1328B. The adder exponent All "0" selection 2082 is the output of the OR gate 2080 having three inputs. Each input represents a separate condition.

A first adder exponent All "0" condition is generated when either the multiplier product exponent zero or the input-C exponent zero enters the OR gate 2050. This condition asserts 2052 to trigger the adder exponent All "0" selection 2082.

A second adder exponent All "0" condition is generated when the AND gate 2060 has (+)zero and sign_diff inputs, where (+)zero is the Input-C Exponent greater than or equal to the Multiplier Product Exponent logically ANDed with the Fraction out Zero signal. The EX-OR gate 2070 operates on the multiplier product sign and the input-C sign to generate the sign_diff. When the AND gate 2060 is asserted, 2062 is operative to trigger the adder exponent All "0" selection 2082.

A third adder exponent All "0" condition is generated by the fraction output zero input to the OR gate 2080 to trigger the adder exponent All "0" selection 2082.

Figure 21A:
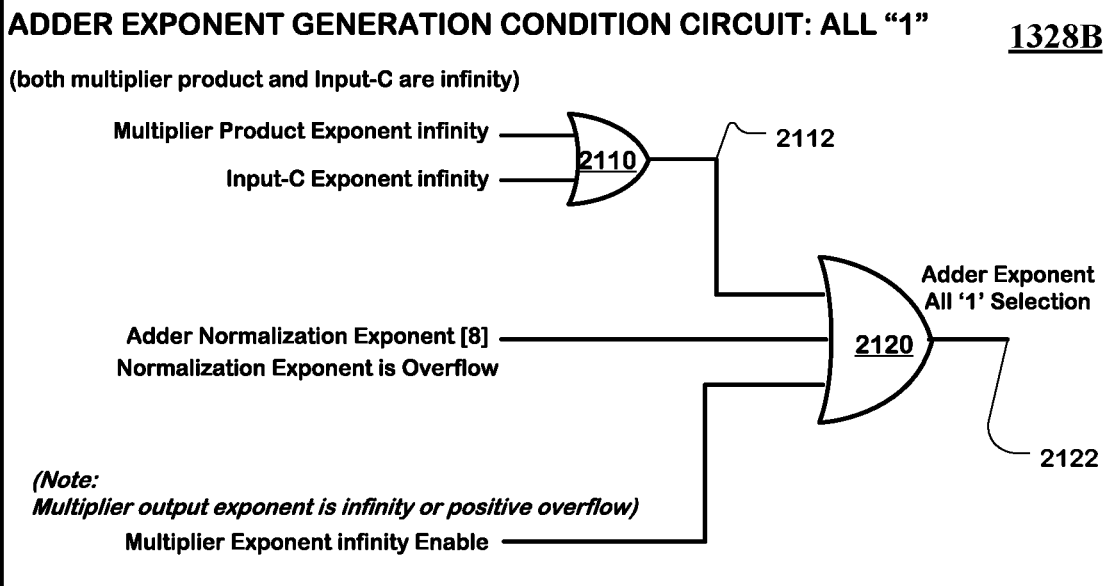
FIG. 21A illustrates an adder exponent generation all "1" condition circuit.

FIG. 21A illustrates one schematic implementation 2100 of an adder exponent generation for all "1" condition circuit block 1328B. An OR output function having three input conditions determines an all "1" output condition and is described in the following paragraphs. The condition circuit 811B shows the adder exponent All "1" selection 2122 as the output of the OR gate 2120 comprising three inputs. Each input represents a separate condition.

A first All "1" condition is generated when either the multiplier product exponent infinity or the input-C exponent infinity are active inputs to the OR gate 2110. This condition asserts 2112.

A second All "1" condition is generated when the eighth bit of the adder normalization exponent [8] has an overflow result.

A third All "1" condition is generated by multiplier exponent infinity enable where the multiplier output exponent is infinity or has positive overflow.

To summarize, the All '1' condition is generated when any exponent of input-A (or multiplier product) or input-C is infinity, or final adder normalization exponent is overflow, or multiplier output exponent is infinity or positive overflow ((+)Zero x (+)Inf=(+)Inf).

Figure 21B:
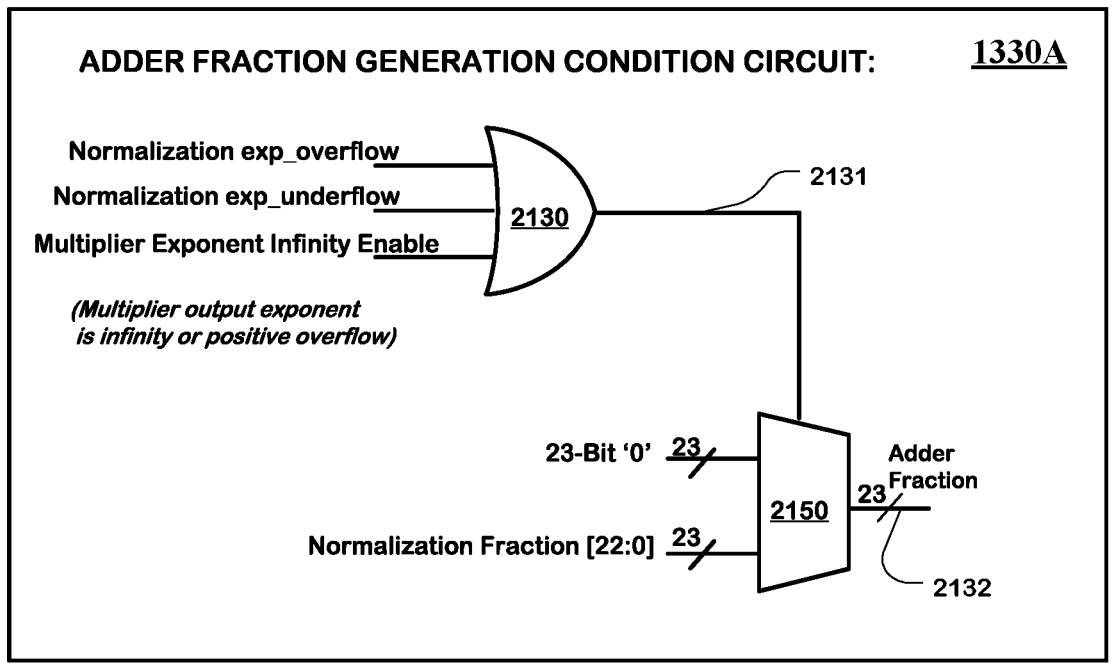
FIG. 21B shows an adder fraction generation condition circuit.

FIG. 21B shows one schematic implementation 2100 of an adder fraction generation condition circuit 1330A. This circuit routes either the actual normalization fraction value or 23 bits of zero depending upon the three selector conditions controlling a multiplexer. The three conditions which force the first 23 bit bus zero are: (1) any normalization exponent overflow; (2) normalization exponent underflow; or (3) or multiplier output exponent is infinity or positive overflow Otherwise, this condition is normal and the second bus comprising the 23 bit normalization fraction bus routes to the adder fraction 2132 output.

The schematic of circuit 812A shows the adder fraction 2132 output as a 23 bit bus sourced by the multiplexer 2150. The OR gate 2130 outputs the selector control 2131 to choose between the two 23 bit input buses to the multiplexer 2150. The multiplexer 2150 has two 23 bit buses as inputs. A first input bus is a 23 all zero bits bus. A second input bus is the 23 bit normalization fraction bus. The OR gate 2130 outputs the control 2131 to the multiplexer 2150 according to the three inputs conditions described in the paragraph above.

The adder fraction 2132 output has two conditions which are All '0'(0x00=Zero) and normal fraction. In one embodiment, the exception processing in a carry-save accumulation unit does not support DeNormal or NaN operation, the DeNormal numbers are treated as zero, and NaN numbers are treated as infinity. The fraction output will be All '0' when any of those exceptions happened.

All '0' occurs when the overflow or underflow exceptions happened, or multiplier output exponent is infinity or positive overflow ((+)Zero multiplied by (+)Inf=(+)Inf).

Multiply-Adder Operation Case Consideration

In the following paragraph, x is a multiplication operator, while + is a summing operator and = is the equals operator.

| [VALUE1 | x | VALUE2] | + | VALUE3 | = | RESULT |
|---|---|---|---|---|---|---|
| [(+)Zero | x | (+)Inf ] | + | (−)Inf | = | (+)Inf |
| [(+)Zero | x | (+)Inf ] | + | (−)Norm | = | (+)Inf |
| [(+) Inf | x | (−)Inf ] | + | (+)Zero | = | (−)Inf |
| [(+) Inf | x | (−)Inf ] | + | (+)Inf | = | (+)Inf |
| [(+)Zero | x | (+) Inf ] | + | (+)Zero | = | (+)Inf |
| [(+)MaxNorm | x | (+)MaxNorm ] | + | (+)MaxNorm | = | (+)Inf |
| [(+)MaxNorm | x | (+)DeNorm ] | + | (+)MinNorm | = | (+)MinNorm |

While the present invention is disclosed by reference to various embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A circuit to receive a sequence of operands A(i) and operands B(i) in floating point encoding format, for (i) going from 0 to N−1, and to calculate a summation S(i) of terms A(i)*B(i), where (i) goes from 0 to N−1, and N is the number of terms in the summation, the circuit comprising:

a multiplier circuit receiving operand A(i) and operand B(i), to multiply operand A(i) and operand B(i) to generate calculated term A(i)*B(i) in a format including a multiplier output exponent of term A(i)*B(i), a multiplier output sign of term A(i)*B(i) and a multiplier output significand of term A(i)*B(i), the multiplier circuit including:

a multiplier exception processing circuit to detect at least one invalid multiply operation and in response to set the multiplier output exponent of term A(i)*B(i) and multiplier output significand of term A(i)*B(i) to values usable in further computation; and an accumulator circuit connected to outputs of the multiplier circuit, to add the term A(i)*B(i) to the summation S(i−1) to generate a summation S(i) in a format including an accumulator output exponent of summation S(i), and accumulator output sign of summation S(i), and an accumulator output significand of summation S(i), the accumulator circuit including:

an accumulator exception processing circuit to detect at least one invalid add operation and in response to set the accumulator output exponent of summation S(i), and the accumulator output significand of summation S(i) to values usable in further computation.

2. The circuit of claim 1, wherein the at least one invalid multiply operation is a multiplication of zero and infinity.

3. The circuit of claim 1, wherein the at least one invalid multiply operation is an operation on a signaling NaN operand.

4. The circuit of claim 1, wherein the at least one invalid add operation is an addition in which two addends are positive and negative infinity, respectively.

5. The circuit of claim 1, wherein the at least one invalid add operation is an operation on a signaling NaN operand.

6. The circuit of claim 1, wherein said values usable for further computation include signed zero and positive infinity.

7. A method to calculate in a floating point encoding format having at least one illegal multiply operation and at least one illegal add operation, a summation S(i) of terms A(i)*B(i), where (i) goes from 0 to N−1, and N is the number of terms in the summation, the method comprising:
    receiving, at a multiplier circuit, a sequence of operands A(i) and operands B(i) in floating point encoding format, for (i) going from 0 to N−1;
    multiplying, by the multiplier circuit, operand A(i) and operand B(i) to generate term A(i)*B(i) in a format including a multiplier output exponent of term A(i)*B(i) and a multiplier output significand of term A(i)*B(i), including, for said at least one illegal multiply operation, setting, by a multiplier exception processing circuit coupled to the multiplier circuit, the multiplier output exponent of term A(i)*B(i) and multiplier output significand of term A(i)*B(i) to values usable in further computation by an accumulator circuit; and
    adding, by the accumulator circuit, the term A(i)*B(i) to the summation S(i−1) to generate a summation S(i) in a format including an accumulator output exponent of summation S(i) and an accumulator output significand of summation S(i), including detecting, by an accumulator exception processing circuit coupled to the accumulator circuit, at least one invalid add operation and for said at least one invalid add operation setting, by the accumulator exception processing circuit, the accumulator output exponent of term A(i)*B(i) and accumulator output significand of term A(i)*B(i) to values usable in further computation.

8. The method of claim 7, wherein the at least one invalid multiply operation is a multiplication of zero and infinity.

9. The method of claim 7, wherein the at least one invalid multiply operation is an operation on a signaling NaN operand.

10. The method of claim 7, wherein the at least one invalid add operation is an addition in which two addends are positive and negative infinity, respectively.

11. The method of claim 7, wherein the at least one invalid add operation is an operation on a signaling NaN operand.

12. The method of claim 7, wherein said values usable for further computation include signed zero and positive infinity.

13. A multiply-and-accumulate unit, comprising:
    a pipeline configured to execute a floating point, multiply-and-accumulate operation for a summation S(i) of terms A(i)*B(i), where (i) goes from 0 to N−1, and N is the number of terms in the summation, the pipeline including:
        a multiplier pipeline stage including a multiplier circuit to provide multiplier significand and multiplier exponent values of a term A(i)*B(i) in response to first and second input operands, a radix-8 conversion circuit to convert the multiplier significand and multiplier exponent values of term A(i)*B(i) to radix-8 format, and a 2's complement conversion circuit to convert the multiplier significand value to a 2's complement representation for the multiplier output significand of term A(i)*B(i);
        a multiplier exception processing circuit to detect at least one invalid multiply operation and in response to set the multiplier output exponent of term A(i)*B(i) and multiplier output significand of term A(i)*B(i) to values usable in further computation, and generate multiplier exception flags;
        an accumulator stage including a significand circuit to add the multiplier output significand of term A(i)*B(i) to fed back significand of summation S(i−1), and generate sum-and-carry values for summation S(i), the significand circuit including a 2's complement, carry-save adder, to generate sum and carry accumulator output significand values of summation S(i); and an exponent circuit receiving the multiplier exponent value of term A(i)*B(i) and a fed back exponent value of summation S(i−1), to generate an accumulator stage exponent value for summation S(i);
        a stage to convert the accumulator sign bit, an accumulator stage exponent and accumulator significand sum and carry values to a sign-magnitude significand format for summation S(i);
        a stage to convert the sign-magnitude significand format from radix-8 alignment to radix-2 alignment, and produce a normalized exponent and significand for summation S(i);
        a stage to perform rounding and conversion to a standard floating point representation of summation S(i), including an accumulator output exponent of summation S(i), and an accumulator output significand of summation S(i); and
        an accumulator exception processing circuit responsive to the multiplier exception flags and the accumulator stage to detect at least one invalid add operation and in response to set the accumulator output exponent of summation S(i), and the accumulator output significand of summation S(i) to values usable in further computation.

14. The multiply-and-accumulate unit of claim 13, wherein:
    the significand circuit of the accumulator stage includes a significand shifter, responsive to exponent comparison signals;
    the exponent circuit is responsive to the exponent comparison signals; and
    the pipeline includes exponent comparison circuits to compare the multiplier output exponent term of A(i)*B(i) to the fed back exponent of summation S(i−1), to generate the exponent comparison signals used to generate summation S(i).

15. The multiply-and-accumulate unit of claim 13, wherein the accumulator stage includes:
    an overflow detector circuit, to generate a first condition signal indicating an overflow condition for at least one of the fed back sum and carry values of summation S(i−1);
    a leading sign bit detector circuit, to generate a second condition signal indicating that at least one of the fed back sum and carry values of summation S(i−1) has more than or equal to a number 8 of extended sign bits; and the exponent circuit and significand circuit are also responsive to the first condition signal and the second condition signal.

16. The multiply-and-accumulate unit of claim 13, wherein the pipeline has an accumulator mode and a summing mode, and includes:

a selector to provide the fed back accumulator output in the accumulator mode, and to provide a third floating point input operand in the summing mode to the significand circuit and exponent circuit.

17. The multiply-and-accumulate unit of claim 13, wherein the at least one invalid multiply operation is a multiplication of zero and infinity.

18. The multiply-and-accumulate unit of claim 13, wherein the at least one invalid multiply operation is an operation on a signaling NaN operand.

19. The multiply-and-accumulate unit of claim 13, wherein the at least one invalid add operation is an addition in which two addends are positive and negative infinity, respectively.

20. The multiply-and-accumulate unit of claim 13, wherein the at least one invalid add operation is an operation on a signaling NaN operand.

21. The multiply-and-accumulate unit of claim 13, wherein said values usable for further computation include signed zero and positive infinity.

22. The multiply-and-accumulate unit of claim 13, wherein said pipeline is arranged in a reconfigurable data flow architecture.

23. A reconfigurable arithmetic unit, comprising:

a circuit configurable to execute a plurality of floating point arithmetic operations using input operands and generating an output operand in a floating point encoding format, where a source of the input operands, a destination of the output operand and an operation of the plurality of floating point operations are set by configuration data, the circuit including an exception handling circuit to detect at least one of an invalid operation and an invalid result according to the floating point encoding format, and to set the output operand to a value useable in further processing.

24. The reconfigurable arithmetic unit of claim 23, wherein the circuit configurable to execute a plurality of floating point arithmetic operations includes:

a multiplier circuit configurable to receive operand A(i) and operand B(i), to multiply operand A(i) and operand B(i) to generate a calculated term A(i)*B(i) in a format including a multiplier output exponent of term A(i)*B(i), a multiplier output sign of term A(i)*B(i) and a multiplier output significand of term A(i)*B(i); and an adder circuit configurable to receive at least two addend operands selected by the configuration data from outputs of the multiplier, a third operand C(i) and an output sum S(i−1) of the adder circuit from a previous cycle, to generate a sum S(i) in the floating point encoding format.

* * * * *